United States Patent [19]

Nichols et al.

[11] Patent Number: 4,860,112
[45] Date of Patent: * Aug. 22, 1989

[54] TELERADIOLOGY SYSTEM HAVING MULTIPLE COMPRESSOR/EXPANDERS

[75] Inventors: John L. Nichols, Santa Clara; David Wang, Milpitas; Edward Kirkpatrick, Scotts Valley; Clark M. Viehweg, Los Gatos; Edwin S. Morton, Campbell; Van T. Hua, San Jose, all of Calif. William C. King, of Redmond, Wash.

[73] Assignee: Raytel Systems Corporation, Santa Clara, Calif.

[*] Notice: The portion of the term of this patent subsequent to May 31, 2005 has been disclaimed.

[21] Appl. No.: 125,525

[22] Filed: Nov. 25, 1987

Related U.S. Application Data

[63] Continuation-in-part of Ser. No. 618,346, Jun. 7, 1984, Pat. No. 4,748,511.

[51] Int. Cl.[4] .......................... H04N 1/00; H04N 1/417; H04N 5/32; H04N 7/12
[52] U.S. Cl. .................................... 358/400; 358/111; 358/133; 358/426; 382/56
[58] Field of Search ............... 358/256, 263, 260, 261, 358/262, 280, 133, 135, 134, 111; 364/725, 727, 728, 826, 414; 382/56; 378/12, 17, 98, 99

[56] References Cited

U.S. PATENT DOCUMENTS

| | | | |
|---|---|---|---|
| 3,995,106 | 11/1976 | Wern et al. | 382/56 |
| 4,003,023 | 1/1977 | Benson et al. | 382/56 |
| 4,058,835 | 11/1977 | Kennedy | 358/134 |
| 4,261,018 | 4/1981 | Knorrolton | 358/263 |
| 4,302,775 | 11/1981 | Widergren et al. | 358/136 |
| 4,458,267 | 7/1984 | Dolozza | 364/414 |
| 4,463,386 | 7/1984 | Goddard et al. | 358/263 |
| 4,541,012 | 9/1985 | Tescher | 358/133 |

OTHER PUBLICATIONS

"Quick X-Ray Transmission Near", News Article from Moneterey Peninsula Herald, Mar. 18. 1983.
"Faster X-Ray System Planned", Desert Sun, Mar. 19, 1983.
"Digital X-Ray System Landed", Peninsula Times--Tribune, Mar. 21, 1983.
System to Computerize X-Rays, Argus, Mar. 17, 1983.
"Computerized X-Rays Said to Save Lives", National News, Mar. 17, 1983.
"X-Rays Computerized", Tompoc Record, Mar. 18, 1983.
"New System Tested for Storing X-Rays", Anaheim Bulletin, Mar. 21, 1983.
"New Technique Speed X-Rays Needs", Progress Bulletin, Mar. 19, 1983.
"A Pac-Man That Provides Instant X-Rays", John Eckhouse, 3/13/83.
"Revolutionary New Technique for X-Rays", San Rafael Newspaper, 3/17/83.
"New-Computer X-Ray System Unveiled", Hemet News, 3/17/83.

Primary Examiner—Howard W. Britton
Assistant Examiner—John K. Peng
Attorney, Agent, or Firm—Flehr, Hohbach, Test, Albritton & Herbert

[57] ABSTRACT

A teleradiology system capable of scanning X-ray images and the like and transmitting the scanned images to various locations is disclosed. The images may be compressed for storage or transmission. Compressed images can be transmitted much more quickly and take up much less space than uncompressed images. Compressed images can be expanded for, among other things, viewing. The compressor/expander and input-/output devices reside on a bus structure in such a manner that digital image data can be selectively passed between the compressor/expander and the various input/output devices.

14 Claims, 45 Drawing Sheets

TR BLOCK DIAGRAM

HARD DISK MEMORY ALLOCATION (NOTE: SPLIT DISKS CONTAIN A SECOND DIRECTORY AND IMAGE DATA AREA)

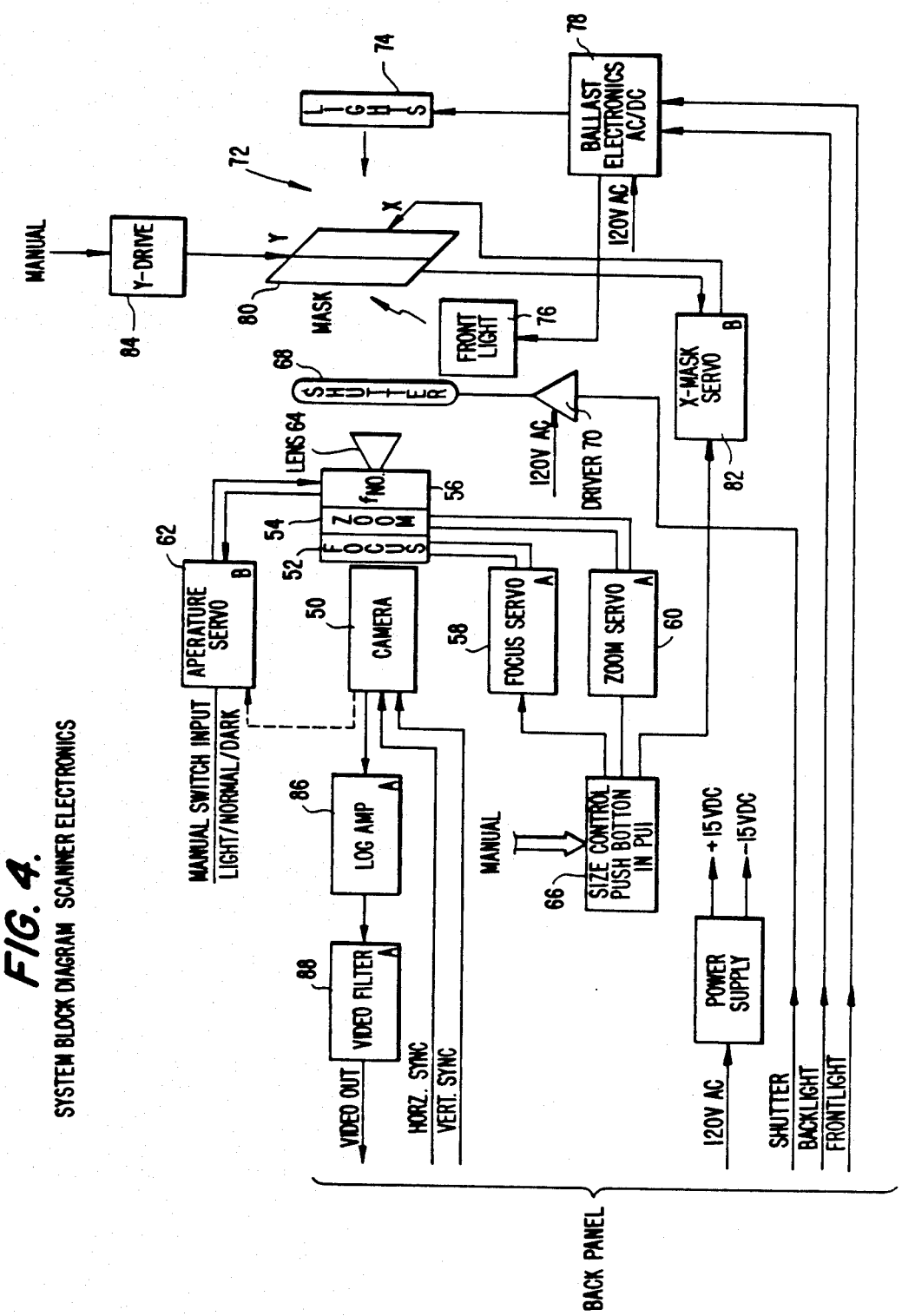
FIG. 4. SYSTEM BLOCK DIAGRAM SCANNER ELECTRONICS

CAMERA INTERFACE SIMPLIFIED BLOCK DIAGRAM

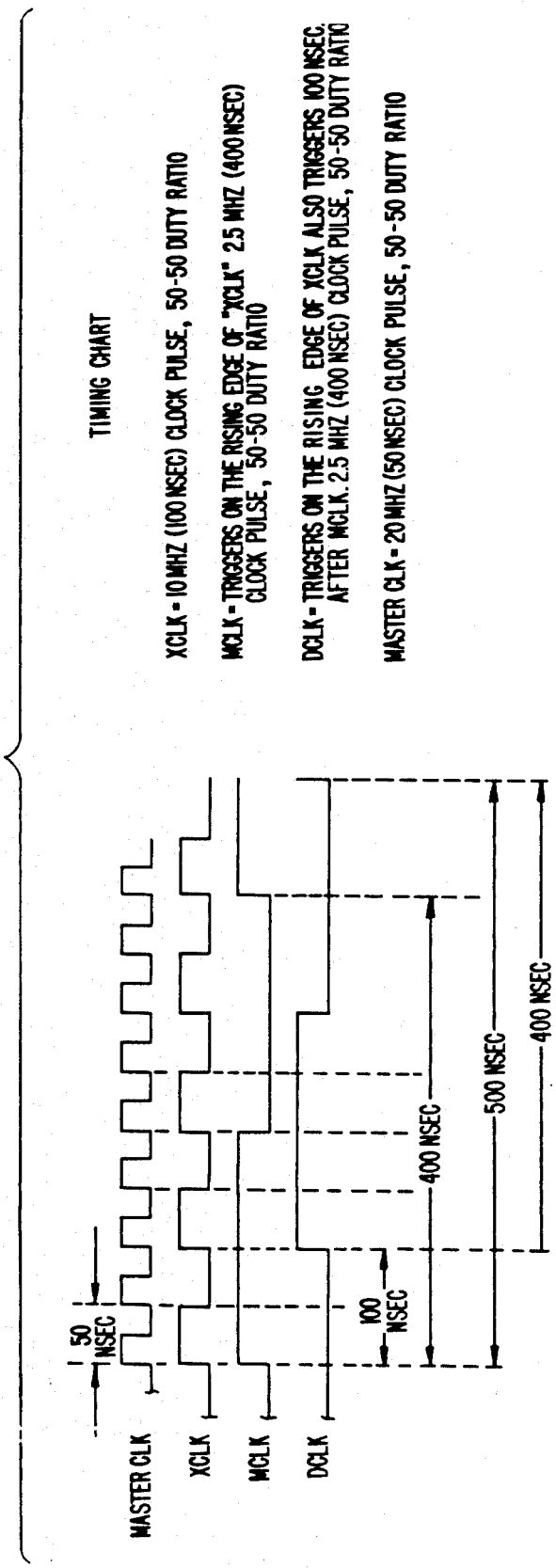

BUFFERED BUS INTERFACE

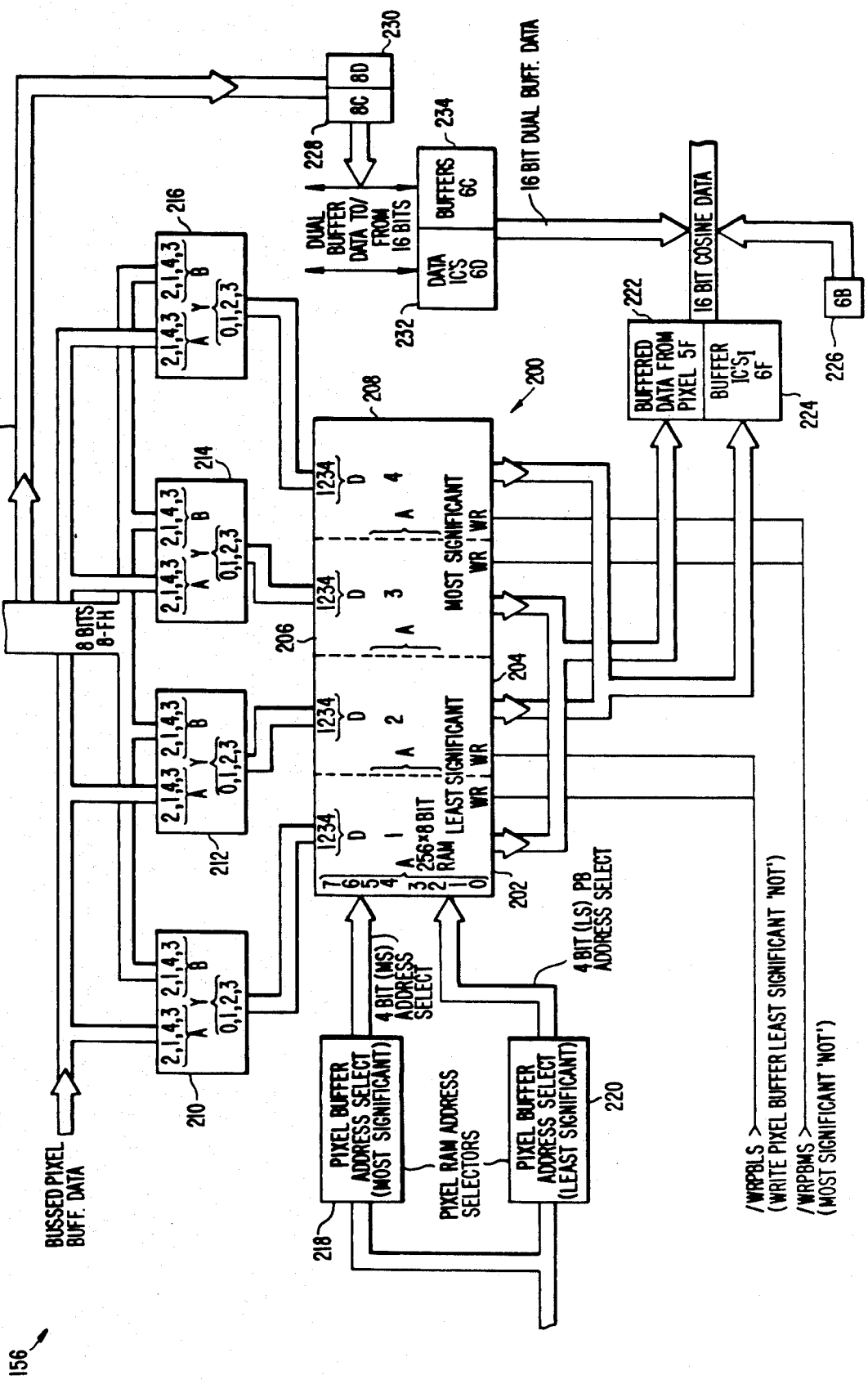

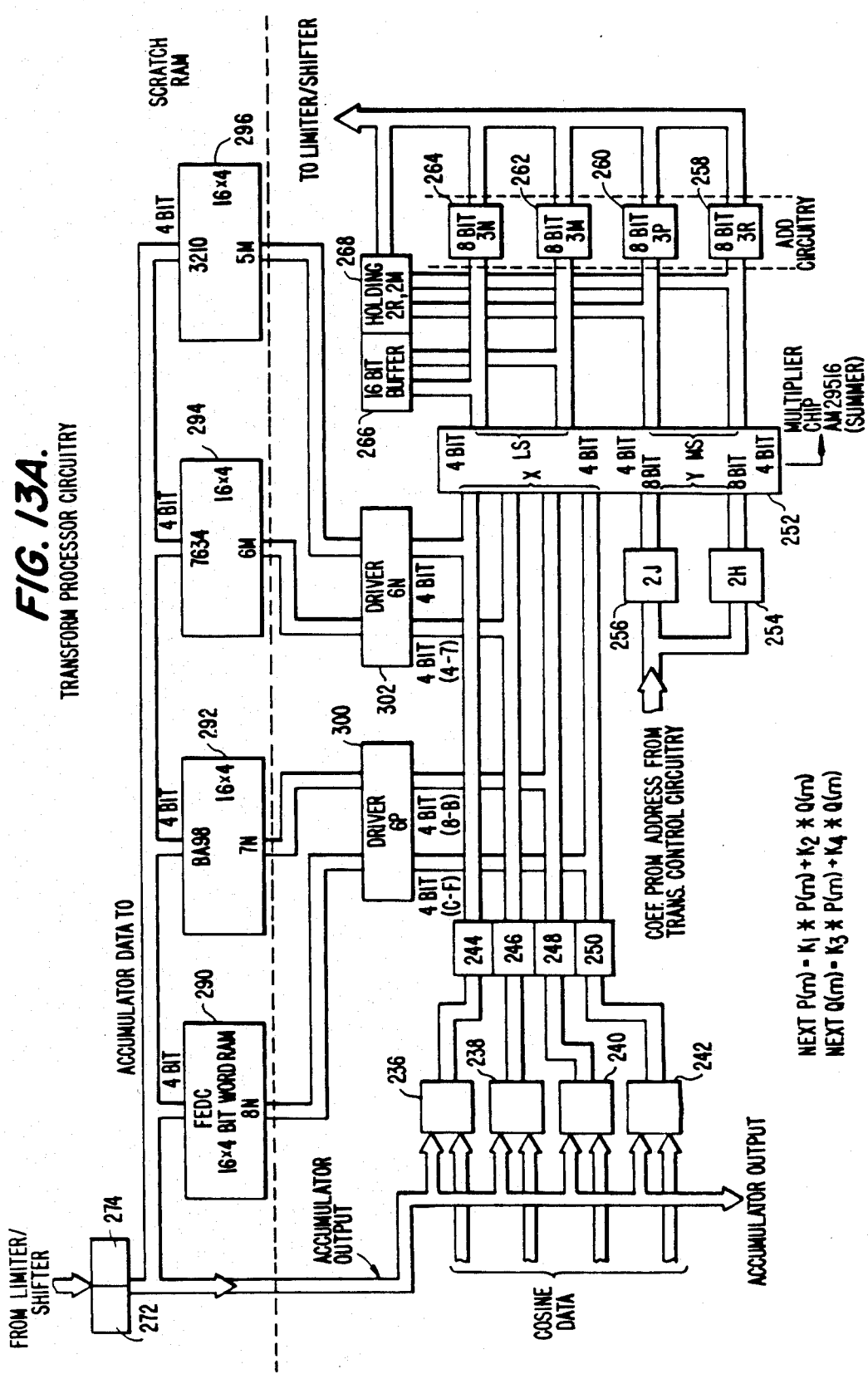

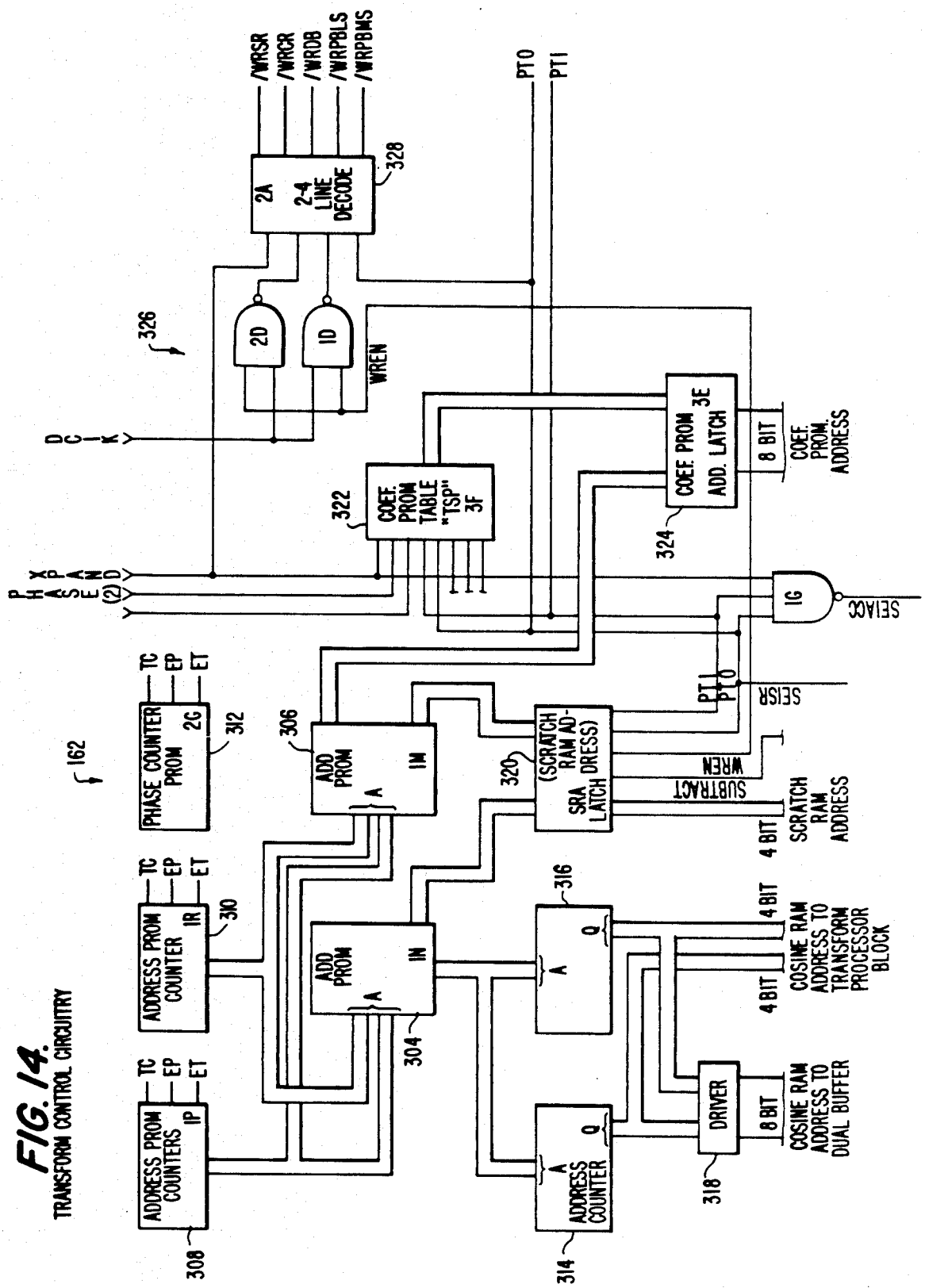
FIG. 14. TRANSFORM CONTROL CIRCUITRY

COMPRESSION OPERATION

EXPANSION OPERATION

NOTE: IN /WRPBMS THERE ARE 16 GROUPS, WITH 9 PULSES IN EACH GROUP
IN /WRPBLS THERE ARE 16 GROUPS, WITH 8 PULSES IN EACH GROUP

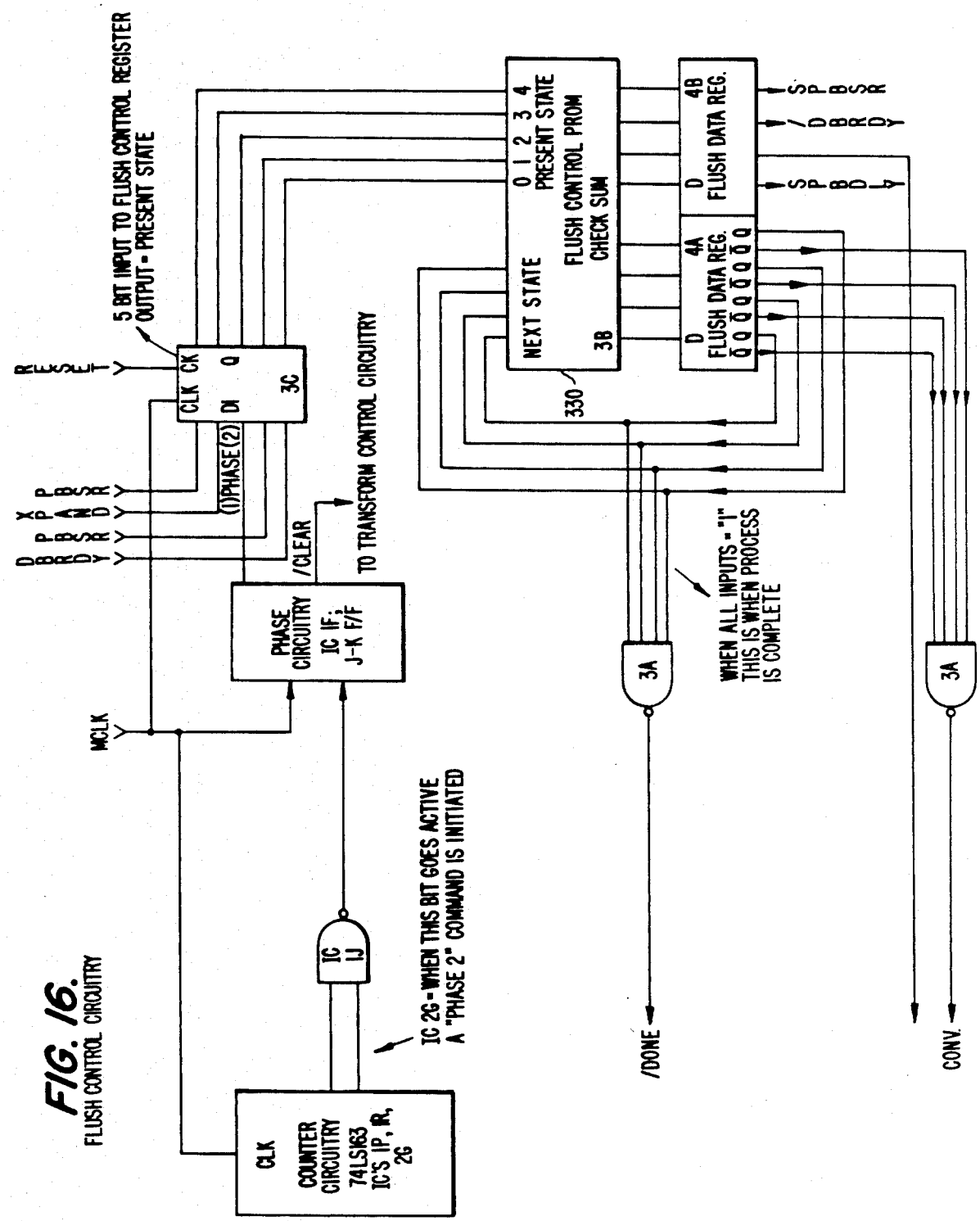
FIG. 16. FLUSH CONTROL CIRCUITRY

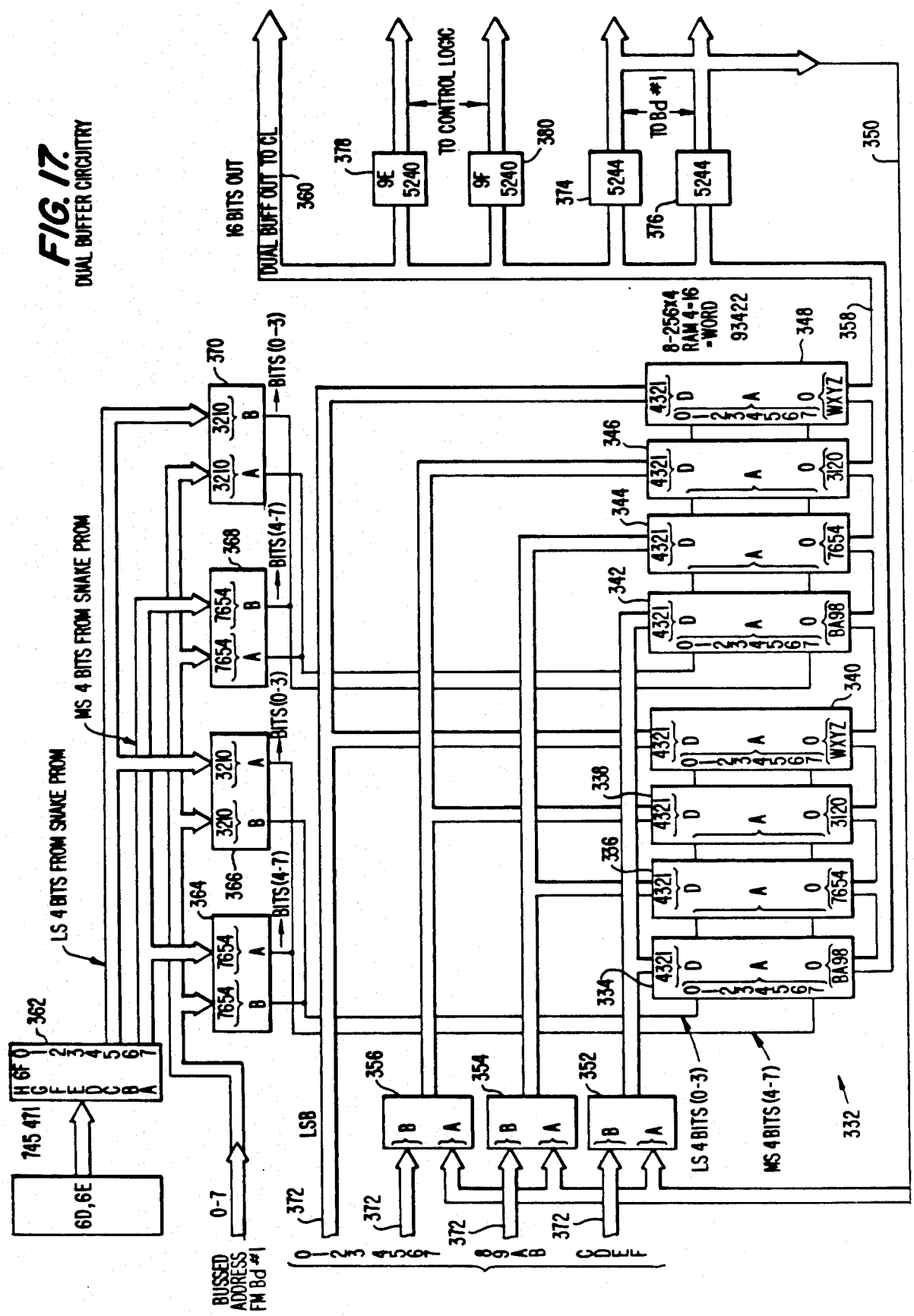
FIG. 17. DUAL BUFFER CIRCUITRY

HUFFMAN DECODER/ENCODER CIRCUITRY

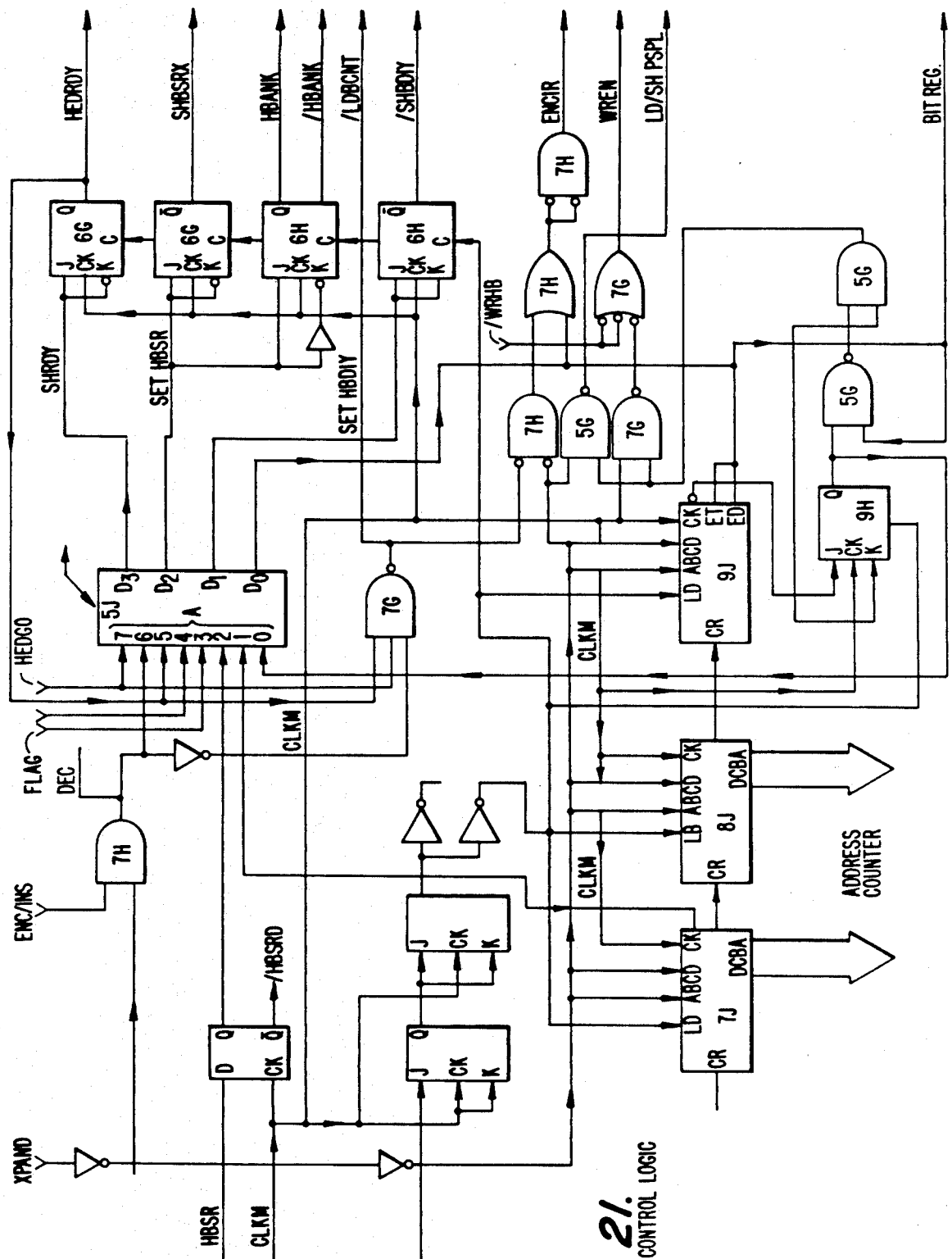
FIG. 21. HUFFMAN BUFFER CONTROL LOGIC

1. IF HEDGO IS EQUAL TO 1 A WAIT IS INITIATED
2. LOAD NEW ADDRESS WHEN BIT REQ INITIATES A SHIFT
3. DECODE MODE WHEN BCNT=0 IN 3RD SHIFT MODE OF BIT REQ.
4. BCNT=0
5. BIT REQ (SHIFT) (3)
6. DECODE MODE WHEN BCNT=0 IN 1ST SHIF MODE OF BIT REQ.
7. DECODE MODE WHEN BCNT=0 IN 2ND SHIF MODE OF BIT REQ.

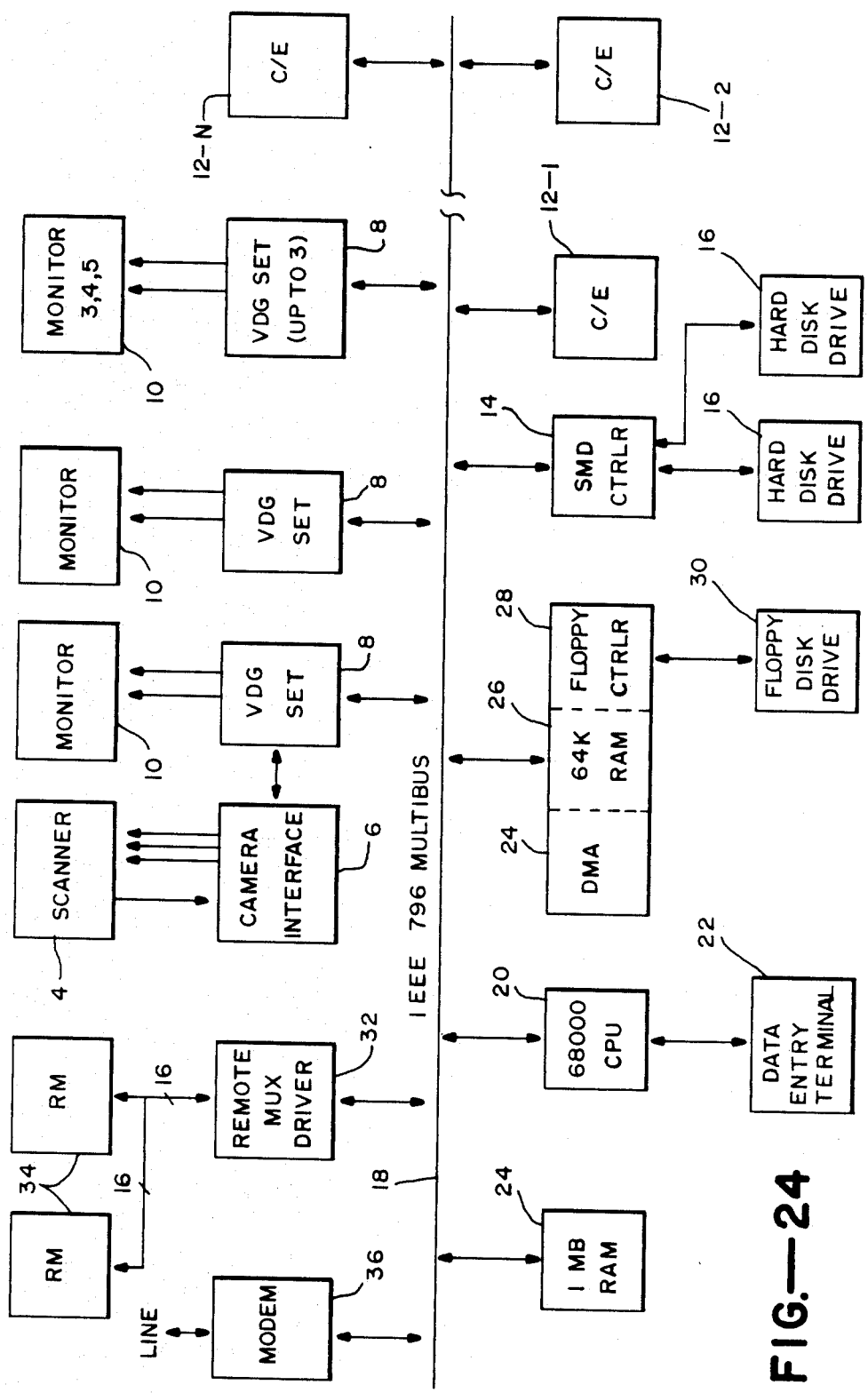
FIG.—24

TELERADIOLOGY SYSTEM HAVING MULTIPLE COMPRESSOR/EXPANDERS

CROSS REFERENCE TO RELATED APPLICATIONS

The present invention is a continuation-in-part of application Ser. No. 618,346, filed June 7, 1984 now U.S. Pat. No. 4,748,511.

BACKGROUND OF THE INVENTION

The present invention is directed to a teleradiology system which is capable of scanning X-ray images and the like and transmitting the scanned images to various locations. An image which has been scanned can be stored, either in an expanded or compressed form, for later call up. Local and remote monitors can be connected to the system to provide image displays. Stored images can also be directed via a modem over transmission lines hundreds or even thousands of miles away.

BRIEF DESCRIPTION OF THE DRAWINGS

FIG. 4 shows a block diagram of scanner electronics.

FIG. 7B is a clock-control circuitry timing diagram.

FIG. 12 shows a pixel buffer circuitry.

FIG. 13A shows a transform processor circuitry.

FIG. 14 is a block diagram of the transform control circuitry.

FIG. 16 is a block diagram of a flush control circuitry.

FIG. 17 is a block diagram of a dual buffer circuitry.

FIG. 21 is a circuit schematic diagram showing the components for the Huffman encoder/decoder logic circuit.

DETAILED DESCRIPTION OF THE INVENTION

Figure 1:
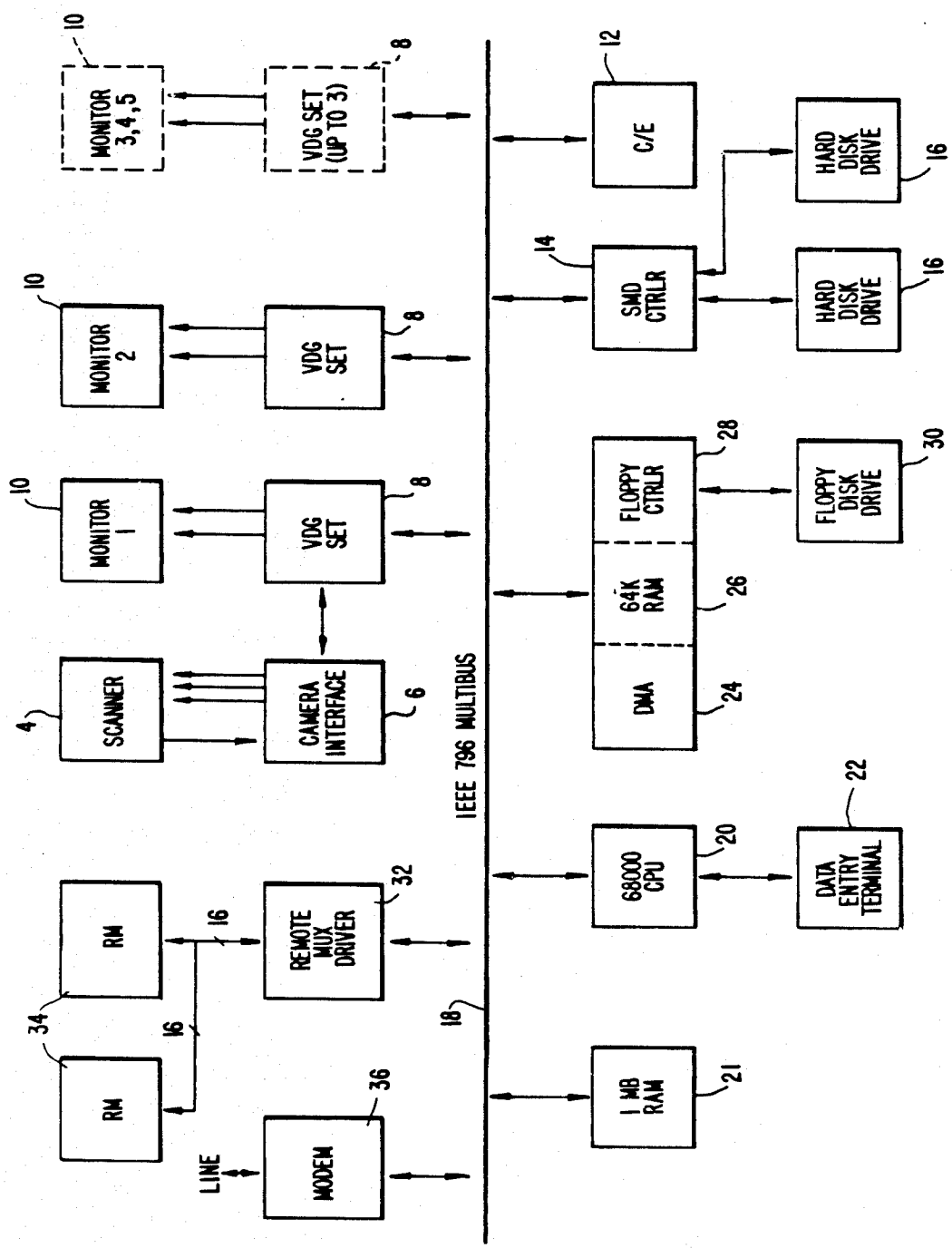
FIG. 1 is a block diagram of a teleradiology system according to the present invention.

Best Mode for Carrying Out the Invention

Scanner

The scanner 4 contains the slow-scan vidicon camera which captures the image to be transmitted and outputs image information in the form of analog video signals. Zoom and focus servo controls are provided for the camera lens. These adjustable servos control the motors driving the zoom and focus rings on the camera's optical lens. Proper adjustment of the zoom servo ensures scanned images will fill the 10.5 × 10.5 in. display area of the viewing monitor; proper adjustment of the focus servo helps ensure a sharp image.

The scanner also contains the mask and aperture servo controls. Proper adjustment of the mask servo ensures the motor driving the curtains will stop at the proper position and leave an opening of the proper size. The aperture servo adjustment affect the amount of light the vidicon camera receives while scanning an image. The aperture servo controls the motor driving the aperture ring on the camera, setting the ring at the proper F-stops (3.0 for dark, 5.6 for normal, and 9.0 for light).

Camera Interface

The camera interface 6 drives the slow-scan camera installed in scanner 4, sending composite blanking, composite sync, vertical drive and horizontal drive signals. The camera interface also buffers and sends lighting control signals generated by the VDG.

After scanning, the camera returns composite video (analog) signals, which are digitized by the camera interface using an analog-to-digital converter. The VDG display board automatically reads this data and displays the image on the screen.

The camera interface contains three clocks, all supported by a 10 MHz crystal oscillator. The system clock (SCLK) generates all internal timing. The conversion clock (CONVCLK) drives the TRW A/D converter, and the shift clock (SCLK) loads the digitized video data before writing it to the VDG memory boards A and B. Buffering is necessary because the digitized video data is generated too quickly for the VDG memory Boards to accept.

VDG Circuit

The VDG circuit 8 contains an 8085 microprocessor which manages the VDG's housekeeping chores and processes all keyboard instructions that do not require interaction with the CPU. Keyboard instructions processed "locally" involve image manipulation functions, including:
*MAGNIFY
*LIGHT/DARK
*NARROW/WIDE
*WINDOW
*ARROW Keys (UP, DOWN, LEFT and RIGHT)
*GRY RST
*CURSOR
*STAT LN

*HOME
*OVERLAY

The VDG also communicates with the system CPU and other system components when necessary, and interfaces with a light pen. The keypad and light pen are attached to the VDG with separate ribbon cables.

The VDG contains 32K ROM, 24K of which is currently used. The ROM contains 8K for the font or alphanumeric data that appears on the screen (such as the patient data), 4K for the gray-scale LUT (look-up table), and 12K for the keystroke processing software. In addition, this board has 4K RAM containing an alternate LUT, debugging routine, the stack, and several variables.

Actual image data sent to the VDG is stored alternately on one of two one-half MB word-addressable random access memories A and B. Memory A contains every other pixel pair of image data. Memory B stores every remaining pixel pair of image data, and contains an additional 64K bytes of RAM to store two overlays. One overlay contains light pen annotations and the STATUS line, and the other contains the alphanumeric data that constitutes the catalog. Each requires 32K RAM.

When an image is to be displayed, the digital image data in memories A and B is read and converted to analog data using a 47 MHz ECL D/A converter. The VDG circuitry attempts to display this data continuously. The VDG circuitry also generates timing signals for the horizontal and vertical raster, system, and blanking; turns the STATUS line, main memory display, overlay page and cursor on and off; and displays changes in the cursor location, gray levels and magnification.

Monitor

The monitor 10 is designed to receive analog image data which has been converted into digital form in the VDG 8. This analog image data, together with the timing signals generated by the VDG, are used to generate an image on the monitor screen. Displayed images fill 10.5 in.×10.5 in. of the monitor. The remaining bottom area of the monitor screen is reserved for STATUS information, PROMPT information, a gray-scale bar and a gray-level marker.

Compressor/Expander Set

The compressor/expander circuit 12 perhaps is the key to the success of the teleradiology system. The compressor/expander circuitry compresses digital data by an average of 20:1 and returns the compressed data for storage. Upon request, the compressed data is returned to the compressor/expander circuitry, expanded and sent to the VDG for display. The compressor/expander contains a DMA multibus interface. The internal architecture is primarily a high-speed state machine featuring many small, bipolar PROMs.

SMD Controller

The SMD (Storage Module Device) controller 14 is an intelligent peripheral, containing an 8085 microprocessor for reading and writing data. This board interacts with all system memory and can support up to four 167-MB hard disks 16.

The system stores software, patient data, and image data. The hard disk(s) may be configured to store raw images only, compressed images only, or a combination of both.

Figure 2:
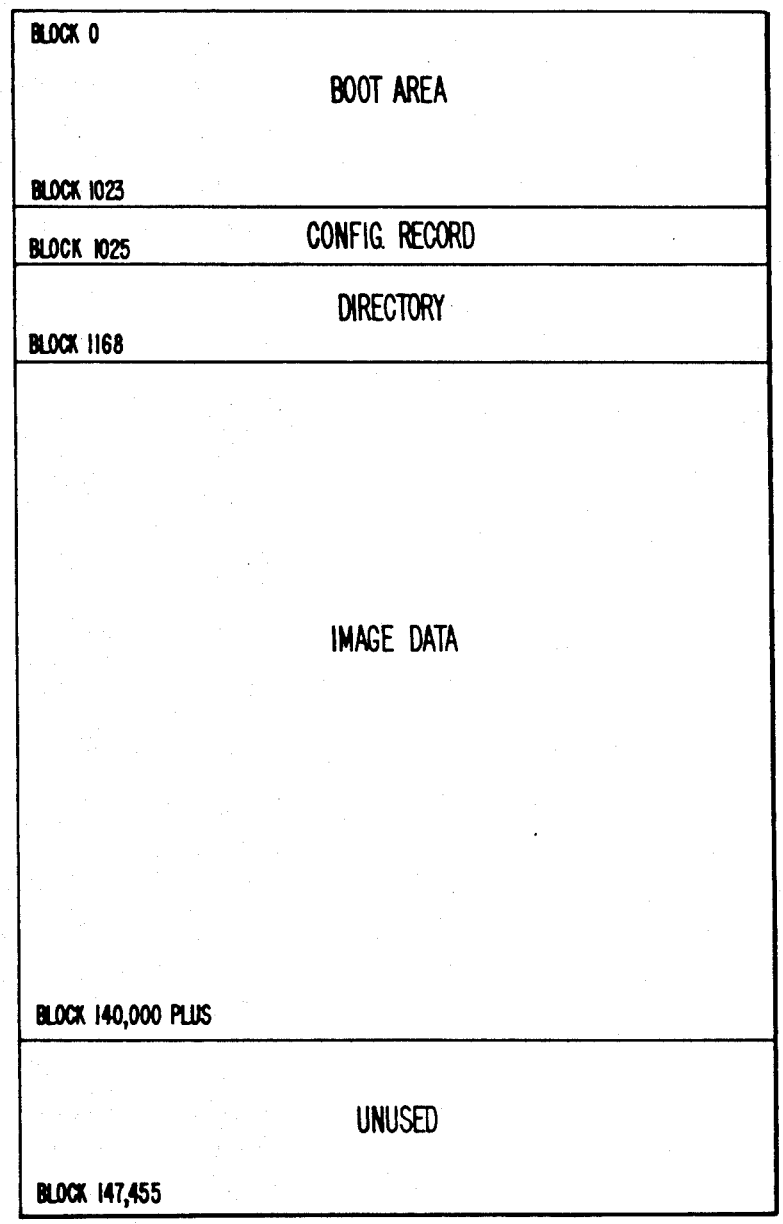
FIG. 2 is a bar chart showing a typical allocation of hard disk memory in a teleradiology system.

Each formatted disk contains 147,456 formatted blocks, with each block containing 1K bytes. The disks are allocated 1024 blocks for the boot area (which contain system software), two blocks for a configuration record, 143 blocks for the directory entries (which contains patient data, overlay flag, and size counts for their associated images), and more than 140,000 blocks for image data storage. A disk configured to store both raw and compressed images contains a boot area, configuration record, compressed image directory, compressed image storage space, raw image directory, and a raw image storage space. FIG. 2 illustrates a hard disk's memory allocation structure.

The software limits the number of compressed images per disk to 1136 and the number of raw images per disk to 136. A split disk may contain up to 64 raw images and 624 compressed images.

CPU

Figure 3A:
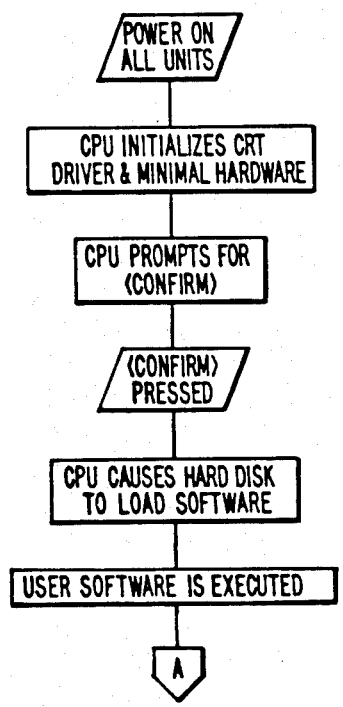
FIGS. 3A-3X show a flow chart illustrating the operation of a central processing unit of a teleradiology system when a single monitor is connected to the system.
Figure 3B:
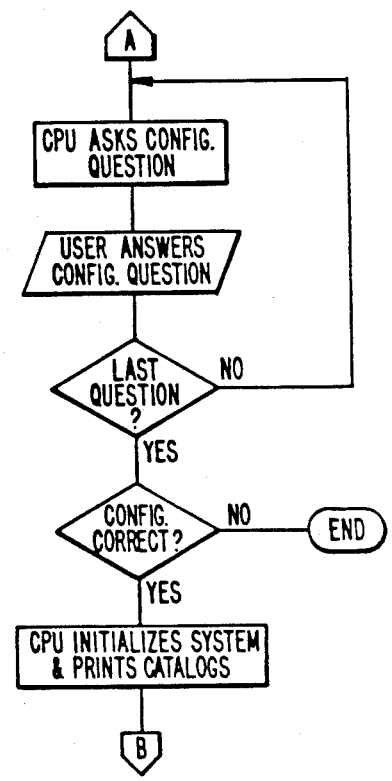
Figure 3C:
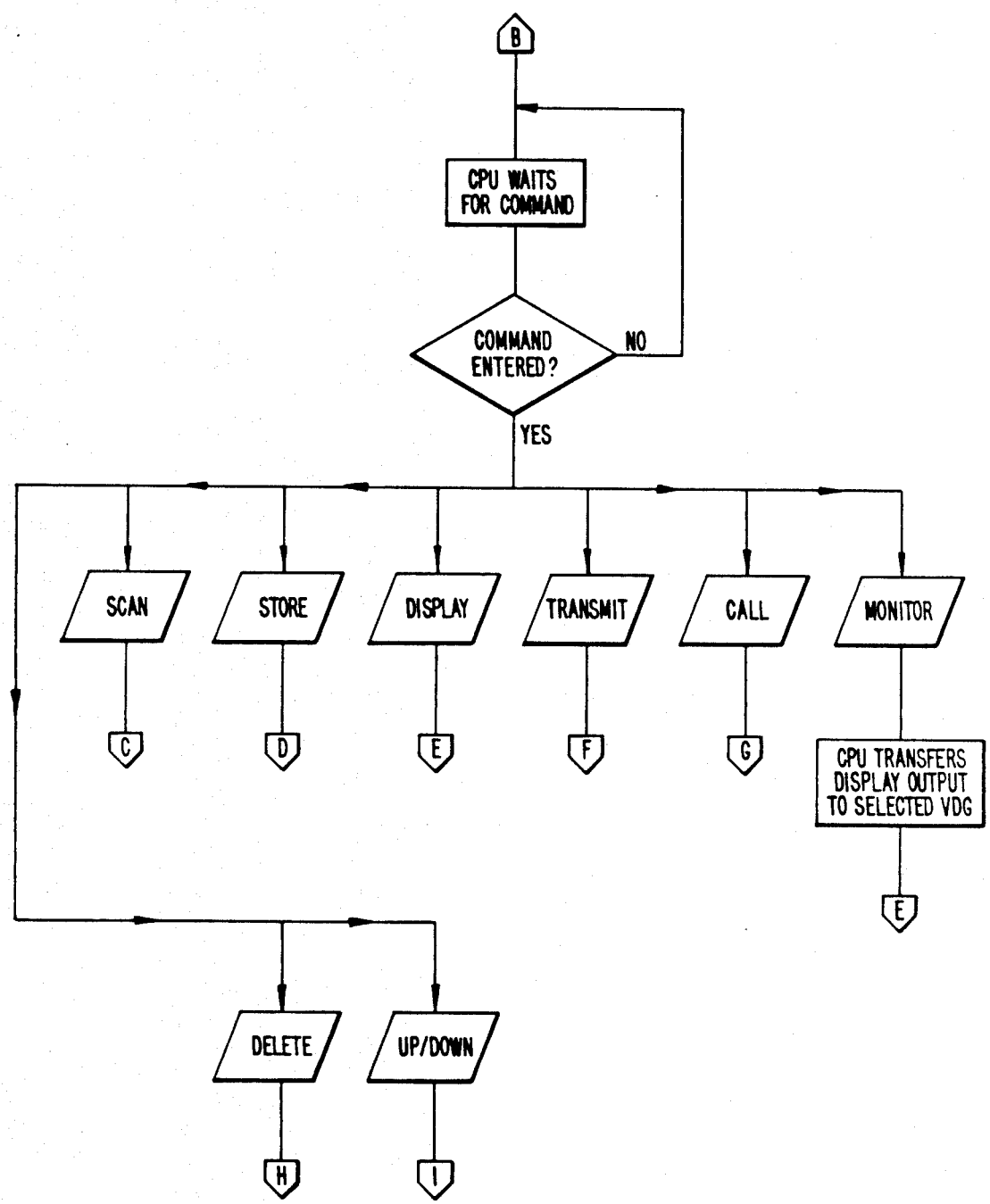
Figure 3D:
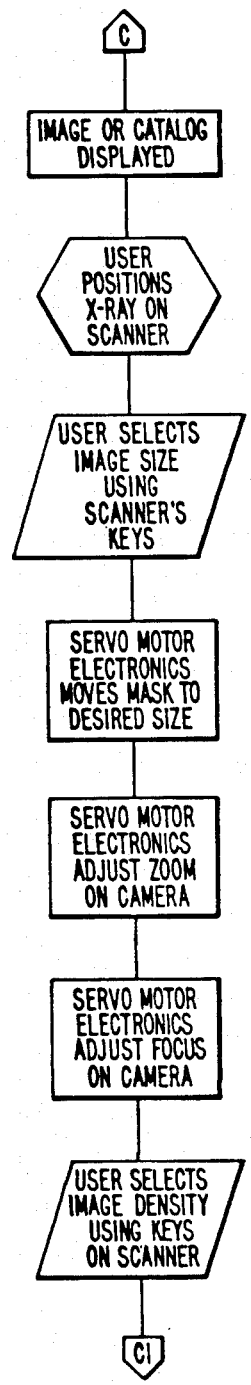
Figure 3F:
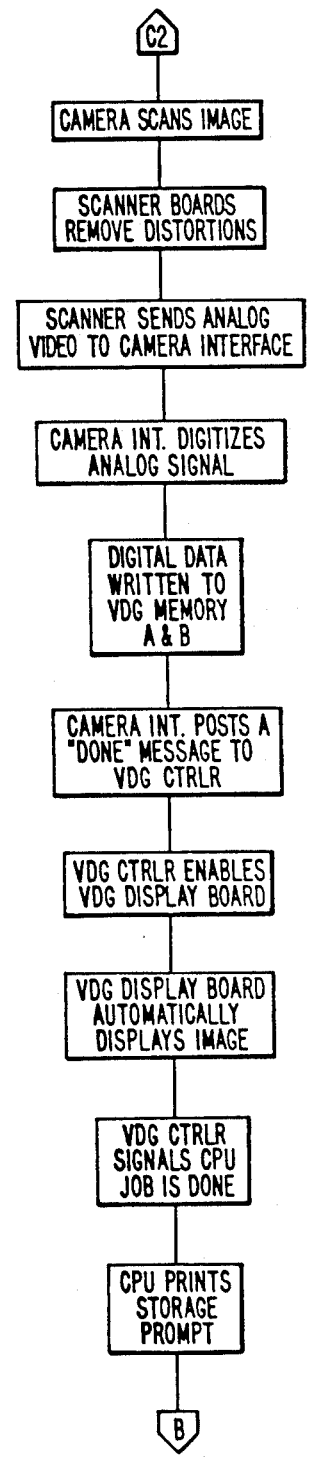
Figure 3E:
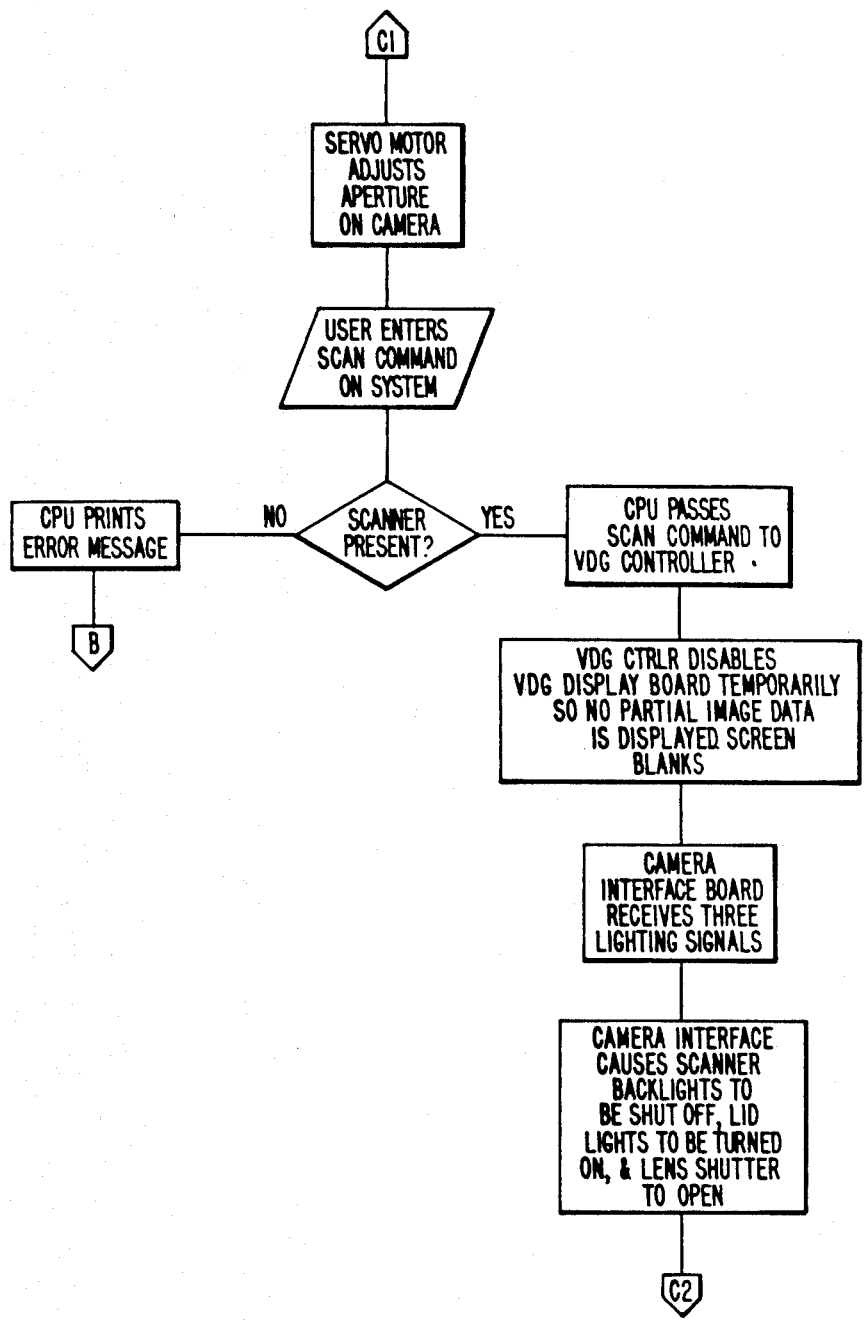
Figure 3G:
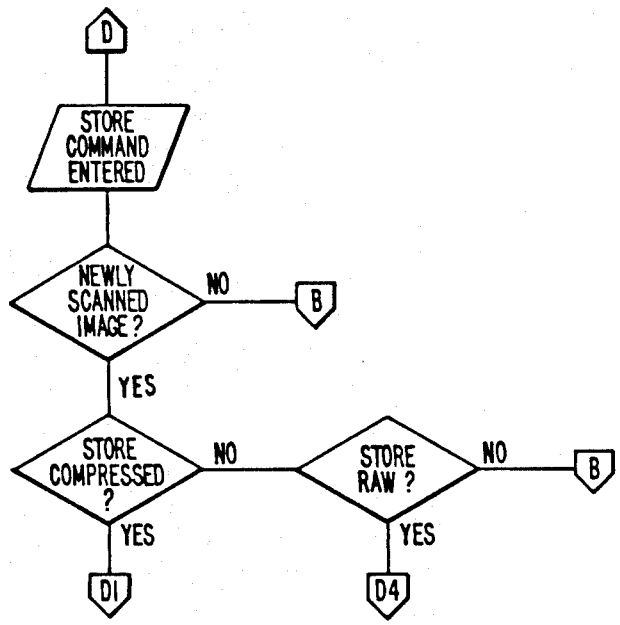
Figure 3H:
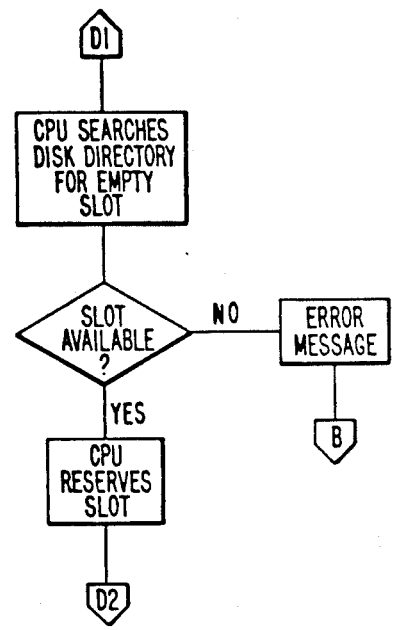
Figure 3K:
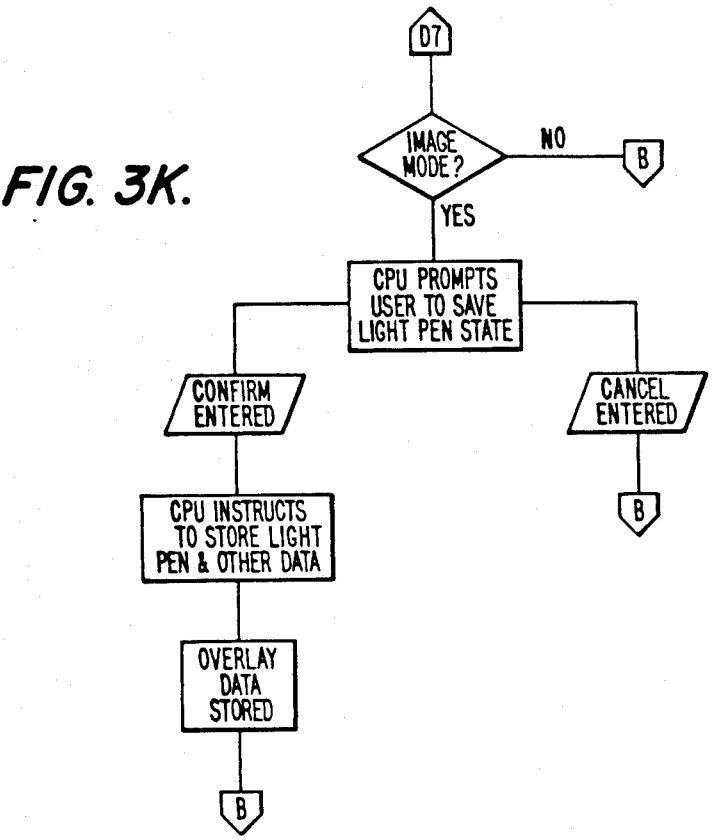
Figure 3I:
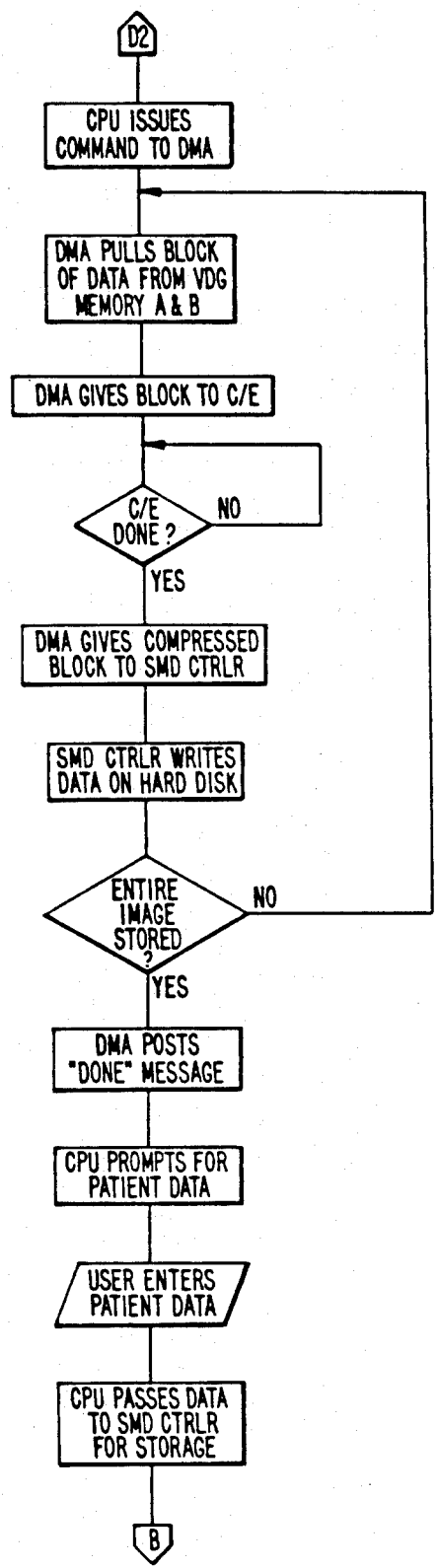
Figure 3J:
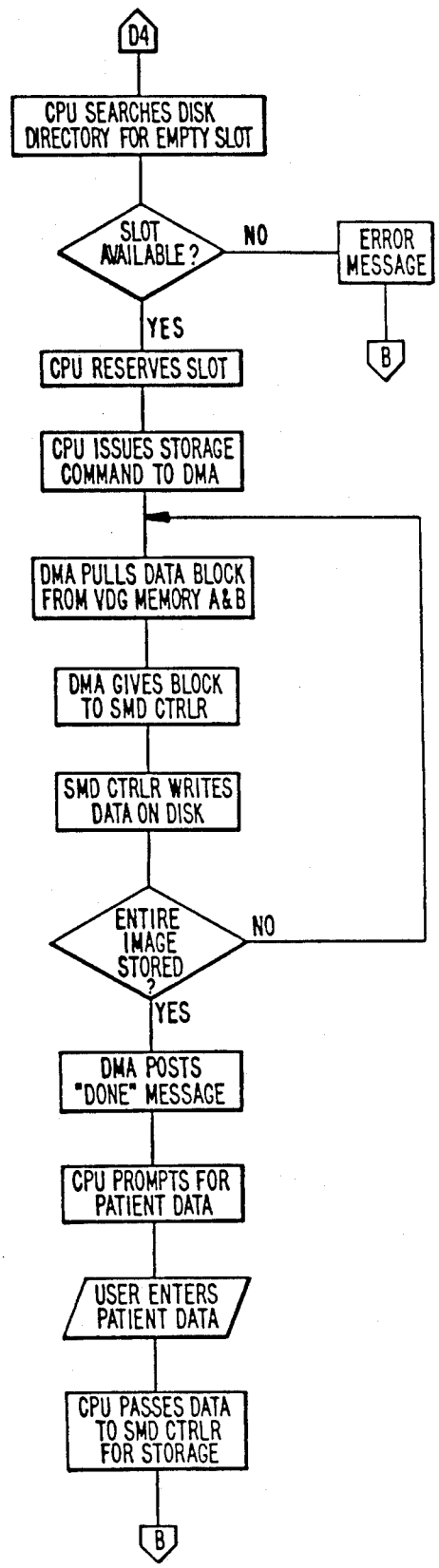
Figure 3L:
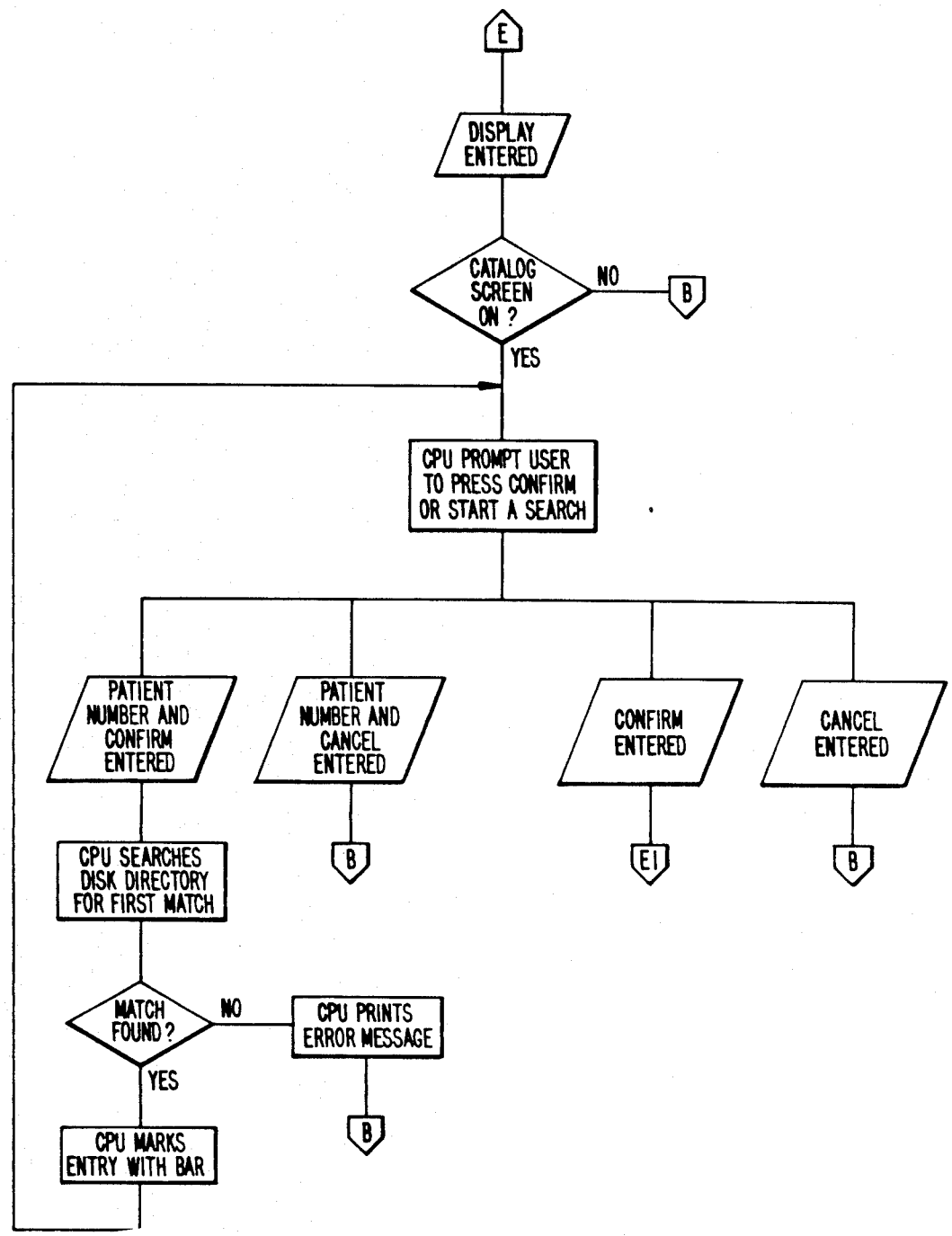
Figure 3M:
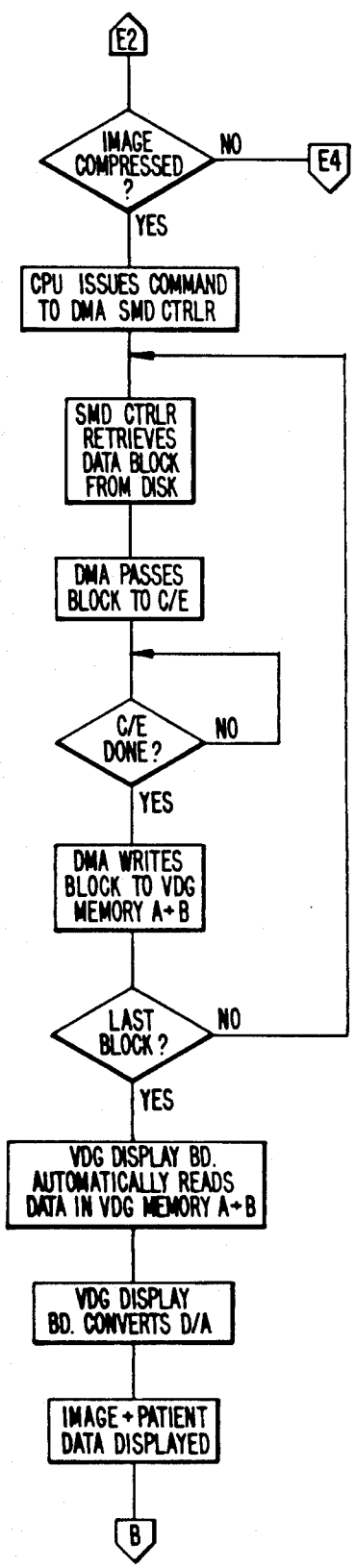
Figure 3N:
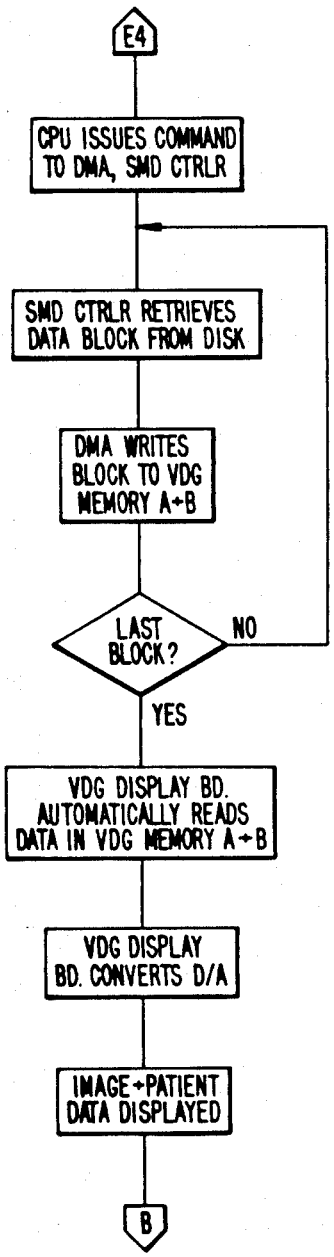
Figure 30:
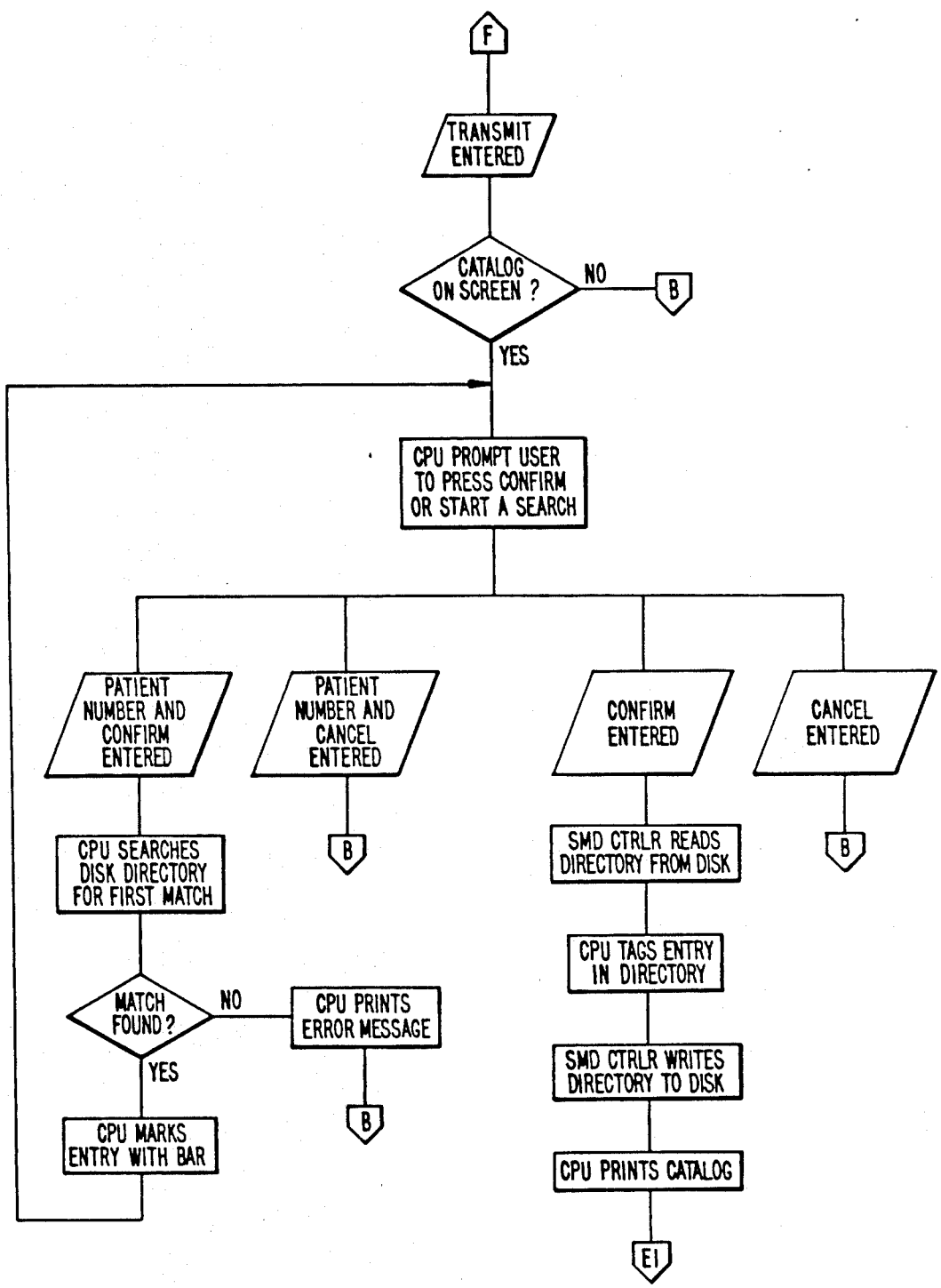
Figure 3P:
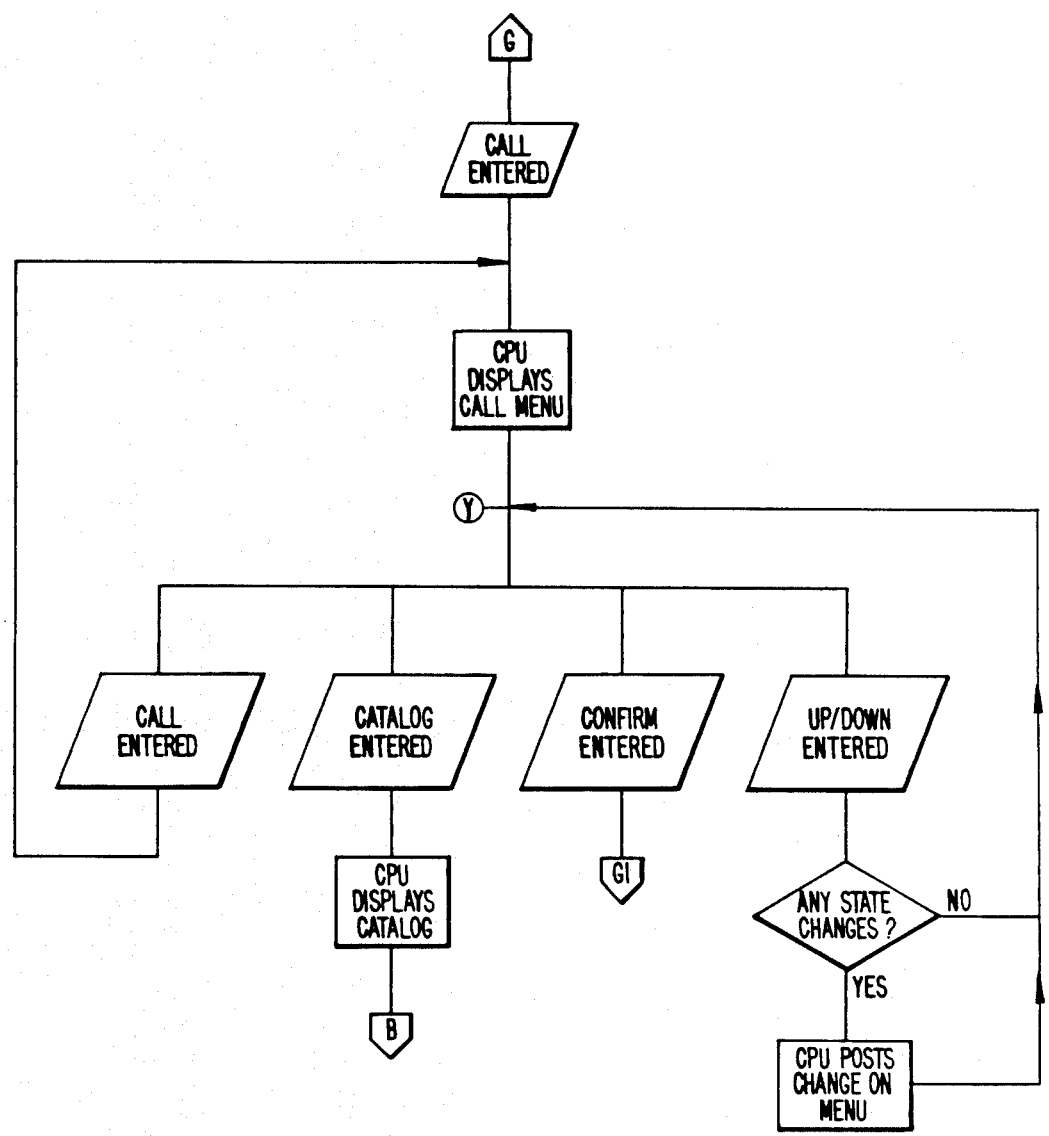
Figure 3Q:
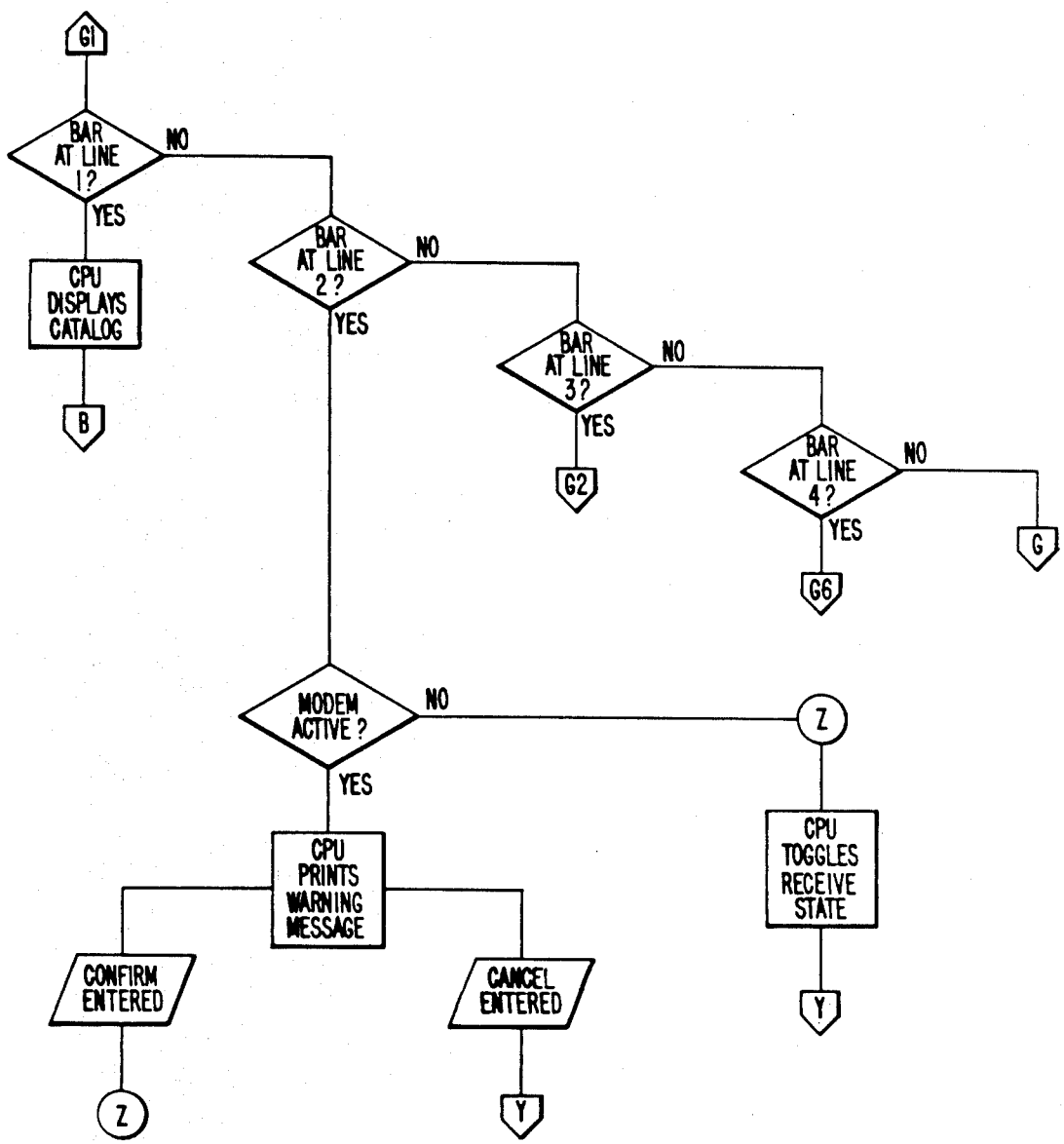
Figure 3R:
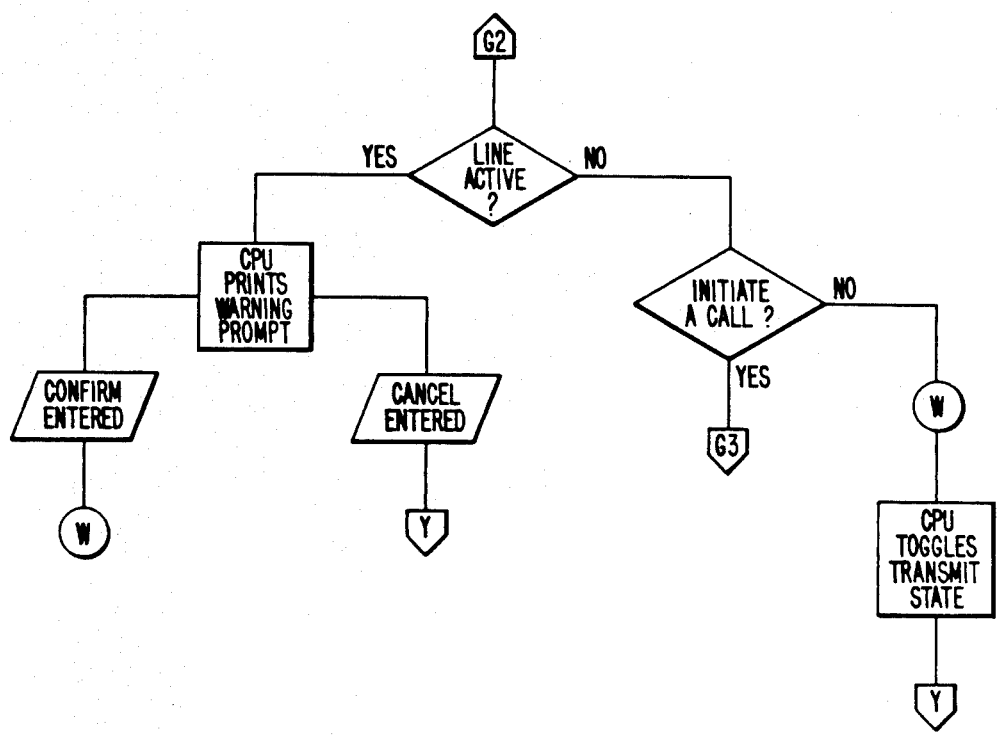
Figure 3S:
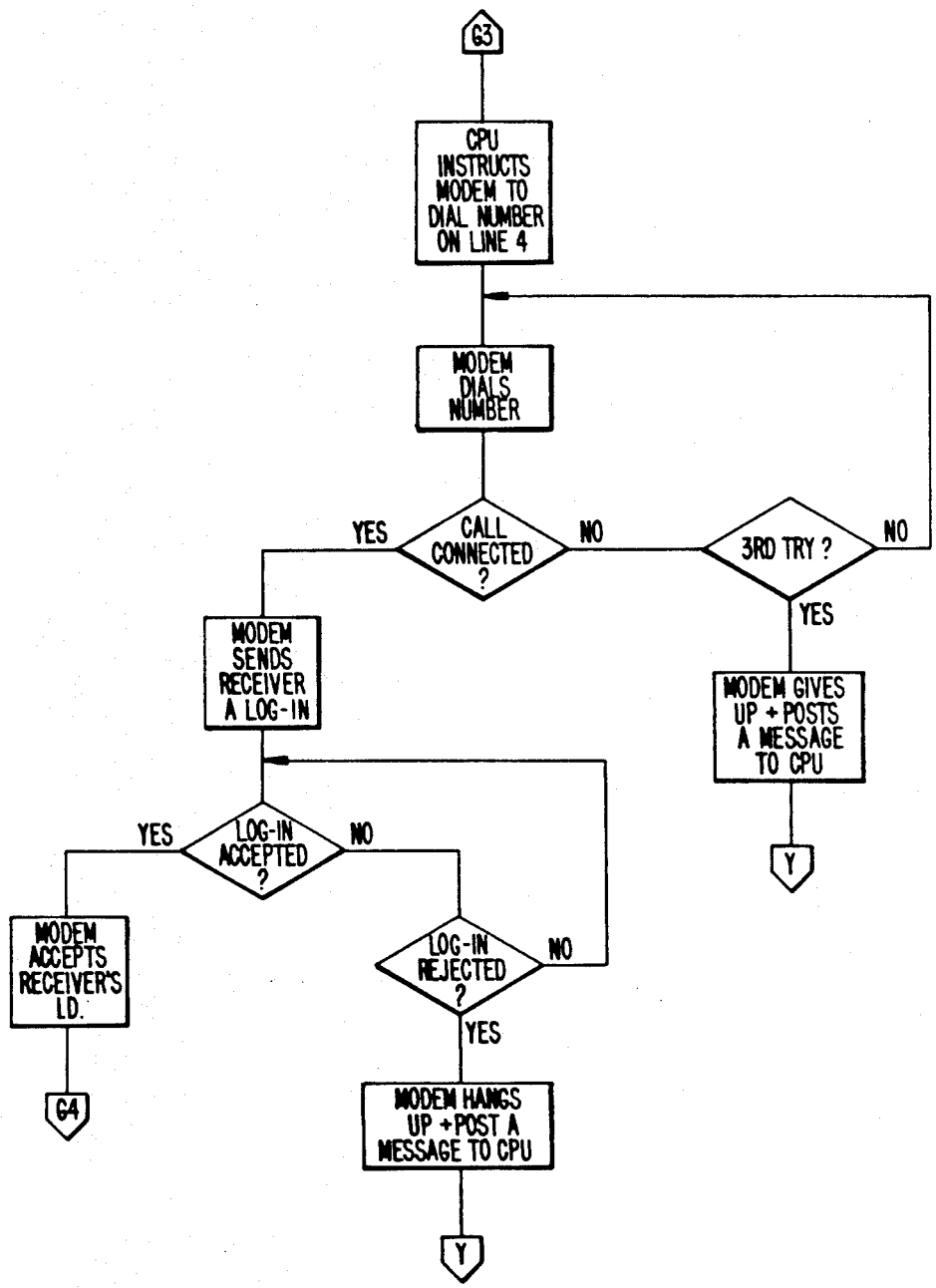
Figure 3T:
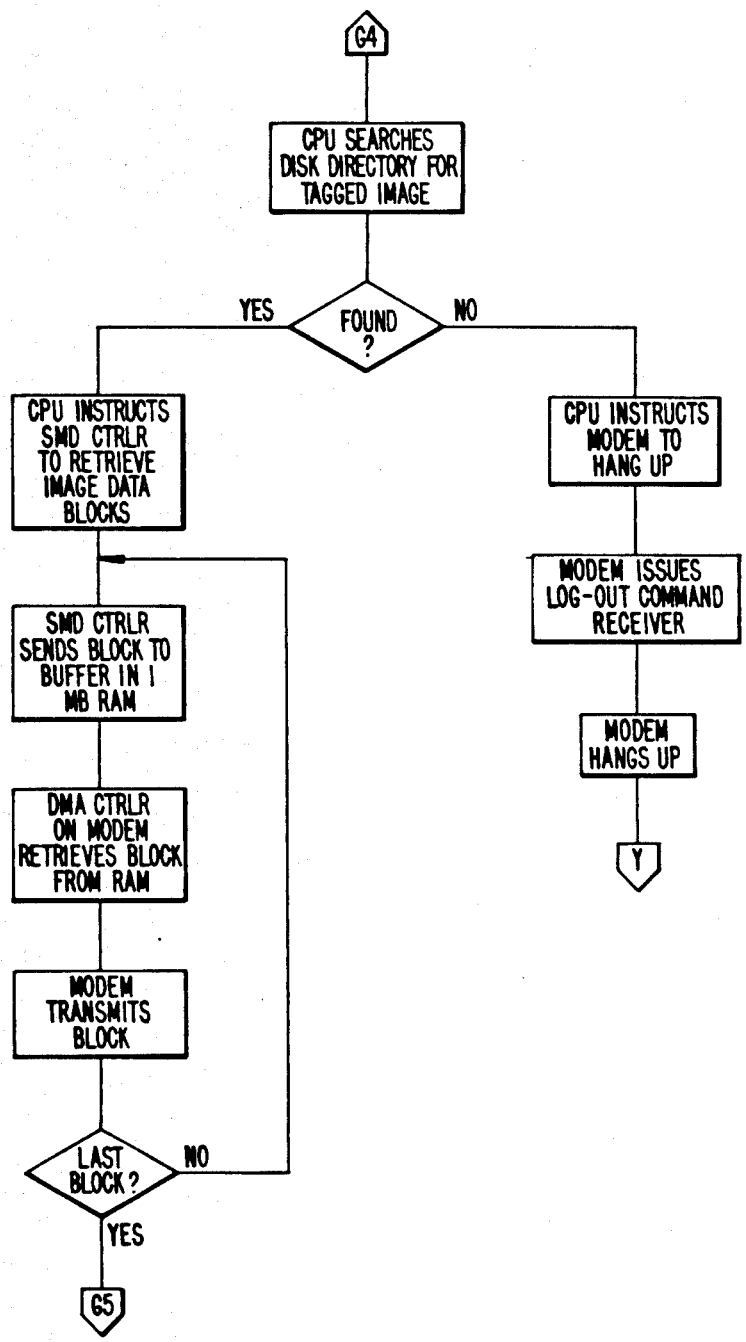
Figure 3U:
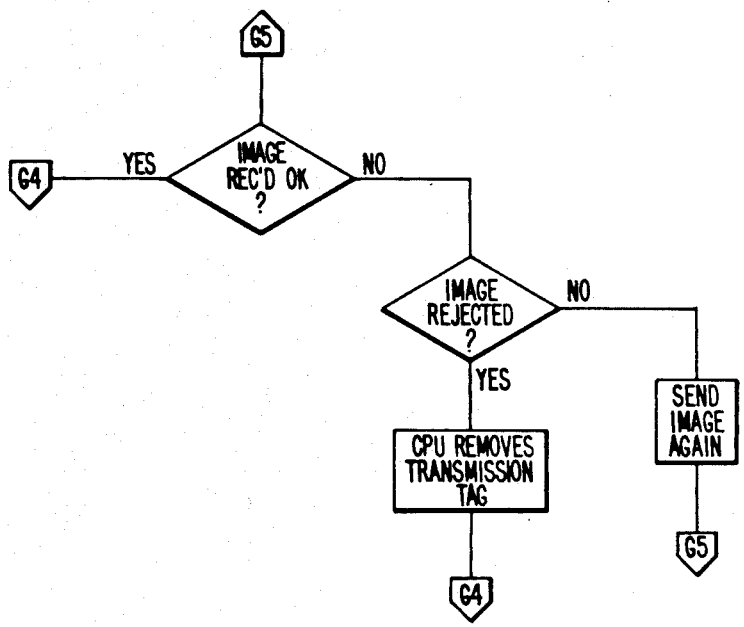
Figure 3V:
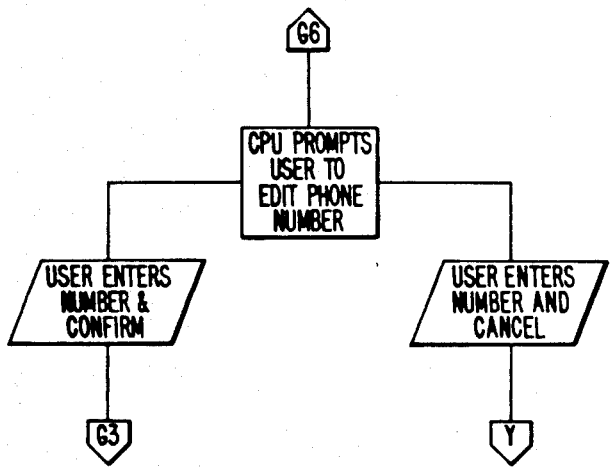
Figure 3W:
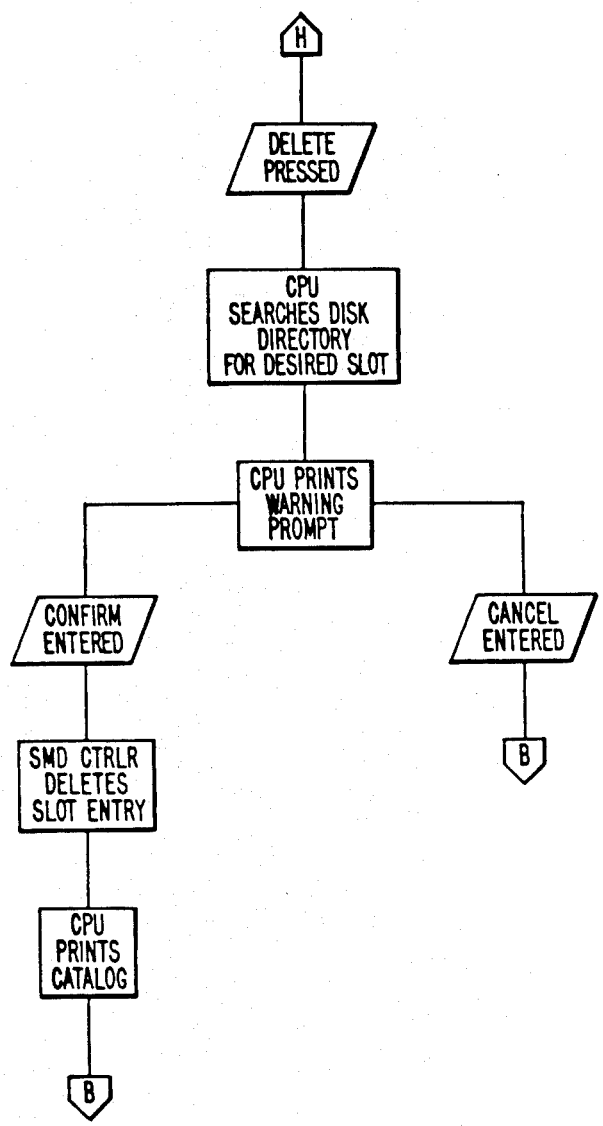
Figure 3X:
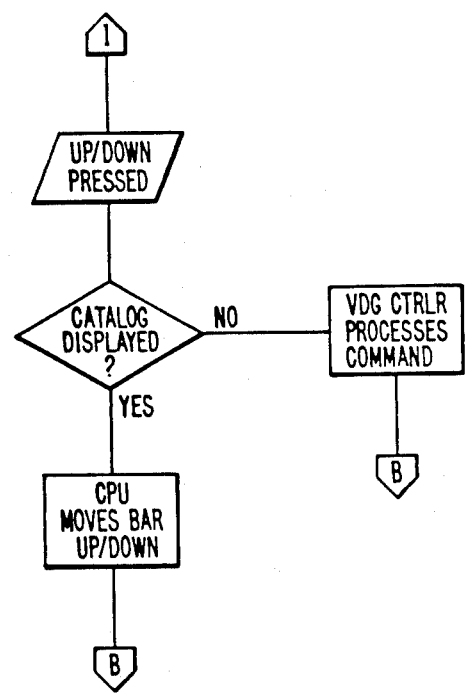

Data transfer between the various components of the teleradiology system is accomplished by a multibus 18. The image scanning, digitizing, compression/expansion and display operations described above are all carried out under the basic supervision of a system CPU 20. CPU 20 may comprise a Motorola 68000. It manages nearly all system functions, interprets most user-entered commands, and instructs other components when and how to perform various functions. CPU 20 contains an interrupt controller and timers for various operations, including log-ins and log-outs Two built-in USARTs (Intel 8274) are available for interfacing with data entry terminal 22. A flow chart illustrating the operation of the CPU when a single monitor 10 is connected to the system can be seen in FIGS. 3A–X. When multiuser operations are considered, point A of the flow chart is considered to be the place where all the different user tasks are forked. From point A to the end of the diagrams, the procedures can be multiple instances, one for each user task. Each user has its own states and sequence of events and it depends on the multitasking process to share the CPU time between each user task. This servicing of all user tasks at appropriate intervals of time gives each user a chance to have his request serviced The interrupt process is also considered a task that is contending for CPU attention and time, but it has higher priority than any other task, and its process flow is different. The interrupt task has specific interfaces to service and pacify the hardware, and it also uses communication "mail boxes" to interface and signal the user tasks properly of events such as: have a new input, sent the output, done the command, new status change, etc. The effects of the interrupt tasks are difficult to visualize in a two dimensional flow chart, but effectively it is a property we can assume the CPU has every time it makes a decision or initiates an operation that affects any hardware in any way. This property can be explained as the fact that the CPU can be executing the normal flow of the program and upon the hardware sending a signal, it can quickly jump to the interrupt service routine, service it and return to the exact point where it left off, to continue with the normal flow.

1-MB RAM

Each host station contains two ½-MB boards of dynamic system RAM 21 that serve as the system scratch pad. When the system is booted, operating and utility software are downloaded from the hard disk(s) 16 to these boards. These boards also temporarily store directory information, data tables, and statistically allocated RAM arrays for hardware resource management. The system software code starts at 1,000 (hex).

DMA

The DMA (Direct Memory Access) board 24 quickly transfers data blocks amongst memory devices, bypassing the CPU 20. The compressor/expander 13, system RAM 26 and VDG memories A and B all interface with the DMA. The DMA also contains 64K static RAM 26, a floppy disk controller 28 capable of supporting up to four floppy disk drives 30, a real-time clock with battery back-up, a hexidecimal display, and four DMA channels.

Remote Mux Drive

The remote mux driver 32 enables the system to drive remote monitors installed up to 1,000 ft. away. The remote mux driver communicates with remote monitors through a 75-ohm coaxial cable. An 8085 microprocessor contained in the remote mux driver can multiplex 16 remote monitors through each of the unit's 16 ports, enabling it to support up to 256 remote monitors.

Remote Monitors

The remote monitors 36 include remote mux receivers which enable the remote monitors to communicate with their host station to receive instructions and retrieve images for display. All interaction with the host station is achieved through a 75-ohm coaxial cable. The remote mux receiver also drives a VDG package.

All commands entered on the remote monitor's keypad are processed through the unit's VDG controller. If the commands do not involve "local" image manipulation functions, the VDG controller passes the information to the remote mux receiver, which routes the data to the system CPU via the remote mux drier.

Modem

Modem 306 dials a user-entered phone number, establishes a link with a compatible system, and transmits and receives digital (text and image) data. Analog (voice) data also can be transmitted or received if desired. Modem board 36 incorporates a half-duplex modem which communicates over standard telephone lines and has a 9600 to 2400 bps data transfer rate. The modem uses QAM (Quadrature Amplitude Modulation) in its 9600 bps forward channel and FSK (Frequency Shift Keying) for its 300 bps reverse channel.

In addition to the half-duplex modem, modem board 36 contains two MPSC (Multiple Protocol Serial Controller) channels for interfacing serial data in the modem with parallel data in the system, and an RPC (Registered Protection Circuitry) to comply with FCC regulations, and a DMA controller to manage data transfers to and from the modem. It recognizes four interrupt signals: tone receiver interrupt (posted when a valid tone is detected), DMA interrupt (posted when the DMA requires service from the CPU), Multiple Protocol Serial Controller interrupt (posted when the MPSC requires CPU service for serial data transfer), and incoming ring interrupt (posted when the external phone network "rings" the modem).

Scanner Electronics

Several of the teleradiology system component circuits will not be described in greater detail. Turning to FIG. 4, the scanner electronics can be seen. The scanner itself, indicated at 50, is a high resolution vidicon camera of the type available from, for example, Syracuse Scientific. Focus, zoom and aperture mechanisms 52, 54 and 56 respectively, under the control of focus, zoom and aperture servos 58, 60 and 62, act in conjunction with a lens 64 and shutter mechanism 68, operated by driver 70, to provide precise image scanning ability. Push button control module 66 allows manual selection of the zoom and focus settings.

The image to be scanned is placed on a transparent support (not shown) in the area generally indicated at 72. Back lighting of the image is provided by a back lighting bank 74 while shadowing and other distortion inducing phenomena are eliminated for the use of a front lighting bank 76. The ballast electronics for back and front lighting banks 74 and 76 is provided by a ballast electronics current 78. A set of curtains 80 respectively adjustable in two directions are employed as a mask to block unwanted light from passing around the edges of the image during scanning. One set of curtains is adjustable in the X direction by an X-mask servo 82 under the command of the push button control module 66. A second set of curtains 80 is adjustable in the Y direction by a manually operated Y-drive mechanism 84.

When an image is to be scanned, the image is supported in work area 72, and curtains 80 are adjusted to frame the image area of interest. Focus, zoom and shutter mechanisms 52, 54 and 56 are adjusted to appropriate settings, and camera 50 begins its scan. Analog video signals containing image information are output from camera 50 and log amplified in a log amplifier 86 to eliminate distortions inherent in the composite analog video signals. Sync signals are stripped, leaving only the composite video signals and blanking signals. A low-pass video filter 88 then processes the video signals to eliminate all frequency components above a selected value, say, 4 MHz. The video signals are finally transported along a coaxial cable to the camera interface board.

Figure 5A:
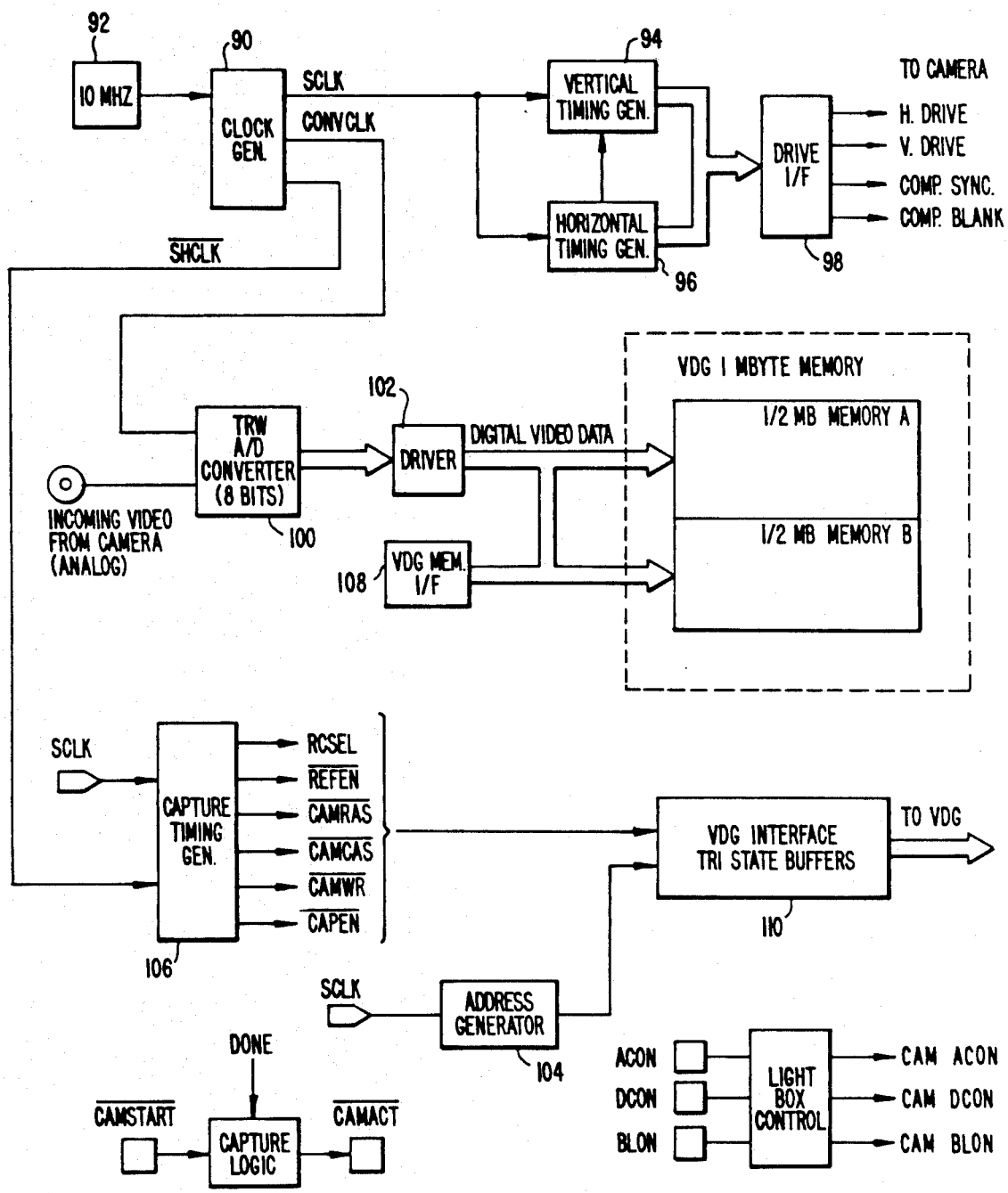
FIG. 5A shows a block diagram of a camera interface.
Figure 5B:
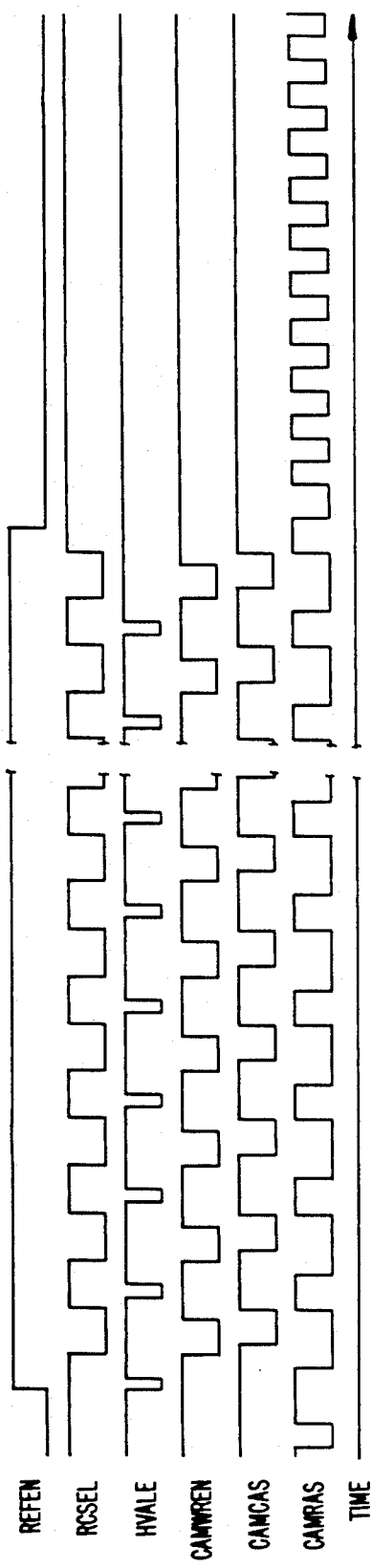
FIG. 5B shows the timing sequence of various control signals associated with the scanning operation.

Camera Interface Electronics:

FIG. 5A is a block diagram of camera interface 6. The camera interface is responsible for controlling the actual camera scan of an image and for coordinating between the camera scan and the memory storage operation in the VDG 8.

The camera interface board includes a clock generator 90 driven by a 10 MHz oscillator 92 to generate a series of timing signals SCLK, CONVCLK and /SCHLK. The SCLK drives a vertical timing generator 94 and a horizontal timing generator 96 to provide the composite blanking, composite sync, vertical drive and horizontal drive signals utilized by camera 50 in the scanner. These signals are passed through a drive interface 98 before actually reaching the camera. The incoming video signals from the camera, containing the image information associated with the image being scanned, are input to an eight bit A-to-D converter 100, which is clocked by the CONVCLK signal output from clock generator 90. The output from the A-to-D converter 100, which comprise eight bit words or pixels containing image information in digitized form, are directed through a driver 102 to the VDG memory, here indicated schematically as memory A and memory B.

Inasmuch as storage of the pixels in the VDG memory must be coordinated with the operation of camera 50 during image scanning, control signals for accessing the VDG memory and for updating the system CPU 20 on the status of the scanning operation must be initiated on the camera interface board. To this end, the camera interface board additionally includes an address generator 104, a capture timing generator 106 and a VDG memory interface 108. Address generator 104 functions to generate the VDG memory addresses during the pixel storage operation. In particular, address generator 104 acts as a counter to keep track of the location in the VDG memory where the next pixel from A-to-D converter 100 is going to be stored. Synchronization of the pixel storage operation with the camera line scanning operation is achieved by using the SCLK signal from clock generator 90 to clock the address generator 104. Such synchronization ensures that a direct correspondence is maintained between the location of image information on the image undergoing scanning and the VDG memory storage location into which the image information, now in the form of pixels, is mapped. Address outputs from address generator 104 are directed through a VDG interface 110 comprised of tri-state buffers (not shown) and on to the VDG 8.

Figure 6:
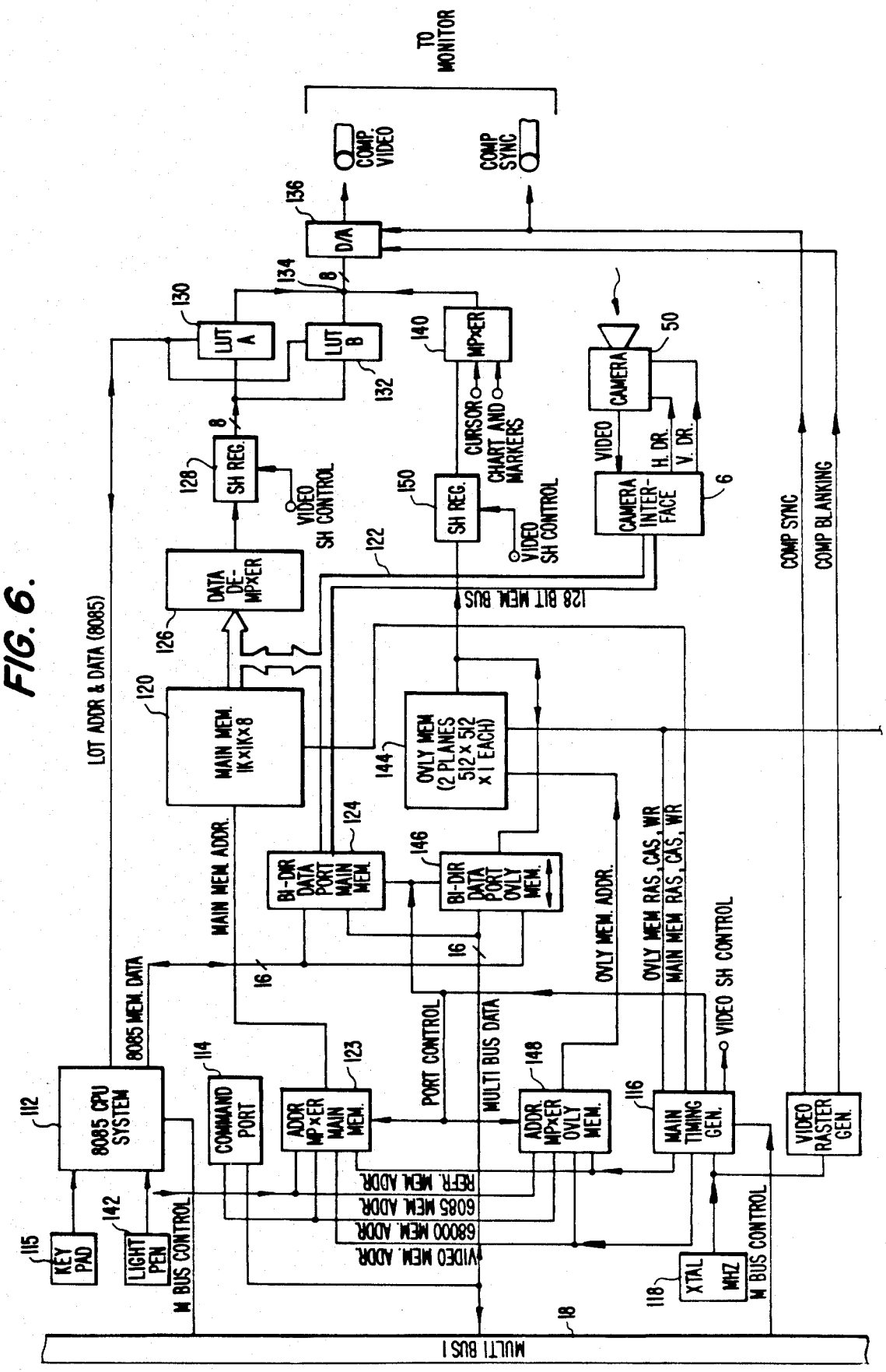
FIG. 6 shows a block diagram of the video display generator.

The capture timing generator 106, which is also clocked by the SCLK signal from clock generator 90, outputs a series of control signals through the VDG interface 110 to the VDG 8. These control signals, which provide scan information, e.g., indicate the start of a scanning operation, completion of a scanning operation, the capture of data during a horizontal line scan, and the like, are used by both the VDG and the system CPU to track the status of the camera scanning operation. Finally, a set of control signals, i.e., a column address strobe, a row address strobe, load signal, a read/write signal and VDG memory buffer address signals, are generated in the VDG memory interface 108 for use by the VDG in controlling the memory storage operation during scanning VDG Electronics:

The VDG 8 is shown in block schematic form in FIG. 6. As described above, video signals from camera 50 are received at the camera interface 6, digitized into pixels and directed to the VDG memories A and B. Control over the operations of the VDG is exercised by a VDG CPU 112, which may comprise an Intel 8085 CPU. CPU 112 communicates with the system CPU 20 via a command port 114. VDG timing is provided by a main timing generator 116 driven by a crystal oscillator 118. VDG memories A and B, which is FIG. 6 are shown as two ½ MB sections of a 1K×8 bit ported main memory 120, are connected to camera interface 6 via a 128 bit memory bus 122. Pixel information obtained from the image scanning operation is stored in 16×16 pixel "blocks," with every pixel pair in a block being alternately stored in one of the two halves of main memory 120 (i.e, being alternately stored in memories A and B) according to addresses supplied to main memory 120 from CPU 112 via main memory address multiplexer 123. When all of the pixel blocks for an image undergoing scanning have been assembled in main memory 120, they can be routed through a bidirectional main memory data port 124 to multibus 18 for compression and/or storage, as will be described below.

The pixels in each pixel block can also be read out of main memory 120 for conversion back into analog video signals which can then be used to reconstruct th image on a monitor such as monitor 10. Sixteen consecutive pixels can be read out of main memory 120 in parallel, and a data demultiplexer 126 connected to a shift register 128 is necessary to enable serial registration of each 8 bit wide pixel. From shift register 128, the pixels are sent to two 256K×8 bit RAMs 130 and 132, which contain gray scale and log correction look-up tables (LUTs). The gray scale tables permit gray scale manipulation or stretching, allowing the system user to lighten or darken the image on the system monitors. The log correction look-up tables supply an analog correction factor to compensate for the logarithmic amplification of the video signals which took place in scanner 4 during the image scanning operation. In this manner, the energy distribution over the black and white spectrum of the image can be evened out to enhance image quality.

Addressing for the look-up tables in RAMs 130 and 132 is initiated in the VDG CPU in accordance with gray scale manipulation structures entered into the CPU via keypad 126. The outputs from RAMs 130 and 132 are wire-'ored' through junction 134 to a digital-to-analog converter 136, where the pixels are converted to analog form to furnish the composite video signals used by the system monitor to generate the image display. Composite sync and composite blanking signals for the system monitor, meanwhile, are generated by a video raster generator 138 clocked by crystal oscillator 118. A raster generator 138 also generates a cursor display and a gray-scale chart which can be displayed at the bottom of the image on the system monitor screen for comparison purposes. A cursor and gray scale information are directed through a multiplexer 140 to the wire-'ored' junction 134 and the digital-to-analog converter 136.

If desired, a light pen 142 may be connected to the VDG CPU 112 to provide the system user with image marking capability. The light pen markings are stored in one plane of a two plane, 64K overlay memory 144. The output from the light pen is processed in the VDG CPU and directed through a bidirectional overlay memory data port 146 to an overlay memory address location which has been selected by the VDG CPU and fed to the overlay memory through an overlay memory address multiplexer 148. Because the light pen information is either white or black, each bit stored in the first memory plane of the overlay memory 144 can represent two pixels. One pixel associated with a zero bit indicative of, e.g., black, and the other pixel associated with a one bit indicative of, e.g., white. When the light pen information is to be reconstructed on the display of the system monitor 10, eight bits or sixteen pixels of light pen information are serially read from the first memory plane into a shift register 150 clocked by the main timing generator 116. The output of shift register 150 passes through multiplexer 140 and wire-'ored' junction 134 to the digital-to-analog converter 136 for inclusion in the composite video signal sent to the system monitor.

Finally, the VDG board is capable of processing alphanumeric character information for display on the system monitors. This character information, which may, for example, comprise a catalog for identifying the various images stored in the system memory, is itself stored in the system memory in ASCII code. When a catalog button on keypad 115 is pressed, an instruction is sent through the command port 114 to the system CPU 20 and the system CPU in turn retrieves the catalog from memory. Catalog information is sent over multibus 18 to the VDG CPU 112. The VDG CPU contains a character ROM for converting the ASCII code into pixels containing the alphanumeric character information. These character pixels are written through the bidirectional overlay memory data port 146 into the second plane of the overlay memory 144. Addresses for the character pixel are again obtained from the VDG CPU via the overlay memory address multiplexer 148. As was the case with the light pen information, each bit of the digitized character information represents two pixels. Eight bits at a time are read from the second plane of the overlay memory to establish a sixteen pixel serial stream which is loaded into shift register 150 and passed on through multiplexer 140, wire-'ored' junction 134 and digital-to-analog converter 136 to provide the composite video signals for generating the alphanumric character display on the system monitors.

Figure 7A:
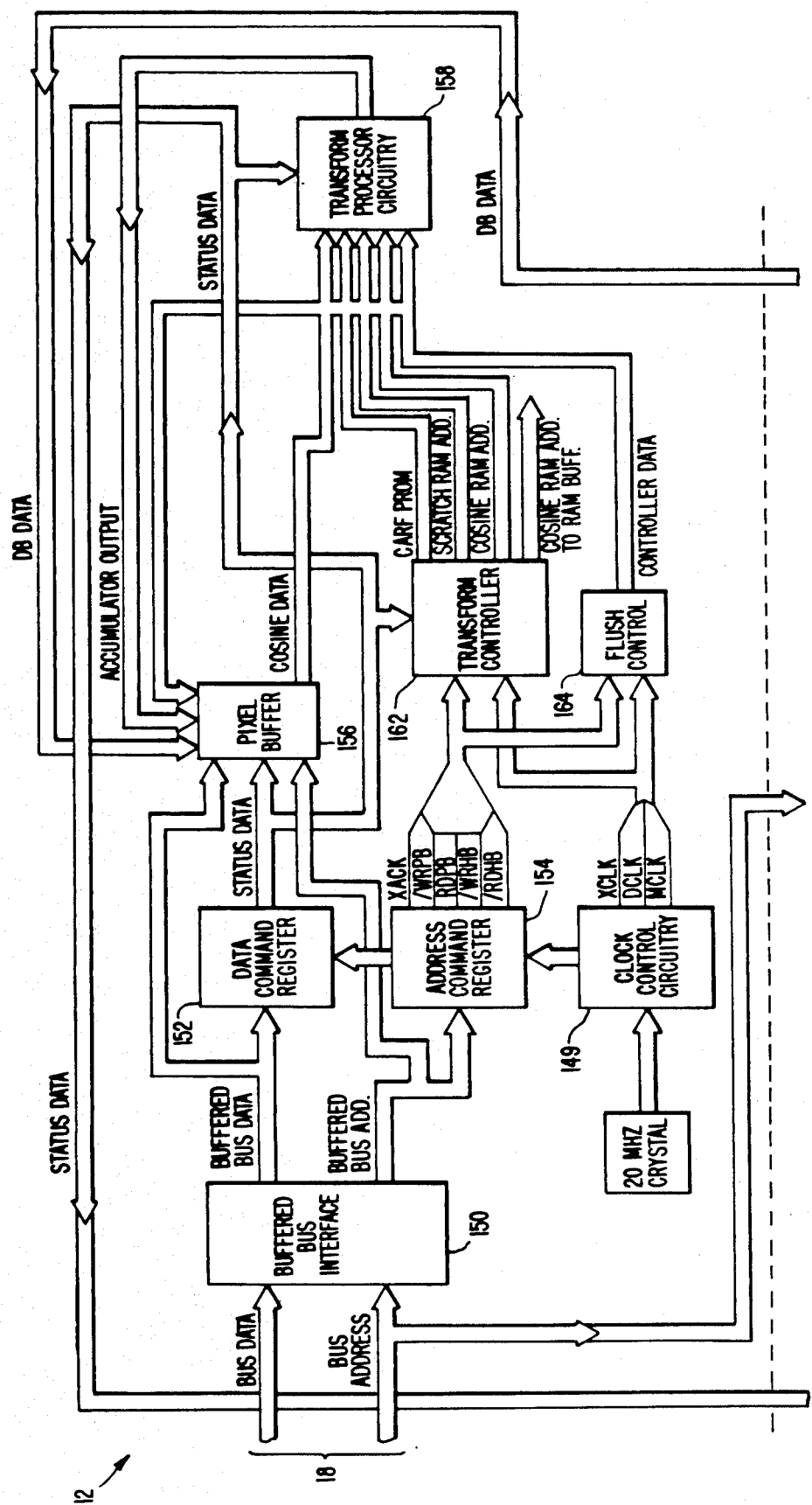
FIGS. 7A*a* and 7A*b* show a block diagram of a compressor/expander.

Compressor/Expander Electronics:

The compressor/expander 12 of the present invention is schematically depicted in the data flow chart of FIG. 7A and in the detailed circuit schematics and the timing charts of FIGS. 8 through 23. Turning first to FIG. 7A, image data in the form of pixels, command data and address data are received from the system multibus 18 at a buffered bus interface 150. The command data and address data are generated by the system CPU 20. The image data may come directly from VDG8, or it may be called up from the system memory 16 by the system CPU 20. Buffered data from interface 150 is sent from either a data command register 152, an address register 154 or a pixel buffer 156, depending upon whether the data contains command information, address information or pixel information. The data command register 152, for example, receives command data, in response outputting a series of status signals indicative of operational status of the compressor/expander. Data command register 152 additionally functions to output a series of three signals which collectively represent the distortion value associated with a given pixel block, as determined by the system CPU. Address command register 154, meanwhile, receives address data and generates a series of control signals which govern the reading and writing of image data between various components of the compressor/expander during image transform processing.

Pixel buffer 156, which is supplied both image data and address data from buffered bus interface 150 as well as status signals from data command register 152, basically functions to store both uncompressed and compressed pixels prior to transform processing. As will be discussed in greater detail below, the pixel buffer comprises a series of 256×4 bit RAMs arranged in interleaved fashion to permit simultaneous storage of two separate pixel blocks. During the compression mode of compressor/expander operation, pixels from a uncompressed pixel block may be loaded into the pixel buffer from the VDG memory, Direct Memory Access (DMA) 24 or the system CPU 20 via the buffered bus interface. Selection of storage locations to receive the uncompressed pixel block being loaded is carried out by the buffered address data from the buffered bus interface. When two adjacent pixel blocks from a scanned image have been so loaded, individual pixels from a selected one of the blocks are output to a transform processor circuit 158 in preparation for cosine transform compression. As the cosine transform processing is completed for each pixel in the selected block, the now-compressed pixel is routed back through the pixel buffer to a dual buffer 160 for subsequent Huffman encoding, as will be described shortly. Simultaneously, a pixel from a corresponding application in the remaining pixel block is output to the transform circuit to replace the pixel which has just been compressed.

During the expansion mode of compressor/expander operation, pixels from a decoded, compressed pixel block are returned from dual buffer 156 through the pixel buffer 166 and loaded into transform process circuit 158 to await reverse transform processing while information from a previously loaded pixel block is expanded by the transform processing circuit, using the reverse cosine transform, and loaded back into the pixel buffer to await removal from the compressor/expander.

Cosine transform and reverse transform processing is actually accomplished in the transform processor circuit 158 under the control of a transform controller 162. Transform processor circuitry 158 in particular implements a series of multiplications and additions using the image data stored at each of the two hundred and fifty-six locations of the pixel block obtained from pixel buffer 156. In the compression mode of operation, of course, the image data at the pixel block locations comprise eight bit pixels obtained from the image being compressed. A two dimensional cosine transform such as that disclosed in Tescher, "Transform Image Coding," *Advances in Electronics and Electron Physics*, Supplement 12, 1979, incorporated herein by reference, is performed on the pixel block. Each pixel is extended to sixteen bits during the transform by adding zeros to the least significant end of the pixel value. As a result, the transform yields a 16×16 block of image information comprising the image DC component and image AC frequency components. The sixteen bit value representing the DC component of the original image is contained at one corner of the block and the sixteen bit value representing the highest AC frequency component of the image is contained at the opposite corner of the block.

The cosine transform computations outlined in the aforementioned Tescher reference are carried out by repeatedly passing through each row or column of pixel block locations and calculating the "next values" for each pair of sixteen bit values contiguously located along the rows and columns of the pixel block, using cosine transformation equations (1) and (2):

$$\text{next } P = K1 \times \text{present } P + K2 \times \text{present } Q \qquad (1)$$

$$\text{next } Q = K3 \times \text{present } P + K4 \times \text{present } Q \qquad (2)$$

where K1 through K4 are coefficients derived from the cosine transformation equations and P and Q respectively represent the two sixteen bit values at each pair of continuous pixel block row or column locations. During a PHASE 1 cycle of the compression operation, six passes of each pixel block row are made, with the present values of P and Q for each pair of contiguous row locations on the first pass being obtained from the actual image pixels of the pixel block undergoing compression. After the sixth row pass is completed, a PHASE 2 cycle occurs and six passes of each pixel block column are made, again using Equations (1) and (2) to derive "next values" for each sixteen bit value in the columns during each pass. On the sixth pass of each column, coefficients K1 through K4 are selected to represent the cosine transformation coefficients otherwise associated with the sixth column pass multiplied by a scaling factor determined as a function of a pixel block "distortion factor." This "distortion factor" is a value which has been determined in accordance with a desired compression ratio, stored in the system CPU 20 and supplied to compressor/expander during compression and expansion operations. The "next values" of P and Q thus obtained, which represent the fully transformed pixel information for that column, are bussed through pixel buffer 156 to dual buffer 160 in preparation for subsequent Huffman encoding, while pixel values from the corresponding column of the next pixel block to be compressed are unloaded from pixel buffer 156 into the transform processor circuit 158. In this manner, when the sixth pass on the final column of the pixel block being compressed is completed, an entire new pixel block will have been loaded into the transform processor circuit and made ready for cosine transformation processing.

During the expansion mode of compressor/expander operation, compressed image information which has been Huffman decoded is routed from dual buffer 160 through pixel buffer 156 to transform processor circuit 158, where Equations (1) and (2) are again utilized to perform consecutive passes over rows and columns of sixteen bit values representing the image DC component and AC frequency components in each pixel block. The order of the passes, however, is reversed relative to the compression operation. That is, in the PHASE 1 cycle six passes in each column are performed to obtain the "next values" of P and Q according to Equations (1) and (2) whereas six passes of each row in the pixel block are performed in the PHASE 2 cycle. Coefficients K1 through K4 used in the reverse transformation process are selected for each iteration of Equation (1) and (2). On the first pass of the first column transformed during the PHASE 1 cycle of the expansion operation, these coefficients represent the K1 through K4 coefficients otherwise associated with the first pass multiplied by a descaling factor, which descaling factor is the inverse of the scaling factor employed during compression of the pixel block. On the last pass of each row in the pixel block, the resulting sixteen bit pixel values from the pixel block undergoing the expansion are sent seriatim to the pixel buffer for output on the multibus 18 and new sixteen bit values from the corresponding column of the next pixel block to be expanded are input from the dual buffer 160 to the transform processor circuit 158 through the pixel buffer 156.

Simultaneous transfers of image information between the pixel buffer, the transform processor circuit and the dual buffer for two different pixel blocks during the compression mode of compressor/expander operation are enabled by using the same pixel block address to address the pixel buffer, the transform processor circuit and the dual buffer on the last PHASE 2 pass of each column in the pixel block undergoing compression. In similar fashion, simultaneous transfer of image information between the dual buffer, the transform processor circuit and the pixel buffer for two separate pixel blocks during the expansion mode of operation is enabled by using the same pixel block address to access the dual buffer, the transform processor circuitry and the pixel buffer on the last PHASE 2 pass of each row in the pixel block undergoing expansion. All of this addressing is initiated by the transform controller 162. The precise pixel block address necessary to effect common accessing of the pixel buffer, the dual buffer and the transform processor circuit for a given pixel block location is output from the transform controller as the COSINE RAM ADDRESS. The transform controller additionally generates a COSINE RAM ADDRESS and a SCRATCH RAM ADDRESS to organize the storage location in the transform processor circuit during the computation of an intermediate "next value" for P or Q on all of the PHASE 1 cycle passes of the pixel block rows or columns and on the first five PHASE 2 cycle passes of the pixel block rows or columns. Selection of the appropriate coefficients K1 through K4 for iteration of Equations (1) and (2) in all of the passes for both the PHASE 1 and PHASE 2 cycles is made on the basis of a COEFFICIENT PROM ADDRESS generated by the transform controller.

Because of the simultaneous transfers of image information between the pixel buffer, the dual buffer and the transform processor circuit, the start-up of the compression or expansion operation for each image must be managed so that useless or erroneous data is not output from the compressor/expander. A flush control circuit 164 is designed for this purpose. When a start-up for a compression operation is initiated, i.e., when the first pixel block of an image undergoing compression assembled in the pixel buffer and is ready for transform processing, flush control circuit 164 prevents the transfer of data from the transform processor circuit to the dual buffer until the pixels from the pixel block undergoing compression are fully loaded into the transform processor circuit. When a start-up in the expansion mode is initiated, i.e., when the first pixel block from the image undergoing expansion is ready for transfer from dual buffer 160 to transfer processor circuit 158, the flush control circuit prevents transfer of data between the transform processor circuit and pixel buffer 156 until the transform processor circuit is fully loaded with all of the useful data from the first pixel block to be expanded. Flush control circuit 164 must also be active during the shut-down interval at the completion of an image compression or expansion operation. That is, as the pixels from the last pixel block of the image undergoing compression are loaded out of transform processor circuit 158 on the last PHASE 2 pass of each column in the pixel block, flush control circuit ensures that (non-useful) data is loaded into the transform processor circuit to maintain continuity. When the pixels from the last pixel block of an image undergoing expansion are transferred from the transform processor circuit to pixel buffer 156 on the last PHASE 2 pass of each row in the pixel block, flush control circuit 164 again loads transform processor circuit with (non-useful) data to again maintain continuity.

Dual buffer 160, as noted above, receives image data from transform processor circuit 158 via pixel buffer 156 for each pixel block undergoing compression and loads image data into the transform processor circuit via the pixel buffer for each pixel block undergoing expansion. During compression, image data in the form of DC component value and the AC frequency component values of each transformed pixel block are read out of the dual buffer in "zig-zag" or "snake" fashion and sent to an EDC data path circuit 166, where a series of Arithmetic Logic Units (not shown in FIG. 7A) determine whether the bit values at given locations in the pixel block are to be encoded in run length followed by Huffman coding or in the case of large AC or DC values, are to be passed through the compressor/expander (i.e., inserted) in uncoded form. The determination as to what type of coding should be used for the AC values is made by tracking the standard deviation of the set of values which reach the EDEC data path circuit 166 from the dual buffer 160. An initial standard deviation value based on the "distortion factor" is selected from an EDEC PROM (not shown in FIG. 7A) prior to the arrival at the EDEC data path circuit of the first component value from the pixel block held in the dual buffer. Thereafter, the standard deviation is recomputed as each AC value reaches the EDEC data path circuit from the dual buffer. In particular, standard deviation recalculation is carried out according to the following equation:

$$\text{next } STDV = \tfrac{3}{4} \times \text{last } STDV + (\text{four} \times AC \text{ value}) \tag{3}$$

where STDV represents the standard deviation value. If STDV becomes less than a specified threshold level, a run length mode of coding will be entered and all following AC values equal to zero will be counted. The standard deviation value is not updated during this zero counting process. When the first non-zero AC value is detected, the total number of zero AC values counted is noted for the next stage in the decoding process. A special code will be provided if the run of zero AC values continues to the end of the pixel block.

EDEC control logic 168 supplies a series of ALU COMMANDS and IMMEDIATE DATA signals to govern the operation of the EDEC path.

The DC value and AC values of a pixel block undergoing compression are next written from the EDEC data path circuit 166 to the Huffman encoder/decoder circuit 170 where the actual encoding of the DC value and AC values takes place. The Huffman encoder/decoder, which is under the control of HED control logic circuit 172 includes a series of Huffman encoding tables stored in encoding PROMs. One Huffman table is used for DC values, a second Huffman table is responsible for run length encoding and six Huffman tables are used for AC encoding. Selection of the proper table from among the six AC Huffman encoding tables is made on the basis of the standard deviation value which has been calculated for the AC value currently being encoded. In those situations where a particular AC, DC or run length value is too large to be encoded, a code which indicates that the actual value follows, along with the value itself, is simply inserted into the Huffman encoder/decoder circuitry and no encoding of that value takes place.

The encoded or, as the case may be, inserted DC, AC and run length values are collected at the output of the Huffman encoder/decoder and written as sixteen bit words to Huffman buffer 174. Each sixteen bit word obtained from the pixel block undergoing compression is stored in the Huffman buffer until the Huffman buffer is filled, whereupon the system CPU writes the sixteen bit code words from the Huffman buffer through the multibus into system memory. This process is completed until all of the AC or DC values in all of the pixel blocks for the image undergoing compression have been encoded and stored.

During an expansion mode, data flow through Huffman buffer 174, Huffman encoder/decoder 170, EDEC data path circuit 166 and dual buffer 160 is essentially reversed relative to data flow during the compression mode. Specifically, sixteen bit code words associated with an image undergoing expansion are written from system memory through the multibus into Huffman buffer 174 under the command of system CPU 20. Once the Huffman buffer is full of sixteen bit code words, individual sixteen bit code words are shifted into the Huffman encoder/decoder 170 and, where appropriate (i.e., where the bits in the sixteen bit words code represent an encoded DC, AC or run length value as opposed to an inserted DC, AC or run length value), are decoded in a series of decoding PROMs (not shown in FIG. 7). The resulting values are placed into the EDEC data path circuit 166 where the standard deviation value STDV is again computed as each AC value reaches the EDEC data path circuit. The standard deviation value obtained for each AC value is used to extend, via a look-up table, the number of AC value bits leaving EDEC data path so that the AC values reaching dual buffer 160 each contain sixteen bits. DC values are automatically extended to sixteen bits in the decoding PROMs. The AC and DC values are subsequently stored in the dual buffer, again in "zig-zag" or "snake" fashion, until the entire pixel block undergoing expansion has been reassembled. Thereafter, the AC values and the DC value are read seriatim back into the transform process circuit 158 for reverse transformation processing.

Figure 7A:
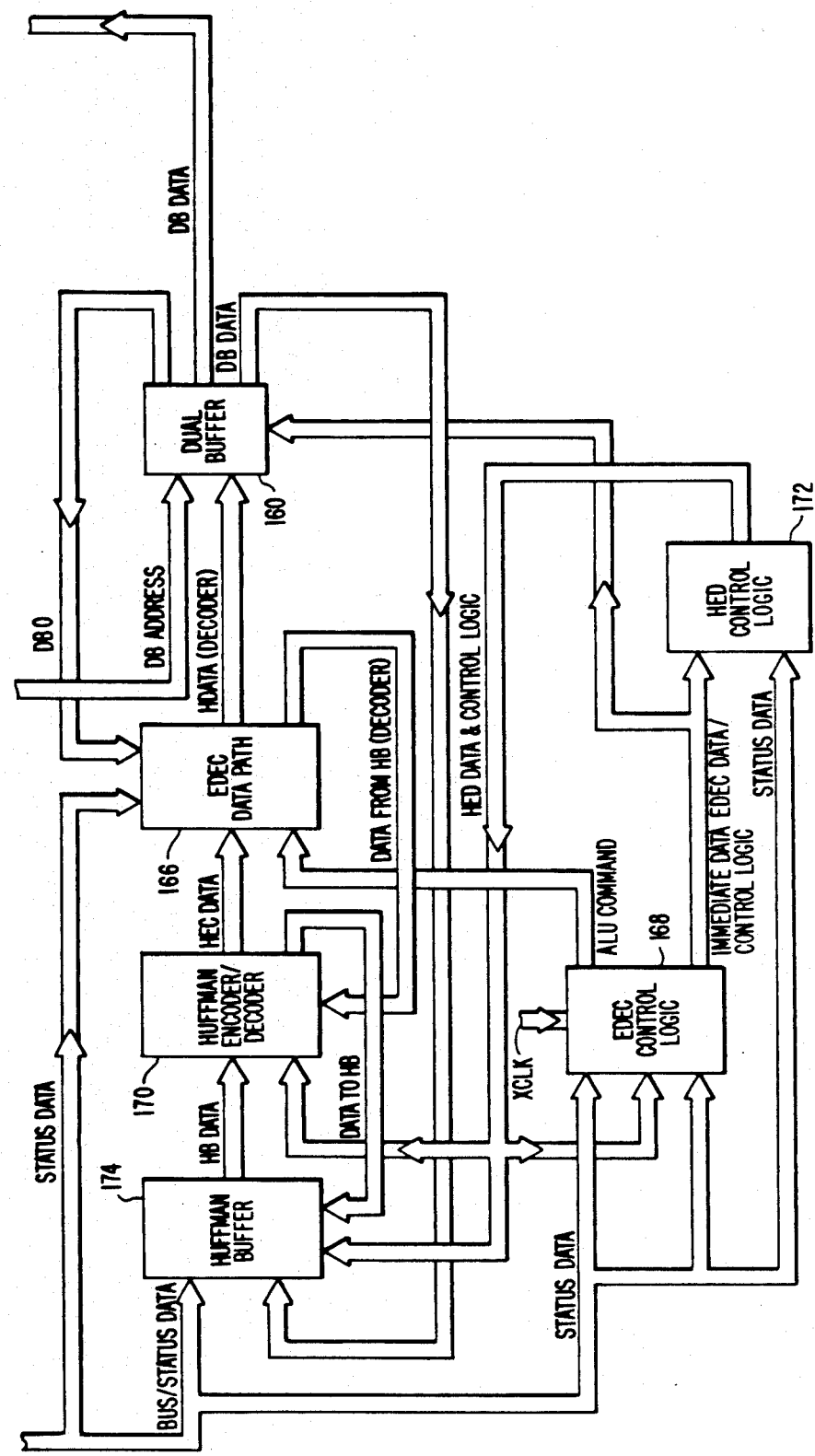
Figure 8:
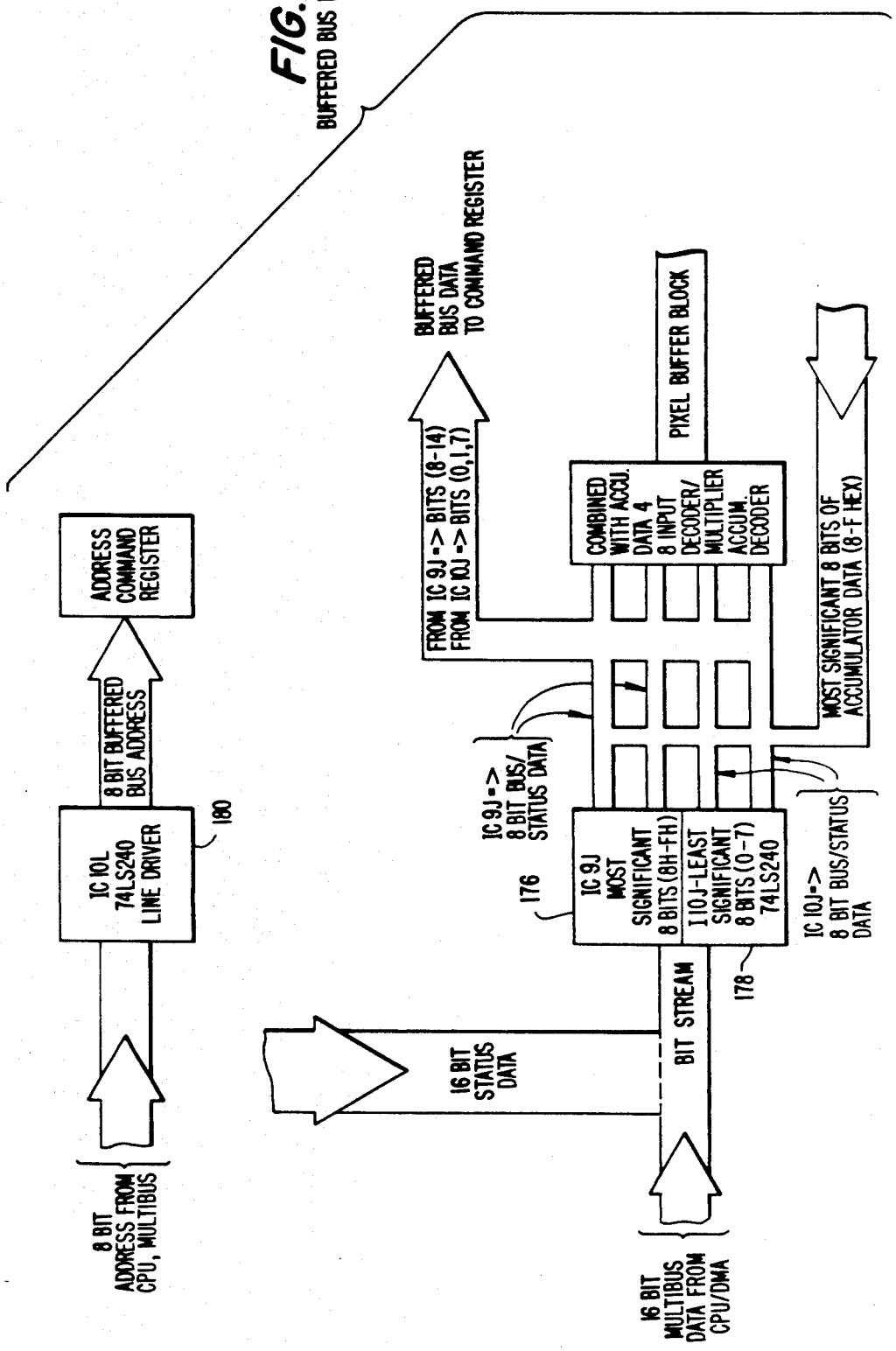
FIG. 8 is a block diagram of a buffered bus interface.

FIGS. 8 through 23 are detailed diagrams and timing charts illustrating the operation of the various circuit components in each of the data flow blocks of FIG. 7. Turning first to FIG. 8, the buffered bus interface 150 can be seen. Buffered bus interface 150 comprises a series of line drivers 176, 178 and 180, two of which, i.e. line drivers 176 and 178, receive either sixteen bit command data from the system CPU 20 via the multibus 18 or sixteen bits of image data in the form of pixel pair from either the VDG 8 or Direct Memory Access 24 via the system CPU or the multibus. The most significant eight bits of the command data received at buffered bus interface 150 is written from line driver 176 to data command register 152 (not shown in FIG. 8) while the lest significant eight bits of the command data is written from line driver 178 to the data command register. Meanwhile, the most significant and least significant eight bits of image data from a pixel block to be compressed, representing two paired pixels, are respectively written through line drivers 176 and 178 to the pixel buffer block 156 (not shown in FIG. 8). Line driver 180 functions to pass the eight bit address signal from the system CPU 20 to the address command register 154.

Figure 9:
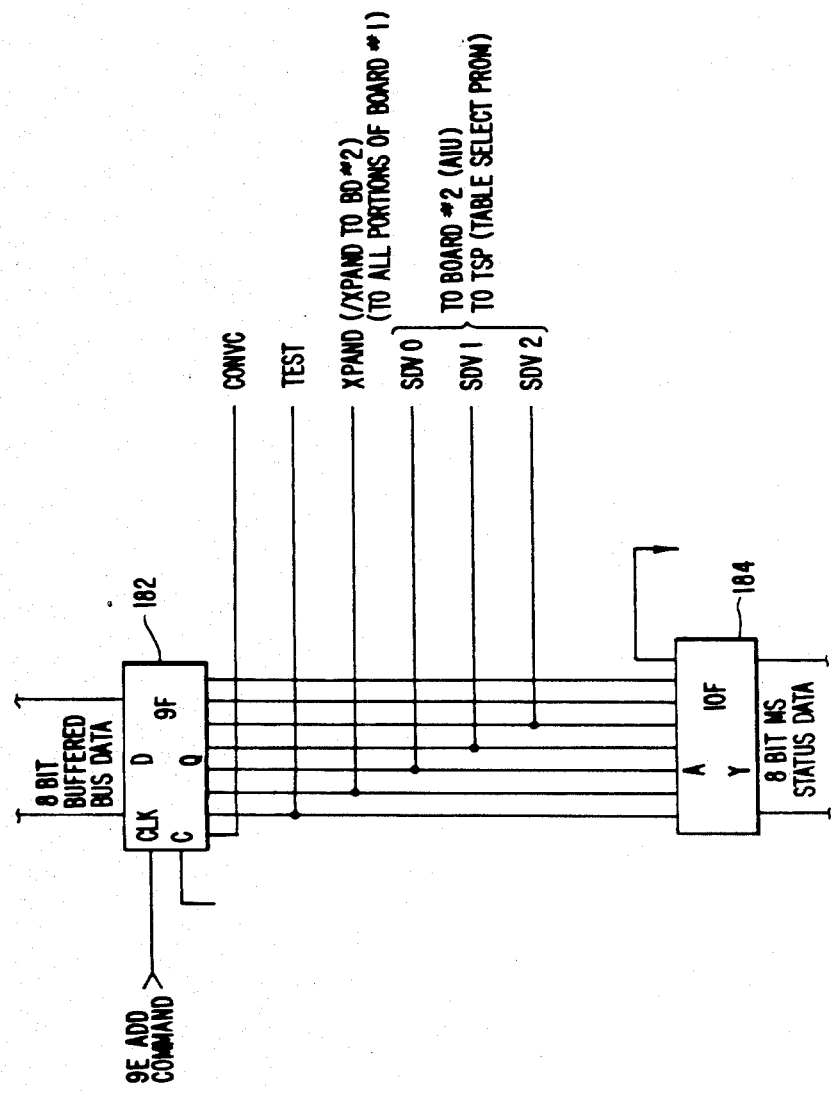
FIG. 9 shows a data command register.

The data command register 152 may be seen to better advantage in FIG. 9. Data command register 152 includes D-type octal flip-flop 182 which receives all but the highest order of the eight most significant command data bits and the highest order of the least eight significant command data bits from line drivers 176 and 178 in buffered bus interface 150. When clocked, octal flip-flop 182 outputs a series of status signals having values which depend upon the bit pattern of the input to the flip-flop. These status signals are listed in Table 1 below:

TABLE I

| | |
|---|---|
| CONVC | This signal is active high when a compression operation is in progress. |
| XPAND | This signal is active low during a compression operation. |
| SDV0–SDV2 | This signal, which represents the distortion factor supplied by the system CPU, is sent to the transform processor for selection of the first set of coefficient values. |
| TEST | This signal is active high only when a test is being performed. |

The status signals are also passed through a line driver 138 for return to the system CPU 20 via the multibus 18.

Figure 10:
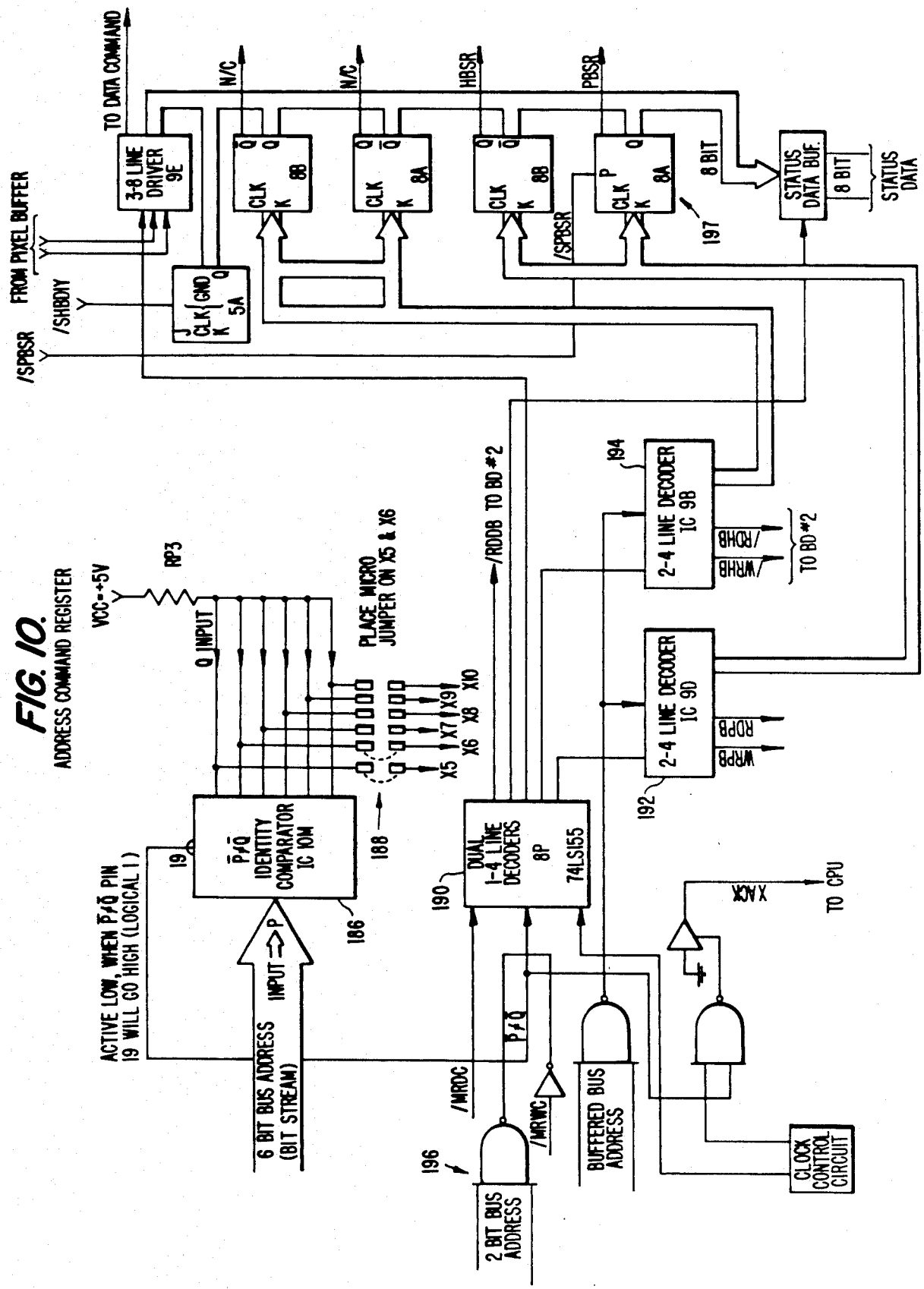
FIG. 10 shows an address command register.

Address command register 154 is shown in FIG. 10. Six bits of an eight bit bus address taken directly from multibus 18 are supplied to the P inputs of an identity comparator 186. Q inputs of the identity comparator are either grounded or at positive potential depending upon the setting of micro jumpers 188. Identity comparator 186 is active low. Consequently, when each of the bus address bits satisfies the equation:

$$P = Z \text{ not} \tag{4}$$

where P represents a bus address bit, dual two-line to four-line decoder/demultiplexers 190 will activate, in turn causing line decoders 192, 194 to output one of a series of command signals WRPB, RDBP, /WRHB and /RHDB. The buffered bus address bits from buffered bus interface 196 and the remaining two bits of the eight bit bus address from the multibus 18 pass through a logic array 196 and are respectively input to decoders 192, 194, and decoder/demultiplexer 190. Logic array 196 additionally receives a memory 'not' command /MRDC (data is read from the compressor/expander when this signal is active low) and a memory write 'not' command /MWRC (image data is written to the compressor/expander when this signal is active low). Decoders 192 and 194 output to a series of control signals, defined in Table II below, and command a series of JK flip-flops 197 which supply further status signals to the multibus.

TABLE II

| | |
|---|---|
| XACK | This signal tells the system CPU that a transfer of image data is in progress. This signal will go active when it is permissible for the CPU to complete the access cycle and remain so until the transfer is complete. |
| WRPB | This signal is a pulse signal which selects the writing to the pixel buffer of the least significant eight bits and the writing of the most significant eight bits. |
| RDPB | When this pulse signal goes active high, it allows the reading of the pixel buffers. |
| /WRHB | Write Huffman buffer "not". When this signal is active low, it allows writing to the Huffman buffer. |
| /RDHB | Read Huffman buffer "not". When this signal is in the active low state, it allows reading of the Huffman buffer. |

Figure 11:
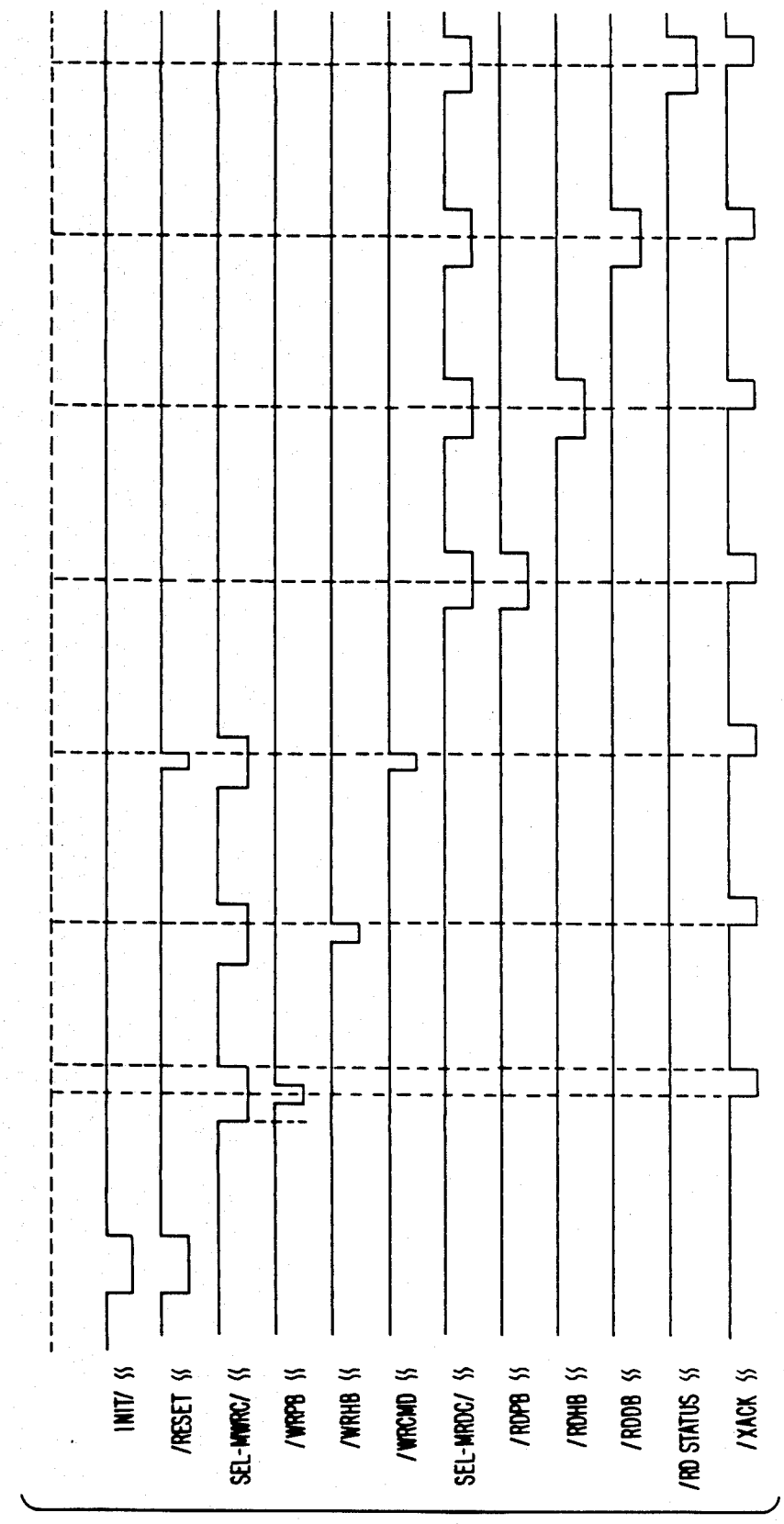
FIG. 11 shows a timing sequence for decoder outputs.

The timing sequence for the decoder outputs is shown in FIG. 11.

The pixel buffer 156 may be seen in FIG. 12. The heart of the pixel buffer is a 256×16 bit pixel buffer RAM 200 comprised of a series of interleaved 256×4 bit RAMs 202, 204, 206 and 208. RAMs 202 and 204 store least significant bits while RAMs 206 and 208 store most significant bits. Pixel buffer RAM 200 can thus be loaded with two separate pixel blocks. A string of multiplexers 210, 212, 214 and 216 access alternate RAM pairs 202, 206 or 204, 208 to receive the pixel blocks from either the buffered bus interface 150 or the transform processor circuit 158. Addressing for pixel buffer RAM 200 is provided by a pair of quad selectors 218, 220 which respectively output the four most significant address bits and four least significant address bits as determined by the buffered bus address received from the buffered bus interface 150 or the COSINE RAM ADDRESS received from transform control circuit 162. During the compression mode, pixel bytes associated with the pixel block undergoing compression are read from one half of RAM 200, say from RAMs 202 and 206, through byte multipliers 222 and 224 to the transform processor circuit 158. A buffer 226 with grounded input supplies eight zero bits to each pixel byte leaving byte multipliers 222 and 224, thus establishing a sixteen bit pixel data signal, styled the COSINE DATA signal, for input to the transform processor circuit. Simultaneously, the sixteen bit DC and AC values obtained from the cosine transformation process, styled ACCUMULATOR DATA, are written from the transform processor circuit 158 through a pair of octal buffers, 228, 230 to dual buffer 160. During the expansion mode, the data flow pattern is reversed and the decoded sixteen bit DC and AC values associated with the pixel block to be expanded are written from the dual buffer into the transform processor circuit 158 through octal buffers 232, 234 while the expanded pixel bytes associated with the pixel block currently undergoing expansion are written as ACCUMULATOR DATA from the transform control circuit through the appropriate pair of multiplexers 210, 214 or 212,216 into half of RAM 200. The latter pixel bytes are then written from the pixel buffer RAM 200 to the system multibus 18.

Figure 13B:
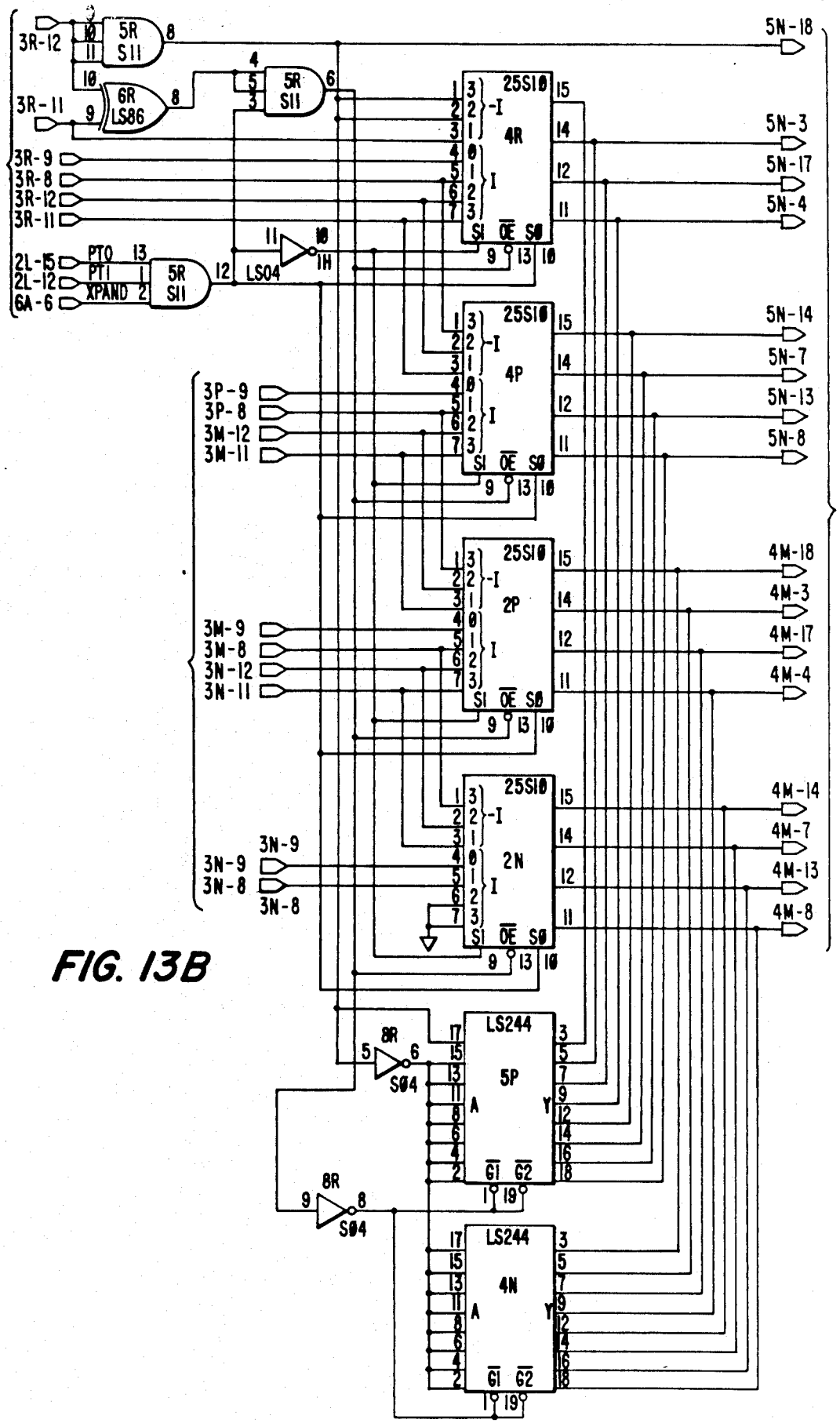
FIG. 13B shows a portion of the transform processor circuitry in greater detail.

FIG. 13 illustrates the transform processor circuit 158. COSINE DATA from the pixel buffer 156 is multiplexed through a series of multiplexers 236, 238, 240 and 242 into a series of cosine RAMs 244, 246, 248 and 250. The same COSINE RAM ADDRESS employed to access the pixel buffer RAM 200 in pixel buffer 156 is used to access cosine RAMs 244, 246, 248 and 250, thus assuring a one-to-one correspondence between the cosine RAM address location and the pixel buffer RAM location as the cosine RAMs are loaded with COSINE DATA from the pixel buffer. The COSINE DATA is passed from the cosine RAMs to a 16×16 multiplier chip 252 where the multiplication steps of either Equation (1) or Equation (2) are performed. Multiplier chip 252 may comprise a TRW MPY 16 HJ chip or an Advanced Micro Devices AM 29516 chip. Coefficient values for use in performing the Equation (1) or (2) computations are obtained from one of sixteen look-up tables contained in two coefficient PROMs 254 and 256. Selection of the appropriate look-up table in the coefficient PROMs is enabled by a COEFFICIENT PROM ADDRESS which is in turn determined on the basis of the distortion value for the pixel block being processed.

The arithmetic addition steps necessary to implement Equations (1) or (2) are carried out by arithmetic logic units 258, 260, 262 and 264, the inputs of which are connected to the outputs of the multiplier chip 252. The arithmetic logic outputs are in turn supplied to an auxiliary accumulator formed from a pair of octal D flip-flops 266 and 268 and through a shifter/limiter 270 to a main accumulator formed from a second pair of octal D flip-flops 272 and 274. The main accumulator supplies the ACCUMULATOR OUTPUT. The auxiliary accumulator is connected to the A inputs of the arithmetic logic units 258, 260, 262 and 264 in order to allow the arithmetic logic units to effectively subtract, inasmuch as the arithmetic logic units in the preferred mode of practicing the present invention do not have a pass or a two's compliment negate operation. The shifter/limiter, which consists of a series of limit shifters 276, 280, 282, 284 and buffers 286, 298, is used during the expand mode to limit the pixel value obtained on the last pass of each row and column in the pixel block if the operation performed by the arithmetic logic units would otherwise left shift the most significant bit of the pixel value into the two's compliment or sign bits. At all other times, the outputs of the arithmetic logic units simply passes unchanged through the accumulator.

Depending upon which cycle and pass is being performed on the pixel block rows or columns, the ACCUMULATOR OUTPUT from main accumulator flip-flops 272 and 274 is written either to a group of scratch RAMs 290, 292, 294 and 298, to the cosine RAMs 244-250, to data buffers 228 and 230 in pixel buffer 156 or to the pixel buffer RAM 200 via multiplexers 210-216. Specifically, during the first, third and fifth passes through each pixel block row in the PHASE 1 cycle and each pixel block column in the PHASE 2 cycle of the compression mode, values which have been obtained from the cosine RAMs and processed in multiplier chip 252 and arithmetic logic units 258-264 are written as ACCUMULATOR OUTPUT to the scratch RAMs 290, 292, 294 and 296. During the second, fourth and sixth passes of each pixel block row in the PHASE I1 cycle and the second and fourth passes of each pixel block column in the PHASE 2 cycle of the compression mode, values are output from the scratch RAMs through a pair of drivers 300, 302, processed by the multiplier chip and arithmetic logic units an output from the accumulator as ACCUMULATOR OUTPUT back to the cosine RAMs 244-250. On the sixth pass through each pixel block column in PHASE 2 of the compression, of course, the accumulator output is directed to buffers 228 and 230 in pixel buffer 156 for transmission to dual buffer 160 while the pixel bytes from the corresponding column of the pixel block next in line for compression are respectively written into the cosine RAMs from pixel buffer RAM 200 in the pixel buffer.

The same basic data flow between the scratch RAMs 290-296 and the cosine RAMs 244-250 is utilized in the expansion mode, except that on the sixth pass of the PHASE 2 cycle the cosine RAMs receive the DC value and AC values of the pixel block next in line for expansion from the dual buffer 160 via data buffers 232, 234 in pixel buffer 156 as the ACCUMULATOR OUTPUT representing the pixel bytes from the pixel block which is undergoing expansion is written from the main accumulator into pixel buffer RAM 200.

The transform control circuit 162, which generates all of the control signals and addresses required by the transform processor circuit to carry out the transformation circuit during the compression mode and the reverse transformation during the expansion mode, is seen in FIG. 14. Transform control circuit 162 includes a pair of sequence control PROMs 304 and 306 to supply the COSINE RAM ADDRESS, the SCRATCH RAM ADDRESS and the COEFFICIENT PROM ADDRESS. Sequence control PROMs 304 and 306 are themselves addressed by the output of a series of row counters 308, 310 and 312. Row counters 308-312 are clocked once for each mathematical step performed while implementing Equation (1) and each mathematical step performed while implementing each pass of a pixel block row or column in the transform processor circuit 158. The sequence control PROM outputs comprising the COSINE RAM ADDRESS are written to a pair of parallel loadable counters 314 and 316 which together supply the actual COSINE RAM ADDRESS. The outputs from counters 314 and 316 are also passed through an octal buffer/line driver 318 to the dual buffer 160, ensuring that correspondence between the address locations in the dual buffer as well as the pixel buffer RAM 200 in pixel buffer 156 and the cosine RAMs 244-250 in transform processor circuit 158 is maintained. The SCRATCH RAM ADDRESS output from sequence control PROMs 304 and 306 is supplied to a latch 320 and sent on to the scratch RAMs 290-296 in the transform processor circuit 158.

Transform control circuit 162 additionally includes a table select PROM 322 which receives the distortion values SDV from the system CPU via data command register 152. In response to the distortion value, table select PROM 322 outputs the four most significant bits of the COEFFICIENT PROM ADDRESS to a pipeline register or latch 324. The four least significant bits of the COEFFICIENT PROM ADDRESS are supplied by address PROM 306. From pipeline register 324, the COEFFICIENT PROM ADDRESS is directed to the coefficient PROMs 254 and 256 in transform processor circuit 158.

Finally, the transform control circuit includes a series of logic elements 326 connected to a decoder 328. The output of decoder 328 comprises a series of control signals used by the transform processor circuit 158 to perform the cosine transformation process and the reverse transformation process. These output signals are listed in Table III below:

| | |
|---|---|
| /CLEAR | When this signal is active low the data which is "held" in the auxiliary accumulator is outputted to the pipeline. When this bit is active high data is held in the "shift registers" until an inactive pulse occurs. |
| SELSR | When this bit goes active high the scratch RAMs are selected to output data to the multiplier chip so that proper arithmetic processing can occur. |
| SELACC | When this signal is in an active high state the accumulator has been selected to output data to the multiplier section. |
| COEF. PROM ADDRESS | 8-bit address configuration to select the proper look-up tables to the coefficient PROMs. |
| /WRPBLS | This signal causes the 8 least significant bits to be written to the pixel buffer. |
| /WRPBMS | This signal to write the eight most significant bits to the pixel buffer. |

Figure 15A:
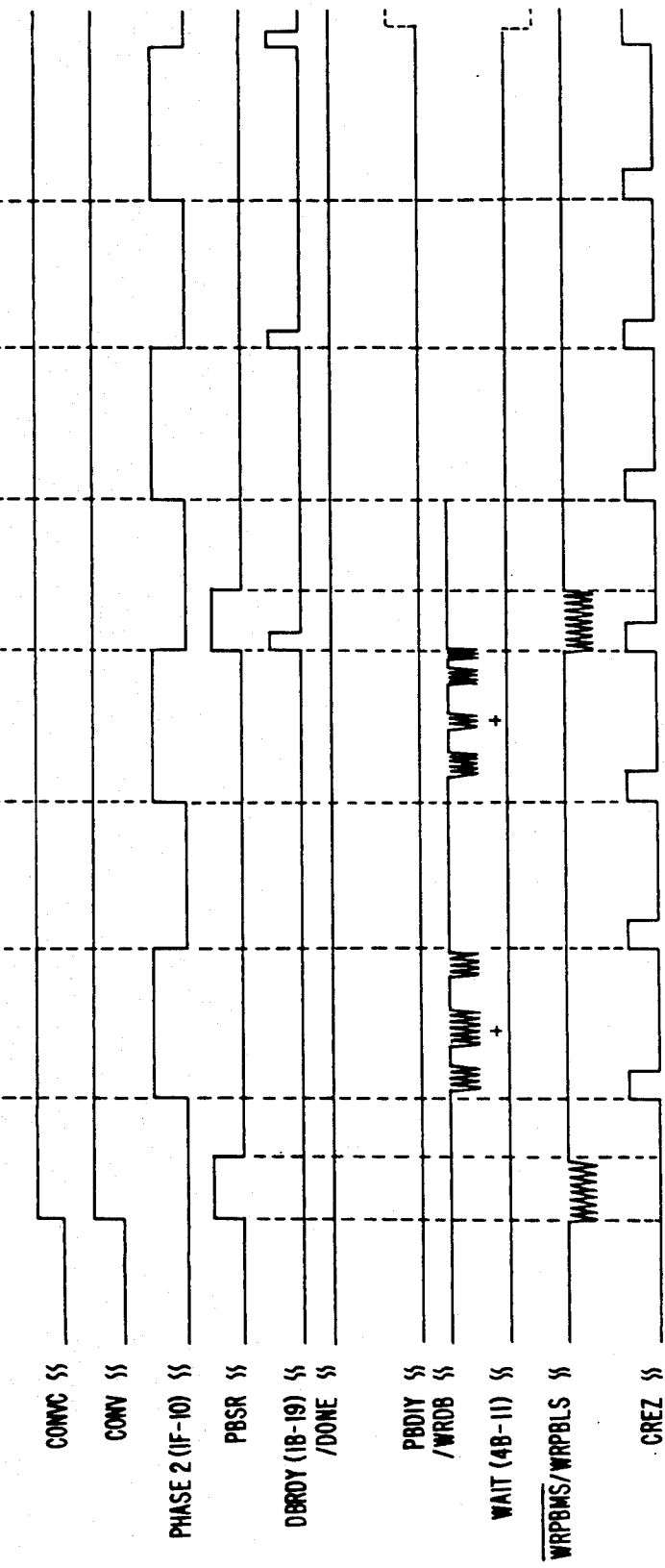
FIG. 15A shows a timing sequence for signals during the compression operation.
Figure 15B:
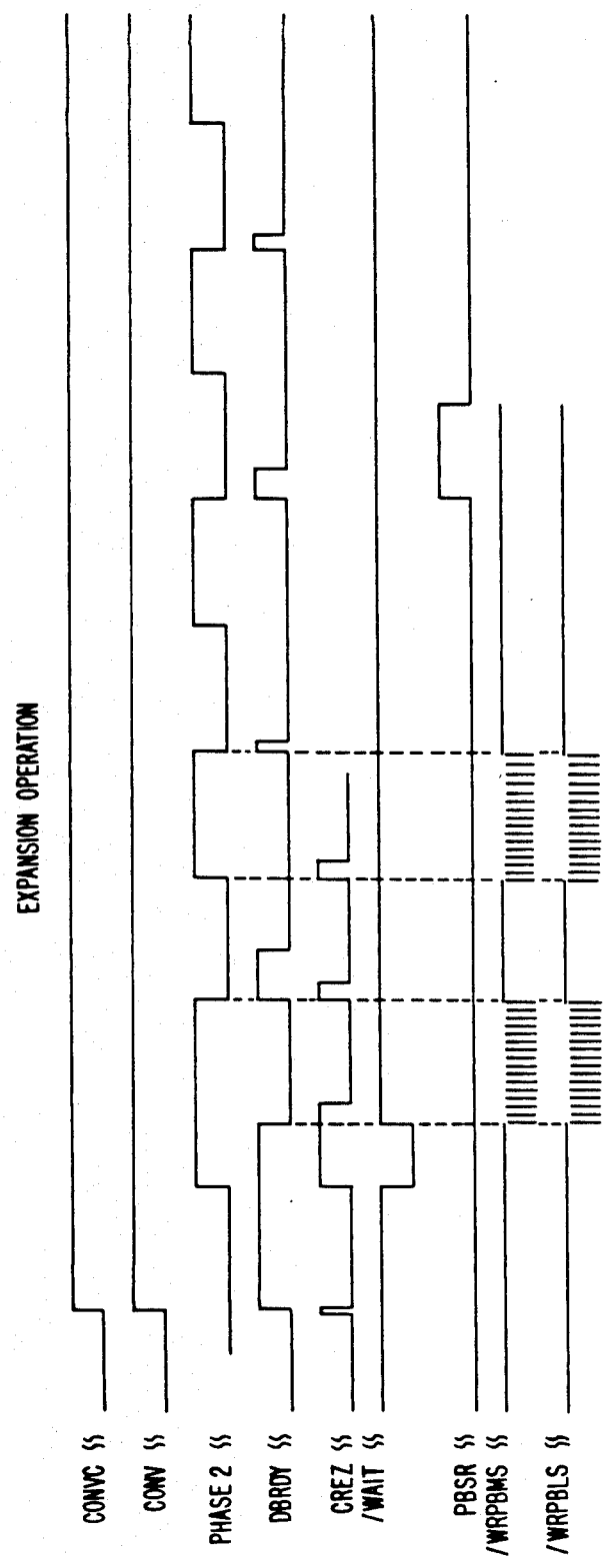
FIG. 15B shows a timing sequence for signals during the expansion operation.

The timing sequence for the signals of Table III are respectively depicted in FIGS. 15A and 15B for the compression and expansion mode of compressor/expander operation.

Flush control circuit 164 can be seen in detail in FIG. 16. The flush control circuit includes a flush control PROM 330 which acts as a state machine, keeping track of the operational mode and cycle of the compressor/expander so that data transfer between the transform processor circuit 158, pixel buffer 156 and dual buffer 160 can be managed in the transition stages, i.e., in the start-up and shut-down stages, of the compression and expansion operations.

The circuit components of the dual buffer 160 are illustrated in FIG. 17. The dual buffer includes a dual-ported 256×16 bit dual buffer RAM 332 comprised of a series of 256×4 bit RAMs 334-340 and 342-348. The DC value and AC values of one pixel block may thus be sent to or received from pixel buffer 156 while a second DC value and set of AC values of a second pixel block in dual buffer RAM 332 may be sent to or received from the Huffman encoder/decoder 170 through EDEC data path circuit 166. Data received from pixel buffer 156 during the compression mode is passed along bus 350 through multiplexers 352, 354 and 356 to dual buffer RAM 332 (note that the four least significant bits from the pixel buffer circuit are lost in precision. In fact, they simply float, bringing the total bit number for each DC value and AC value in RAM buffer 300 to twelve). From RAM 332, the Dc value and AC values of the pixel block undergoing compression are read to the EDEC data path circuit 166 and Huffman encoder/decoder 170 along data buses 358 and 360, with each DC and AC value so read being accessed in a "zig-zag" or "snake" fashion according to an address generated by "snake" PROM 362. The snake PROM address is multiplexed to one half or the other of dual buffer RAM 332 using multiplexers 364–370. During the expansion mode of compressor/expander operation, the decoded DC value and set of AC values of the pixel block undergoing expansion are received along data bus 372 and directed through multiplexers 352, 354 and 356 into dual buffer RAM 332, again using the snake PROM 362 to generate dual buffer RAM addresses in snake or zig-zag fashion. Subsequently, the decoded DC value of AC values leave dual buffer RAM 332 via bus 358 and return to pixel buffer 156 through a pair of octal buffers 374 and 376. If desired, a contents of data bus 358 can be passed to the system CPU 20 via multibus 18 for test purposes. Octal buffers 378 and 380 connected directly to the multibus are provided for this purpose.

Figure 18:
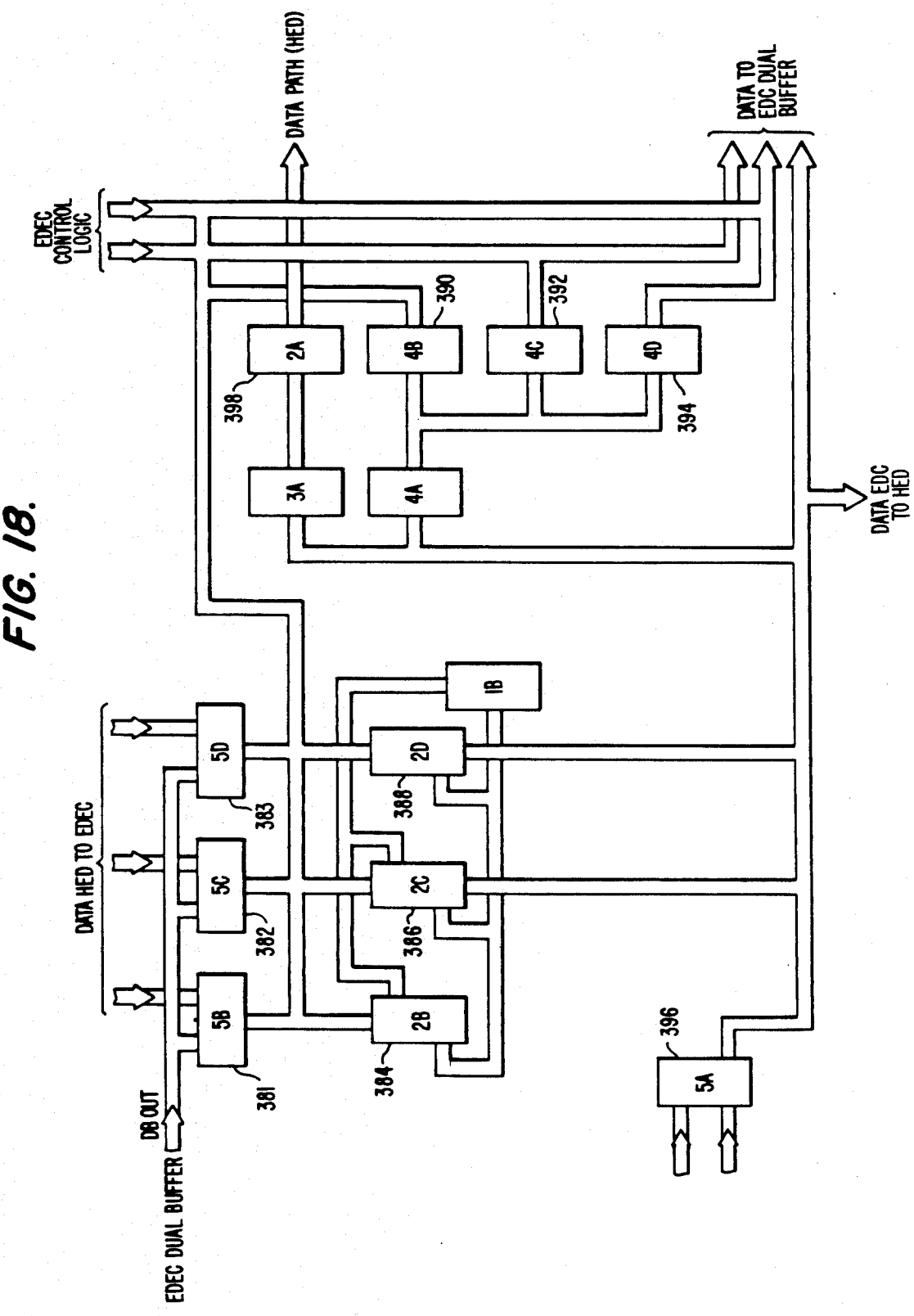
FIG. 18 is a block diagram of an EDEC data path circuit.

EDEC data path circuit 166 is illustrated in detail in FIG. 18. The DC and AC values from the dual buffer RAM 332 and dual buffer 160 enter the EDEC data path circuit 166 and are passed through multiplexers 381, 382 and 383 to a group of 2901 Arithmetic Logic Units 384, 386 and 388. During compression, the Arithmetic Logic Units 384–388 function to recompute the standard deviation values SDTV for each AC value in the pixel block being processed. Based on this STDV value, the ALUs then determine whether the AC value can be run length encoded, and, if so, what the run length count is. The ALUs also compare the DC and AC values with a threshold. Where the values are greater than the thresholds, the ALUs put out a code bit indicative of this fact, followed by the actual AC or DC value which will thereafter simply be inserted into the Huffman buffer 174.

During expansion, the newly decoded DC, AC and run-length values are input to the ALUs and running computations of the standard deviation value are again made. The run-length values are then detected using the standard deviation value and decoded into DC and/or AC values.

The initial standard deviation value for the ALUs is selected from look-up tables in one of three PROMs 390, 392 and 394 based on the distortion factors SDV0–SDV2 input to the EDEC data path circuits 166 through buffer 396. These initial standard deviation values can be determined imperically to provide optimum encoding for a given compression ratio. The distortion factor signal SDV also drives a PROM 398 to provide a table output TBL which is used by the Huffman encoder/decoder in a compression mode to select one of six Huffman encoding tables for the AC values.

Figure 19:
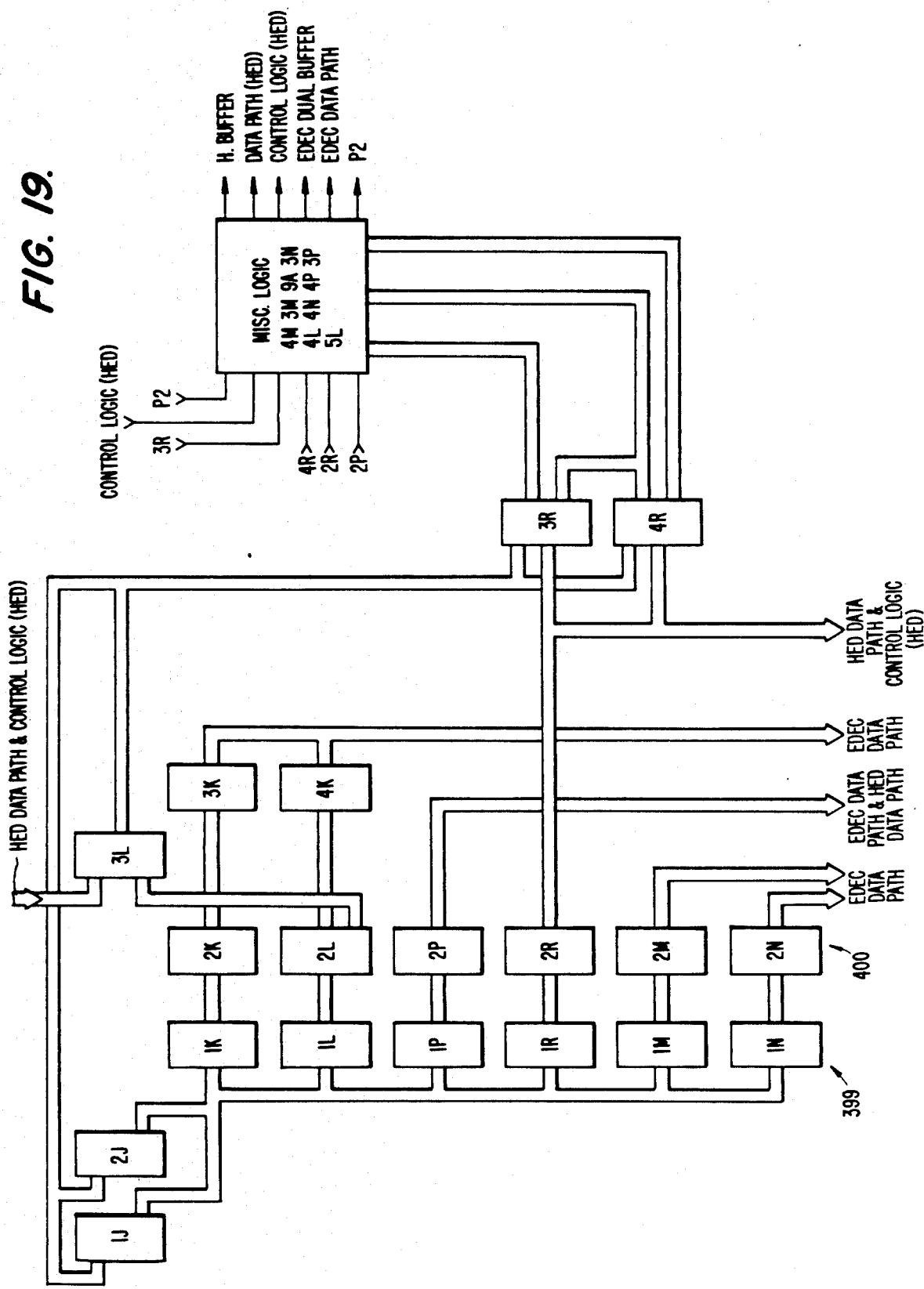
FIG. 19 is a block diagram showing an EDEC control logic circuit.

FIG. 19 shows the EDEC control logic circuit 168. Basically, the EDEC control logic circuit comprises a group of PROMs 399 which contain the ALU microcode instructions for governing the operation of the ALUs. The actual ALU instructions are sent from PROMs 399 through pipeline registers 400 to the ALUs.

Figure 20:
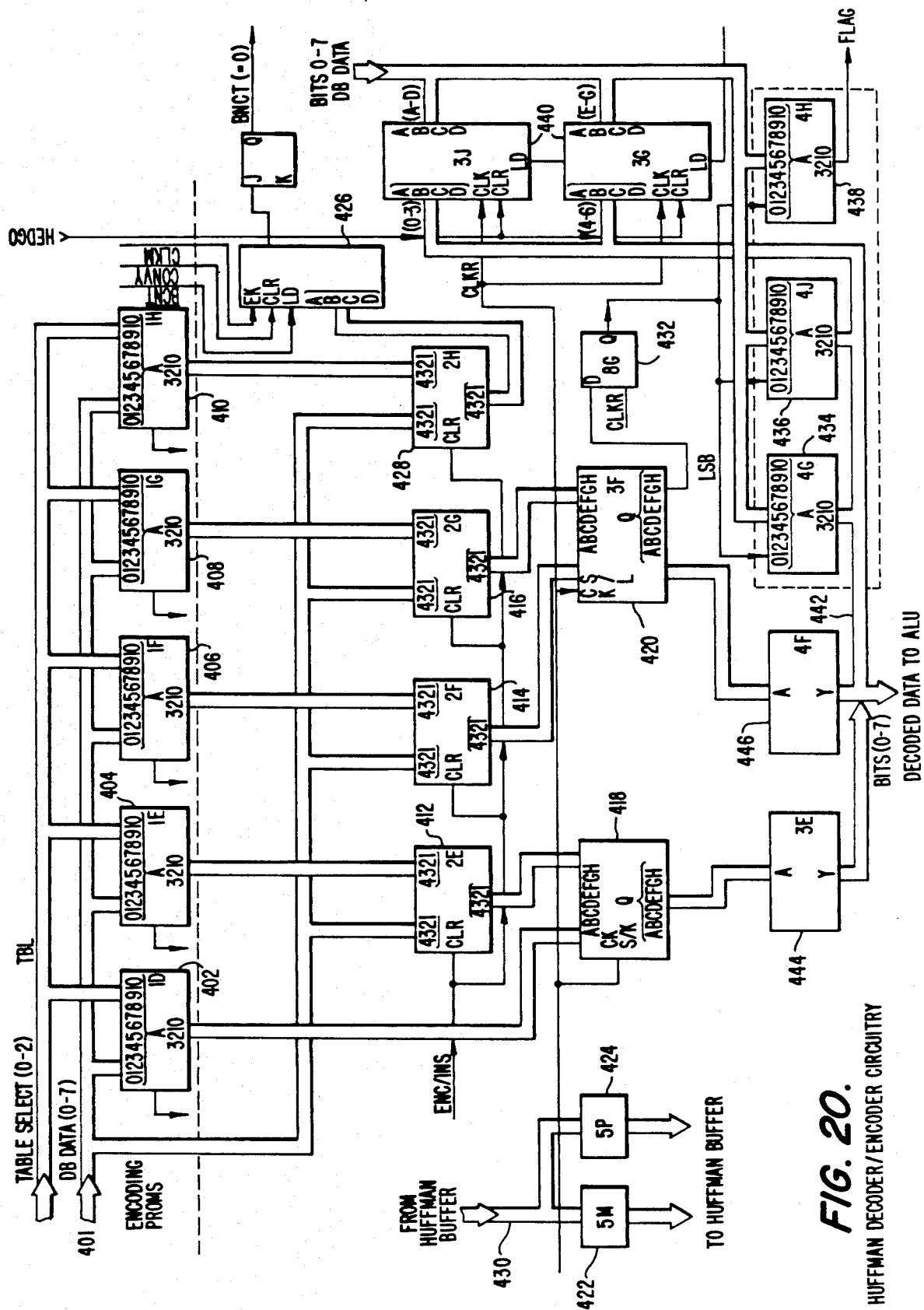
FIG. 20 is a block diagram showing a Huffman decoder/encoder circuitry.

The Huffman encoder/decoder circuit 170 may be seen in FIG. 20. The DC value and the set of AC and run length values of a pixel block undergoing compression enter the Huffman encoder/decoder circuit on a data bus 401. All values to be encoded are directed to a series of encoder PROMs 402–410, where the values access one of eight encoding tables which perform the encoding operation. More particularly, a DC value capable of being Huffman encoded accesses a DC encoding table in the encoder PROMs, run length values capable of being Huffman encoded access a run-length encoding table in the encoder PROMs and AC values capable of being Huffman encoded access one of six AC encoding tables in the encoder PROMs depending upon the value of the TBL signal from EDEC data path circuit 166. The exact Huffman encoding sequence employed in each of the AC encoding signals may be determined in statistical fashion for each of the compression ratios associated with the distortion factors which generate the PBL signal in the EDEC data path circuit.

The outputs of the encoder PROMs 402–410, which represent the Huffman encoded DC, run length and AC values, are supplied to a series of multiplexers 412, 414 and 416. Any value which is to be inserted rather than encoded is supplied to multiplexers 412–416 via bus 418. The DC value and the AC values of the pixel block undergoing compression, whether inserted or encoded, are thereafter loaded into a pair of parallel loadable shift registers 418 and 420. A long shift to a second pair of shift registers 422 and 424 is finally performed under the guidance of a synchronous four-bit counter 426. Counter 426 connected to multiplexer 428 receives data indicative of the number of bits in the bit pattern associated with the encoded or inserted value then being loaded into shift registers 418 and 420 from encoder PROMs 402–410 or bus 418. Counter 426 consequently tracks the number of useful bits present in each encoded or inserted value. When sixteen bits of useful data (which may encompass several encoded and/or inserted values) have been shifted into registers 422 and 424, these latter registers are unloaded to supply the sixteen useable bits to Huffman buffer 174 for ultimate transmission to the system CPU 20 and system memory 16. In this manner, a continuous stream of bits representing the continuous stream of inserted or encoded DC, AC and run length values of the pixel block undergoing compression can be maintained.

During the expansion mode, sixteen bit words obtained from the system memory and system CPU through the Huffman buffer 174 are loaded into shift registers 422 and 424 along data bus 430. These sixteen bits are long-shifted serially back into shift registers 418 and 420. Each bit so shifted serially supplies the D input to a D-type flip-flop 432, which in turn supplies the least significant address bit to three decoder PROMs 434, 436 and 438. The outputs of decoder PROMs 434 and 436 supply a seven-bit register 440 which recirculates the output of the decoder PROMs 434 and 436 back to the address inputs thereof. This entire process is repeated, with the least significant input of decoder PROMs 434–438 receiving successive bits shifted from registers 422 and 424, until a match is achieved, indicating that the exact number of useful bits associated with a particular encoded DC, run-length length or AC value have been placed through flip-flop 432 into the address inputs of decoder PROMs 434–438. Thereafter, decoder PROM outputs a FLAG signal indicative of this fact. With the decoder PROM address inputs thus established, decoder PROMs 434 and 436 output a decoded version of the DC, run-length or AC value on data bus 442 for transmission back to the EDEC data path circuit 166. Inserted DC, AC or run-length values present in the sixteen bits loaded into registers 418 and 420, on the other hand, are passed directly through octal buffers 434 and 436 to the EDEC data path circuit.

Figure 22A:
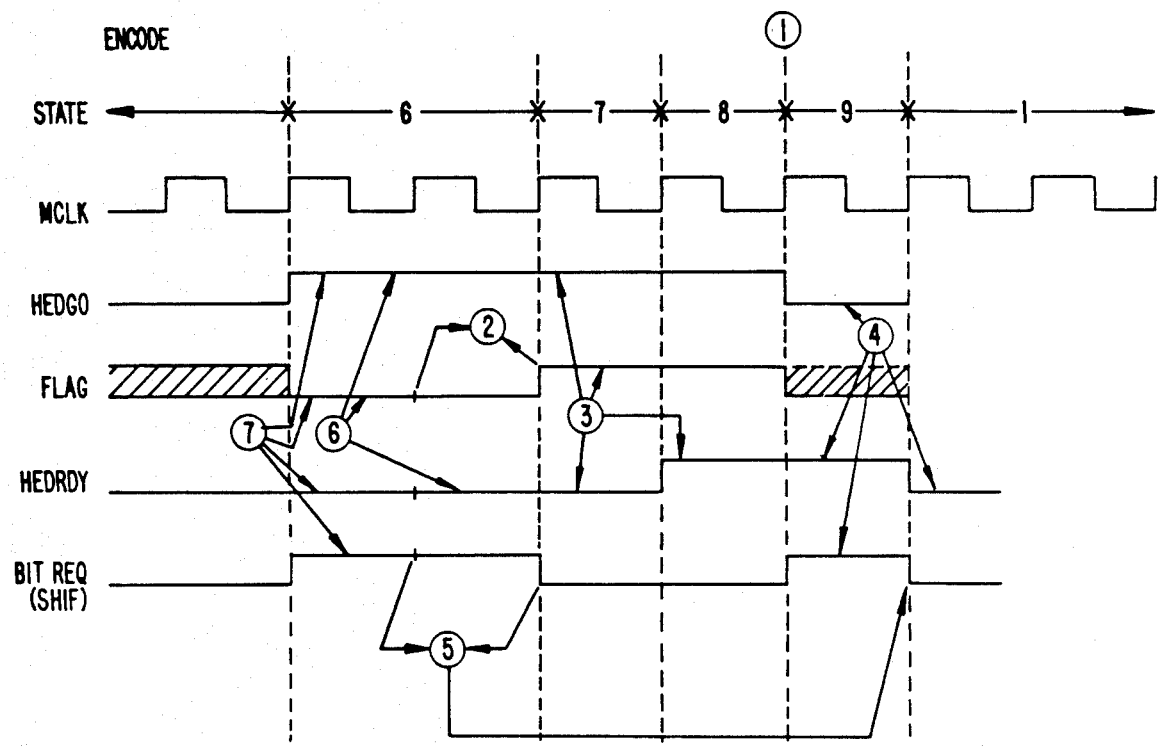
FIG. 22A is a timing sequence diagram illustrating the timing of various signals during the Huffman encoding operation.
Figure 22B:
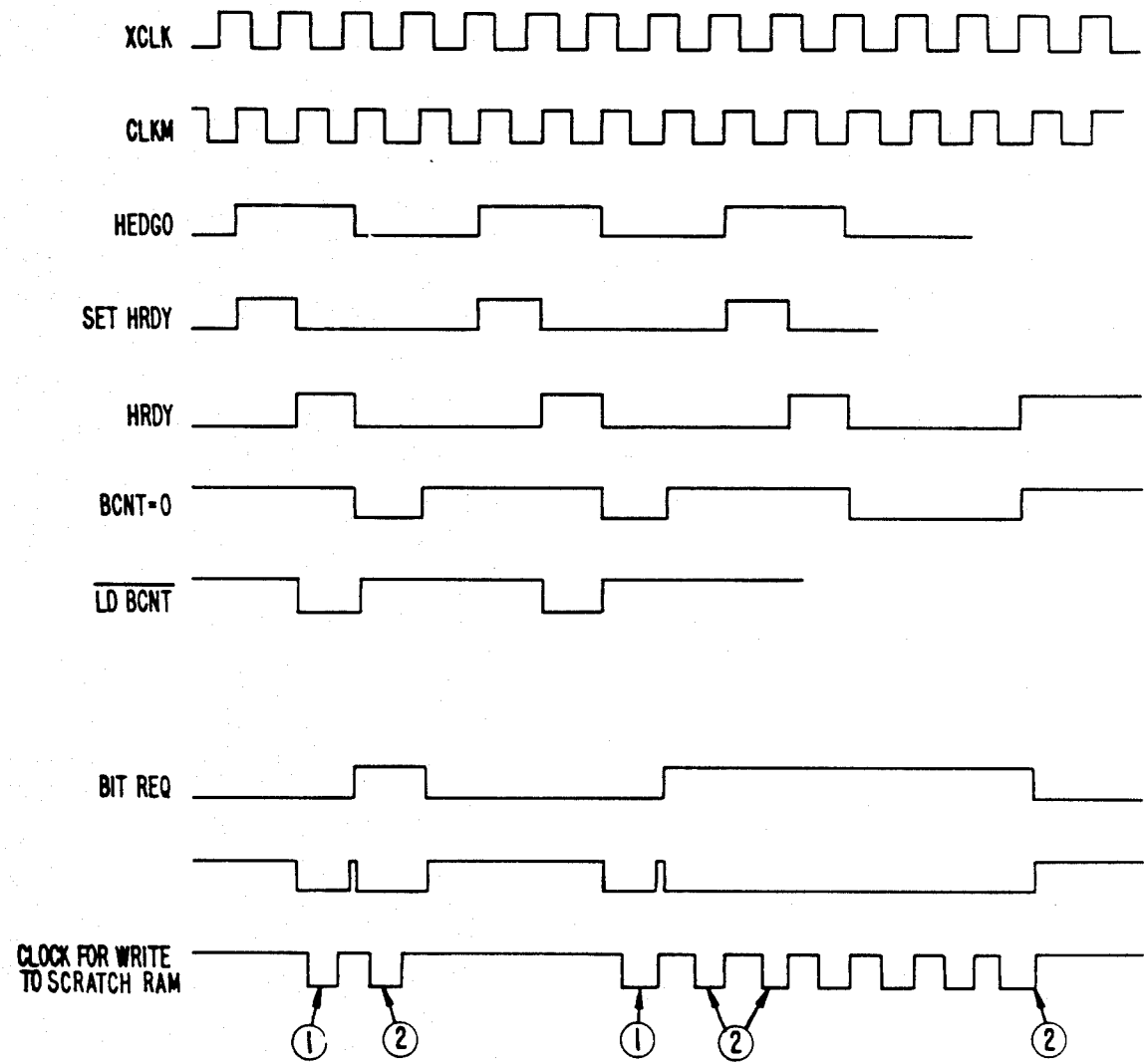
FIG. 22B is a timing sequence diagram illustrating the timing of various signals during the Huffman decoding sequence.

FIG. 21 is a circuit schematic showing the components for the Huffman encoder/decoder logic circuit 172. FIGS. 22A and 22B respectively depict the timing sequences for the control signals output from the Huffman encoder/decoder control logic circuit in the compression and expansion modes of compressor/expander operation.

Figure 23:
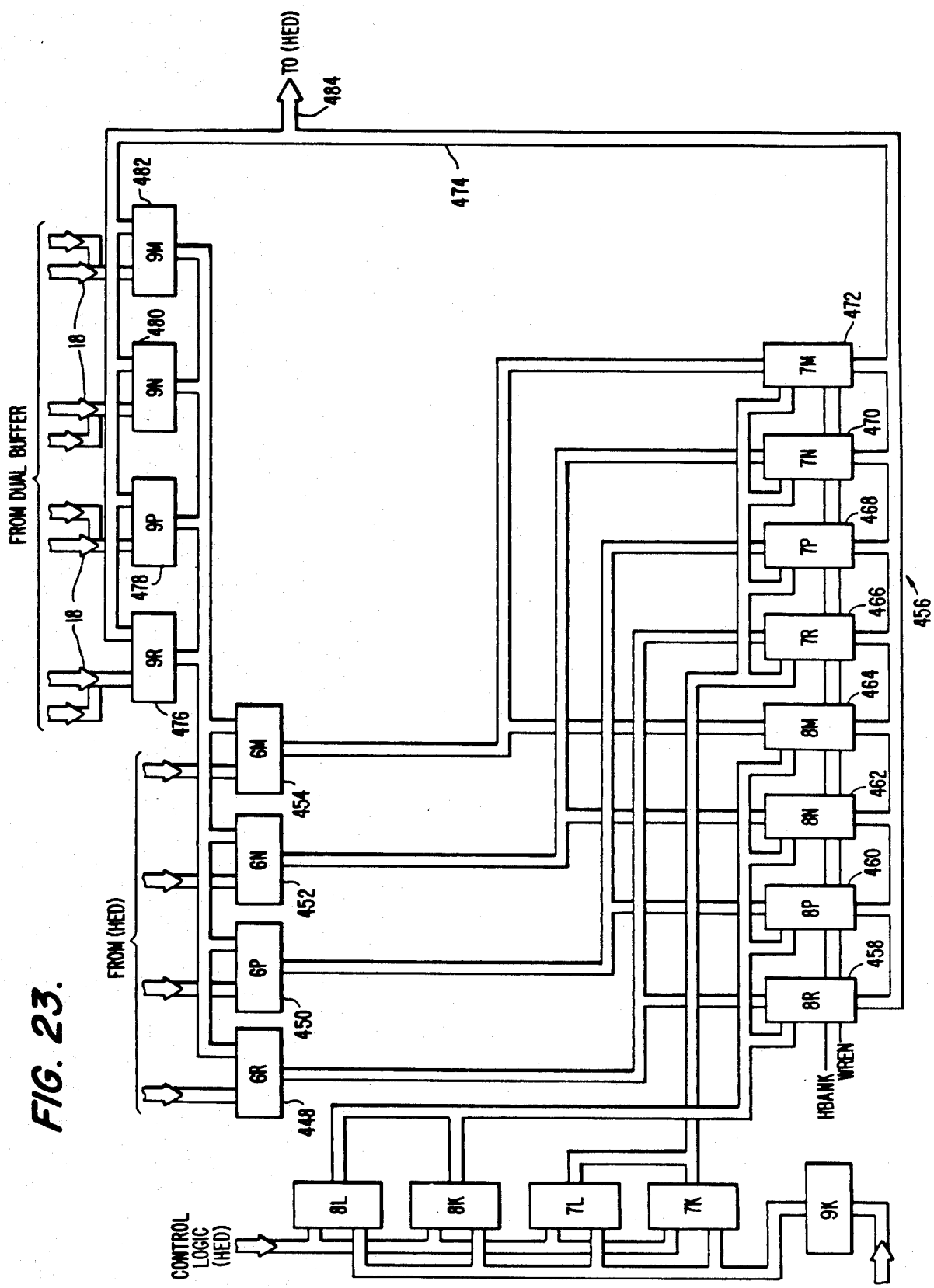
FIG. 23 is a block diagram of the Huffman buffer.

Huffman buffer 174 can be seen in FIG. 23. In the compression mode of operation, the sixteen bit code words from the shift registers 422 and 424 in the Huffman encoder/decoder 170 are directed through a series of multiplexers 448, 450, 452 and 454 to a selected half of a Huffman buffer RAM 456 comprised of eight 256×16 RAMs 458-472. The sixteen bit code words are read out of Huffman buffer RAM 456 on a bus 474, passed through inverting buffers 476-482 and sent on the assistant multibus 18 to the system CPU 20, where the code words can be latched and written into the system memory 16. In the expansion mode of operation, sixteen bit code words are read back from system memory by the system CPU and sent to the Huffman buffer RAM 456 through inverting buffers 476-482 and multiplexers 448-454. Code words slated for decoding in the Huffman encoder/decoder 166 leave the Huffman buffer RAM 456 on bus 484.

Further details, including the microcode instructions for the use in compressor/expander 12 and circuit schematics showing the pin connections for all of the circuit components in the compressor/expander can be found in the Teleradiology System Appendix attached hereto and incorporated herein by reference. A treatise on the concept of adaptive transformation is found in Chen et al., "Adaptive Coding of Monochrome and Color Images," *IEEE Transactions on Communications*, Vol. Com-25, No. 11 (November 1977), also incorporated herein by reference. Determination of a distortion factor for programming into system CPU 20 could be based on such an adaptive transformation scheme.

Scanning an Image

This section describes interactions within the scanner and host station when an image is scanned. Before initiating a scan, a user raises the lid and places a film on the scanner's glass plate. Two fluorescent lights inside the scanner enable the user to position the film properly. The user then presses one of the five pre-set sizing push buttons (5x, 8x, 11x, 14x, or 17x), causing the top and bottom mask curtains to be set at the desired size.

Pressing a push button grounds one side of an inverter that applies a positive voltage to one end of a pre-set reference potentiometer in the scanner. A reversible DC motor positions the mask curtains and rotates a potentiometer connected to the motor drive shaft. This potentiometer provides a feedback signal that is compared with the pre-set reference voltage on the Scanner B board, causing a positive, negative, or zero voltage potential to be applied to the reversible DC motor. When the feedback and reference voltages are equal, the mask motor stops, leaving the masks at the pre-selected size. The reference voltage may be adjusted in the field as necessary. Selecting an overall image size also affects the correct lens zoom and focus settings. Reversible DC motors mounted on the lens assembly drive the lens zoom and focus rings. Zoom and focus feedback potentiometers are coupled to the zoom and focus rings by a nylon toothed gear, which rotates the potentiometers whenever the zoom and focus motors are enabled. Zoom and focus reference voltages on the scanner A board are preset so that positive, negative, or 0 voltage potentials are applied to the motors rotating the zoom and focus rings. Whenever the feedback potentiometers send voltage equaling the reference voltages, the zoom and focus drive motors stop. The zoom and focus rings are correctly positioned for the selected image size.

As with the mask servo, the zoom and focus servos are properly adjusted at the factory but may be readjusted in the filed when needed. Proper zoom servo adjustment ensures the scanned image will fill the entire 105×10.5 inch display area of the viewing monitor; proper focus servo adjustment ensures the scanned image will be focused sharply.

The NARROW and WIDE (momentary) push buttons on the Scanner control panel affect the position of the left and right mask curtains. Pressing and holding the NARROW button applies a negative voltage to the reversible DC motor, driving the left and right curtains closer. In contrast, the WIDE push button applies a positive voltage to the DC motor, moving the curtains apart. However, the scanning area may not be widened past the overall selected image sized (e.g., if the 5x size is selected, the maximum image size scanned will be 5×5 in., regardless of where the side mask curtains are set). This is because the zoom servo has preset the zoom to include only the 5x area.

The density push buttons (LIGHT, NORMAL or DARK) control the lens aperture or F-stop settings. As with the focus and zoom, the aperture ring on the lens assembly is driven by a reversible DC motor. A feedback potentiometer, coupled to the aperture lens ring by a toothed gear, changes the feedback voltage developed across the potentiometer as the ring rotates. The reference voltage parameters on the Scanner B board are preset to provide a positive, negative, or 0 voltage potential to the motor. When the potentiometer sends a feedback voltage equaling the reference voltage, the motor stops, setting the aperture ring for the desired density setting.

After the image size and density have been selected, users typically press the X key on the data entry terminal to initiate scanning (the SCAN key on the TR is inoperational under current system configuration, and the SCAN key on the T is rarely used because the system keypad has no alphanumeric keys for entering patient data when the scanned image is stored). The "scan" command is fed to the CPU 38 via the RS232 cable connecting the data entry terminal to the host station. The CPU acknowledges the command and passes the scan signal to the VDG. The 8085 microprocessor on the VDG controller oversees and manages the scan from this point.

The VDG prevents data from being displayed in memories A and B. The screen blackens, ensuring that partial image data will not be displayed as the image is scanned. The VDG controller will enable the display as soon as all image data has been scanned, digitized, and written into VDG memories A and B.

Three lighting control signals are sent to the camera interface board: BL OFF, AC ON and DC ON. The VDG sends the BL OFF signal, instructing the camera interface board to turn off the scanner's back lights. Shortly thereafter, when instructed by the VDG, the AC ON and DC ON signals are sent to the camera interface, which passes these signals to the scanner.

The AC ON signal causes 115 vac to be applied to a bridge rectifier and turns on the fluorescent lid lights. The DC ON signal then closes two relays, converting the 115 vac to rectified DC power, which is applied to lid lights. Switching to DC power eliminates any AVC flicker that may distort the image data during the scan. The DC ON signal also causes the shutter solenoid control to snap open the lens shutter mechanism.

The open lens shutter enables the image reflected on the mirror to enter the lens and become focused on the photosensitive element of the camera's vidicon tube. Two successive horizontal fields are scanned, and these fields are interlaced and sychronized.

The video anti-log amplifier in the scanner processes the camera's composite video signals, removing distortions and stripping sync signals. The remaining composite video and blanking signals are sent through the video low-pass filter in the scanner to eliminate frequency components greater than approximately 4 Mhz. This filtering is necessary because the digital circuitry at the host station cannot accommodate a larger bandwidth. The signal is passed through a clamp circuit, fixing the relationship to ground reference. Finally, the analog video signal is sent via a coaxial cable to the camera interface board on the host station.

A high-speed TRW flash converter digitizes the incoming analog signal. The camera interface writes the digitized data directly into VDG memories A and B (the 1024×1024 pixels are stored alternately in pairs on these two boards, with each board containing every other pixel pair of image data). When finished, the camera interface signals the VDG, which then enables the VDG display circuits. Data is continuously read from memories A and B and converted into an analog video signal, which is displayed on a high-resolution monitor.

By this time, the VDG has signaled the CPU that the scan has been completed. The CPU acknowledges the message and prints a storage prompt on the user's screen.

The entire process of scanning and displaying an image is completed in 4 seconds.

Storing an Image

Once an image has been scanned, users typically press S on the data entry terminal to store the image. The CPU queries the user if the image is to be stored raw or compressed. The CPU searches the disk directory for an empty slot of the desired image type. The slot is locked until the user answers all storage questions and the desired data is stored in the slot.

If the image is to be stored compressed, the CPU initiates a subsequent storage command to the DMA and compressor/expander. The DMA a. pulls a block of data from VDG memories A and B and gives it to the compressor/expander.

b. waits for the compressor/expander to encode and reduce the data by an average of 20:1.

c. retrieves the compressed data block and passes it to the SMD controller, which writes the data on a fixed disk.

The DMA repeats this process until the entire image has been compressed and stored. During this process, the CPU prompts the user to enter patient information for the image and press CONFIRM or CR when done.

When the editing is completed, the CPU checks if the DMA has posted a message indicating all image data has been transferred and stored. If so, the CPU passes the patient data to the SMD controller so this data can be stored in the disk directory. If the CMD has not completed the storage take when the editing has been completed, the CPU prints a "storing" message for the user. No action can be taken at that station until storage has been completed, a process which takes approximately 12 seconds.

If the image is to be stored raw, the CPU passes another storage command to the DMA, which pulls a block of data from VDG memories A and B and passes the data to the SMD controller. The SMD controller writes the data on a fixed disk. This process is repeated until all image data has been stored.

In the meantime, the CPU has instructed the user to enter patient data for the image and to press CONFIRM or (CR) when done. The sequence of events from here is the same as that for CPU checks if the DMA has posted a message indicating all image data has been transferred and stored. If so, the CPU passes the patient data to the SMD controller so the data can be stored in the disk directory. If the DMA has not completed the storage task before the editing has been completed, the CPU will print the message "Storing..." on the screen. No action can be taken at that station until storage has been completed, a process which takes approximately 14 seconds.

The software limits the number of images that can be stored on each 167-MB disk to 1136 compressed images or 136 raw images. Hard disks configured for both types of image storage may contain up to 624 compressed images and 64 raw images.

Each compressed image is allotted 112K bytes on the hard disk: 1K for miscellaneous data (LED states, cursor location, gray-level state, and magnification level), 79K for image data, and 32K for light pen overlay data. The disk space per compressed image is not decreased if only a portion of the 112K bytes is needed to store the complete image.

Raw images are allotted 1057K bytes 1K for miscellaneous data (patient data, cursor location, gray-level state, and magnification level), 1024K for image data, and 32K for overlay data). Raw images do not vary in size and, therefore, always fill the allocated storage space.

Each image has a corresponding directory entry that contains the patient data, overlay flag, and an integer describing the image size in blocks. These directory entries are each allocated 128 bytes.

Displaying an Image

The DISPLAY key enables users to instruct the system to display a single image. After the user presses the appropriate keys, the CPU acknowledges the message. If the disk directory or other needed resource (such as the compressor/expander) is not locked out by a previous storage or display instruction, the CPU locked out by a previous storage or display instruction, the CPU will instruct the DMA to begin transferring image data blocks from the disk to VDG memory boards A and B. If the disk directory or other resource is locked out by another user action, the CPU will print the message, "Please stand by." The station will be locked out momentarily until the image can be fully displayed.

Once the disk is free, the SMD controller retrieves a block of image data from the disk. The DMA then takes the block, gives it to the compressor/expander if the image was stored compressed, and writes the (expanded) data into the 1 MB of word-addressable RAM and VDG memories A and B. The data is written alternately on the boards, so each board contains every other pixel pair of image data. Other miscellaneous data (indicating cursor location, gray-level state, and magnification level) also are written into memory A and B.

The DMA also writes the stored overlay to VDG memory board B, which contains an additional 64K RAM. The system has two overlay pages, each requiring 32K. The overlay displayed in image mode consists of stored light pen annotations and the STATUS line. The overlay displayed in catalog mode consists of the alphanumeric patient data that comprises the catalog.

The VDG automatically reads the data from VDG memories A and B, converts the digital data to analog video, and displays the image, patient data, and other overlay data on the monitor. It also generates the gray-level bar appearing at the bottom of the screen. The position of the cursor, the level of magnification, and the gray-level state are determined by the miscellaneous data stored with the image.

The image data remains in VDG memories A and B until another image is displayed (and therefore written into the memory boards), the power is shut off, or the station times out. While an image is in any VDG's RAM, it cannot be deleted from the disk directory. Thus, if someone at a Remote Monitor displayed Image 1 and returned to the catalog, no other station could delete Image 1 because it is in a VDG's memory. If deleting is attempted, the CPU will search the directory, determine the image is considered to be in use, and request the user to try again later. The patient data, however, may be edited and changed at any time.

Displayed images may be manipulated in a variety of ways. The 8085 microprocessor in the VDG processes all keystrokes involving cursor control, magnification, gray-level changes, and light pen annotations; the 68000 CPU is not accessed unless the MONITOR key is invoked.

When a user passes UP, DOWN, LEFT, or RIGHT, the VDG controller recalculates the X and Y values of the cursor location. The X value indicates the horizontal cursor position, and the Y value indicates the vertical position. The X or Y value is incremented or decremented, and the change is written into VDG memories A and B. Since the VDG is continuously reading this data, the change is processed and displayed automatically.

Gray-level changes are processed similarly. Pressing LIGHT, DARK, NARROW or WIDE causes the VDG to consult a gray-scale LUT and recalculate the displayed gray-level values. These new values are passed to VDG memories A and B, and the VDG display board displays this new data automatically. The image is then displayed with the adjusted gray-level intensity and contrasts.

Magnification is achieved through pixel replication, which involves duplicating existing data. In 2:1 magnification, one pixel is replicated four times; in 4:1 magnification, one pixel is replicated sixteen times. Thus, no new data is displayed when an image is magnified.

Pressing the OVERLAY key turns on the overlay page and activates the light pen, if present. The light pen is a light-sensitive device capable of annotating an overlay or erasing annotations. Grasping the pen above the black rubber ring and pressing it to the screen causes the VDG controller to calculate the light pen's position. A beam continuously writes across the CRT, refreshing the screen at a rate of 16.66 ms. Internal horizontal and vertical syncs control the rate at which the beam travels, and registers track the beam's current position. When the beam hits the light pen, a pulse is sent through the pen back to the VDG, controller, enabling it to pinpoint the pen's location and write at a into VDG memory B. The VDG display board automatically reads this and displays a white mark corresponding to the pen's location.

Erasing is achieved in a similar fashion. When the light pen is grasped below the black ring and pressed to the screen, the VDG pinpoints its location as previously explained. However, the VDG writes a different value for this overlay bit, which is interpreted as an instruction to display a blank or transparent mark.

Transmitting an Image

Users select images for transmission with the TRANSMIT key much as they select images for display with the DISPLAY key. A manual or an automatic search is conducted through the catalog for the desired image, and, upon command, the system tags the catalog entry with a "—" (for compressed image) or a "#" (for raw image).

To indicate the image has been tagged for transmission, a bit in the image's miscellaneous data is set. All tagged images are locked against alteration (i.e., users cannot change patient data, change the light pen overlay, or delete the image). Users must untag (or re-tag) the image before alteration is permitted.

To initiate transmission, users press the CALL key to display the call system menu. When a user edits a phone number, the CPU recognizes this as a command to initiate the call and instructs the modem to dial the receiving site. The CPU prints a "dialing" message on line 5 of the call menu (if it is still displayed).

The modem dials the number and tries to establish a link. If the line is busy or a similar problem occurs, the modem will immediately re-dial the number three times before giving up. If a link still cannot be established, the modem posts a message to the CPU, which prints an "idle" message on line 5 of the call menu (if it is displayed) and all of the tagged images are marked with a "not sent". The user must initiate the call again before transmission can be achieved.

After a link has been established, the modem checks the quality of the line to determine the data transfer rate. Then the modem sends the receiver a log-in command, consisting of its system name and compatibility code. If the receiving site accepts its log-in and returns similar data, the modem posts a message to the CPU so the "dialing" message on line 5 of the call menu can be changed to "transmitting to <site name>." Line 3 also notes the system is transmitting data.

The CPU searches the disk directory for tagged images. If none is found, the CPU instructs the modem to abort the call. If a tagged image is found, the CPU instructs the SMD controller to retrieve the image and send it block by block to a buffer allocated in the 1 MB of system RAM. The DMA controller on the modem board retrieves the image (block by block) from the buffer and sends it out the phone line. The patient data and directory information are sent first, followed by the image data. Raw and compressed images may be transmitted, but overlays cannot.

The CPU and modem repeat this process until all tagged images have been successfully transmitted, a user at one site instructs the system to hang up, or other problems occur affecting the phone line.

Occasionally, the receiving site may reject an image. Rejection occurs when the receiving site cannot store the tagged image because disk space is full or the disk is configured to store another type of image. Rejection does not cause the modems at either to disconnect the call; instead, the transmitting site removes the transmission tag, replaces it with a rejection tag ("X" for raw images and "x" for compressed images), and transmits the next available image.

If a line fails or a user hangs up before image data has been completely transmitted, the image retains its tag at the transmission site so it my be sent again later. The partial data is removed from the receiver's storage.

Receiving an Image

When a system is booted, its receive capability is enabled automatically. Users may change the status manually at any time through the call menu. If the receive capability is disabled when another site tries to initiate transmission, the modem will ignore the message, causing the transmitting site to re-dial the number three times and then hang up.

However, if the receive capability is enabled when another site tries to initiate transmission, the modem at the receiving site will detect the incoming ring and post a message to the CPU. A link is established, and the modem waits for a log-in command. Once this command is received, the modem passes the system identification and compatibility code to its CPU for verification. If the two systems are determined to be compatible, the CPU instructs the modem to exchange its log-in information and prepare for data reception. The SMD controller also is alerted to prepare for reception and storage.

The transmitting site first sends directory information describing the image type (raw or compressed) to be transmitted. The CPU searches the disk directory for an available slot of the desired type. If none if found, the CPU instructs the modem to reject the image. If one is found, the CPU reserves that slot and instructs the modem to acknowledge the message. The CPU also prints a "receiving" message on lines 3 and 5 of the call menu (if it is displayed).

Once a slot for the incoming image has been reserved, the transmitting site sends the patient and miscellaneous data. The DMA on the modem board writes this data into a buffer allocated in the 1 MB system RAM and, effectively, into the disk directory. Thus, the patient data for an image being received is displayed a @ if compressed and a ! if raw. These tags are removed when the image is first displayed. If a user tries to display an image still being received, the CPU will search the disk directory, find the slot reserved, and print a message explaining the image is being received.

The patient and miscellaneous data, as well as incoming image data, are written into the buffer. The SMD controller retrieves the data from the buffer and writes it into the appropriate disk slot.

When the receiving site has received a complete image, it sends a message to the transmitter indicating it is ready to receive additional images.

The reception is repeated until a user at one site disables the call, a serious problem occurs with the phone line, or all unrejected images have been successfully received. If the user disables the call, the CPU will instruct the modem to disconnect the call. The modem will send a log-out command to the other station and hang up the line. If a serious problem occurs with the phone line and the modem does not receive a block of data after repeated tries, a log-out command also will be issued. Similarly, if the transmitting site determines it has sent all tagged images, it will send the receiver a log-out command.

According to a further aspect of the present invention, as depicted in FIG. 24, multiple compressor/expanders can be utilized with the present invention.

Depending on specific application requirements, one or more compressor/expanders 12-1, 12-2, . . . 12-N could be utilized in a teleradiology environment. Also, such a compressor/expander capability could be utilized in any type of environment for encoding and decoding video pixels representative of still, spatial images.

As depicted in FIG. 24, by providing one or more compressor/expanders 12-1, . . . 12-N, the improved teleradiology system according to the present invention can provide for dramatically improved video processing of still, spatial images between, for example, remote locations.

For instance, in an environment where it is desired to have multiple compressor/expanders utilized between remote locations, as depicted in FIG. 24, a further aspect of the improved teleradiology system is apparent. Compressed data representative of still, spatial images can be transmitted from compressor/expander 12-1 to a remote location to another compressor/expander 12-N wherein the compressed data can be stored and expanded for display purposes. This is a further aspect of the present invention.

What is claimed is:

1. A system for storing and transmitting still, spatial images, said system comprising
    scanning means for scanning said still, spatial image and for generating analog video signals in response thereto,
    interface means for digitizing said video signals generated by said scanner means to obtain pixels,
    one or more compressor/expander means for alternately compressing and expanding said pixels, said compressor/expander means including a first buffer means for storing said pixels during compression and expansion, a transform processor means connected to said first buffer means for storing said pixels according to a cosine transformation during a compression operation in order to obtain a DC component value and a set of AC component values for each of said pixels and for processing said DC component value and said set of AC component values from each of said pixels according to a reverse cosine transformation during an expansion operation, a second buffer means for storing said DC value and said set of AC values from each of said pixels and an encoding/decoding means for encoding said DC component value and said set of AC component values from each of said pixels during said compression operation and for decoding said encoded DC component value and said encoded set of AC values from each of said pixels during said expansion operation,
    memory means for storing said encoded DC component value and said encoded set of AC component values from each of said pixels,
    bus means for transmitting selected ones of said pixels to one or more predetermined locations, and
    display means for visually displaying still, spatial type images corresponding to said transmitted pixels at said one or more locations.

2. A system as set forth in claim 1, wherein said compressor/expander means further includes control means for governing the operation of said compressor/expander means such that said DC component value and said set of AC component values obtained from one of said pixels during said compression operation can be loaded into said second buffer means upon completion of said cosine transform while others of said pixels can be simultaneously loaded into said transform processor means from said first buffer means to await said cosine transformation and said pixels obtained from said reverse cosine transformation during said expansion operation can be loaded into said first buffer means from said transform processor means while said DC component value and said set of AC component values obtained from a next one of said pixels to be expanded can be loaded from said second buffer means into said transform processor means from said second buffer means to await said reverse cosine transformation.

3. In a teleradiology system, the apparatus for encoding and decoding video pixels representative of one or more still, spatial images comprising
one or more compressor/expander means for alternately compressing or expanding said pixels, said compressor/expander means including a transform processor means for processing said pixels according to a cosine transformation during a compression operation in order to obtain a DC component value and a set of AC component values for each of said pixels and for processing said DC component value and said set of AC component values for each of said pixels according to a reverse cosine transformation during an expansion operation in order to obtain said pixels, said compressor/expander means also including and encoding/decoding means connected to receive said DC component value and said set of AC component values from said transform processor means for encoding said DC component value and said set of AC component values from each of said pixels during said compression operation and connected to send to said transform processor means for decoding said encoded DC component value and said set of AC component values from each of said pixels during said expansion operation,
means for transmitting selected ones of said pixels to one or more predetermined locations, and
display means for visibly displaying images corresponding to said transmitted pixels at said one or more locations.

4. An apparatus for encoding and decoding video pixels comprising
compressor/expander means for alternately compressing and expanding said pixels, said compressor/expander means including a first buffer means for storing each of said pixels during compression and expansion operations, a transform processor means connected to said first buffer means for processing said pixels according to a cosine transformation during a compression operation in order to obtain a DC component value and a set of AC component values for each of said pixels and for processing said DC component value and said set of AC component values from each of said pixels according to a reverse cosine transformation during an expansion operation, a second buffer means connected to receive said DC component value and said set of AC component values for storing said DC value and said set of AC component values from each of said pixels, said compressor/expander means also including an encoding/decoding means connected to receive said DC component value and said set of AC component values from said transform processor means for encoding said DC component value and said set of AC component values from each of said pixels during said compression operation and connected to send to said transform processor means for decoding said encoded DC component value and said encoded set of AC component values from each of said pixels during said expansion operation, wherein said compressor/expander means further includes control means for governing the operation of said compressor/expander means such that said DC component value and said set of AC component values obtained from one of said pixels during said compression operation are loaded into said second buffer means from said transform processor means upon completion of said cosine transform while others of said pixels are simultaneously loaded into said transform processor means from said first buffer means to await cosine transformation, said control means also governing the operation of said compressor/expander means such that said pixel obtained from said reverse cosine transformation during said expansion operation are loaded into said first buffer means from said transform processor means while said DC component value and said set of AC component values obtained from a next one of said pixels to be expanded are loaded from said second buffer means into said transform processor means to await said reverse cosine transformation.

5. A system for storing and transmitting still, spatial images, said system comprising
a scanning means for scanning the images and for generating video signals in response thereto,
means for digitizing said video pixels,
one or more compressor/expander means for alternately compressing and expanding said pixels, said compressor/expander means including a transform processor means for processing said pixels according to a cosine transformation during a compression of AC component values for each of said pixels and for processing said DC component value and said set of AC component values from each of said pixels according to reverse cosine transformation during an expansion operation in order to obtain said pixels, said compressor/expander means also including an encoding/decoding means connected to receive said DC component value and said set of AC component values from said transform processor means for encoding said DC component value and said set of AC component values from each of said pixels during said compression operation and connected to send to said to said transform processor means for decoding said encoded DC component value and said set of AC component values from each of said pixels during said expansion operation,
bus means for transmitting selected ones of said pixels to one or more predetermined locations, and
display means for visually displaying images corresponding to said transmitted pixels at said one or more locations.

6. The system of claim 5 further comprising
memory means for storing said encoded DC component value and said encoded set of AC component values from each of said pixels.

7. One or more compressor/expander means for alternately compressing and expanding video signals, wherein cosine transform and reverse transform processing is accomplished by implementing a series of multiplication and additions using cosine transformation equations, said cosine transformation equations taking the form:

$$\text{next } P = K1 \times \text{present } P + K2 \times \text{present } Q$$

$$\text{next } Q = K3 \times \text{present } P + K4 \times \text{present } Q$$

in which K1 through K4 are coefficients derived from the cosine transformation equations and P and Q represent image values at each pair of contiguous pixel row or column locations, each of said compressor/expander means comprising
- transform processor circuit means for accomplishing said multiplications and additions,
- pixel buffer means for passing image data to and from said transform processor circuit means, and
- transform controller means for controlling said transform processor circuit means wherein said transform processor circuit means further comprises cosine RAMs and scratch RAMs for alternately storing values from said multiplications and additions.

8. The compressor/expander means of claim 7 wherein said multiplications and additions occur more than once to yield a set of values, said set of values in the compression mode being written to said pixel buffer means while said image data next in line for compression is written simultaneously from said pixel buffer means into said cosine RAMs, said set of values in the expansion mode being written to said pixel buffer means while said image data next in line for expansion is written simultaneously from said pixel buffer means into said cosine RAMs.

9. The compressor/expander means of claim 7 wherein said image values undergoing said multiplications and additions during compression and expansion are first obtained from said cosine RAMs to perform said multiplications and additions and written to said scratch RAMs after said multiplications and additions are performed, and then, in alternating fashion, obtained from said scratch RAMs to perform said multiplications and additions and written to said cosine RAMs after said multiplications and additions are performed.

10. A system for storing and transmitting digital image data representative of still, spatial images comprising
- one or more compressor/expander means for alternately compressing and expanding said digital image data,
- storage means for storing said compressed digital image data,
- bus means for transmitting said compressed digital image data to a selected location,
- display means for visually displaying one or more images corresponding to said still, spatial type images at said selected location.

11. A system as in claim 10 wherein said bus means includes a telephone line.

12. A system as in claim 10 wherein said compressor means includes means for coding said digital image data according to a predetermined standard deviation value of said digital image data.

13. A system as in claim 12 wherein said means for coding includes run length coding.

14. A system as in claim 12 wherein said means for coding includes Huffman coding.

* * * * *